July 19, 1938.  W. W. LASKER  2,124,178
STATISTICAL CARD PUNCH
Filed Oct. 7, 1936  47 Sheets-Sheet 1

INVENTOR
W.W. LASKER
BY W. A. Sparks
HIS ATTORNEY

July 19, 1938.  W. W. LASKER  2,124,178
STATISTICAL CARD PUNCH
Filed Oct. 7, 1936  47 Sheets-Sheet 2

INVENTOR
W.W. LASKER
BY *H.Q. Sparks*
HIS ATTORNEY

July 19, 1938.  W. W. LASKER  2,124,178
STATISTICAL CARD PUNCH
Filed Oct. 7, 1936  47 Sheets-Sheet 4

INVENTOR
W. W. LASKER
BY H. A. Sparks
HIS ATTORNEY

July 19, 1938.　　　W. W. LASKER　　　2,124,178
STATISTICAL CARD PUNCH
Filed Oct. 7, 1936　　　47 Sheets-Sheet 5
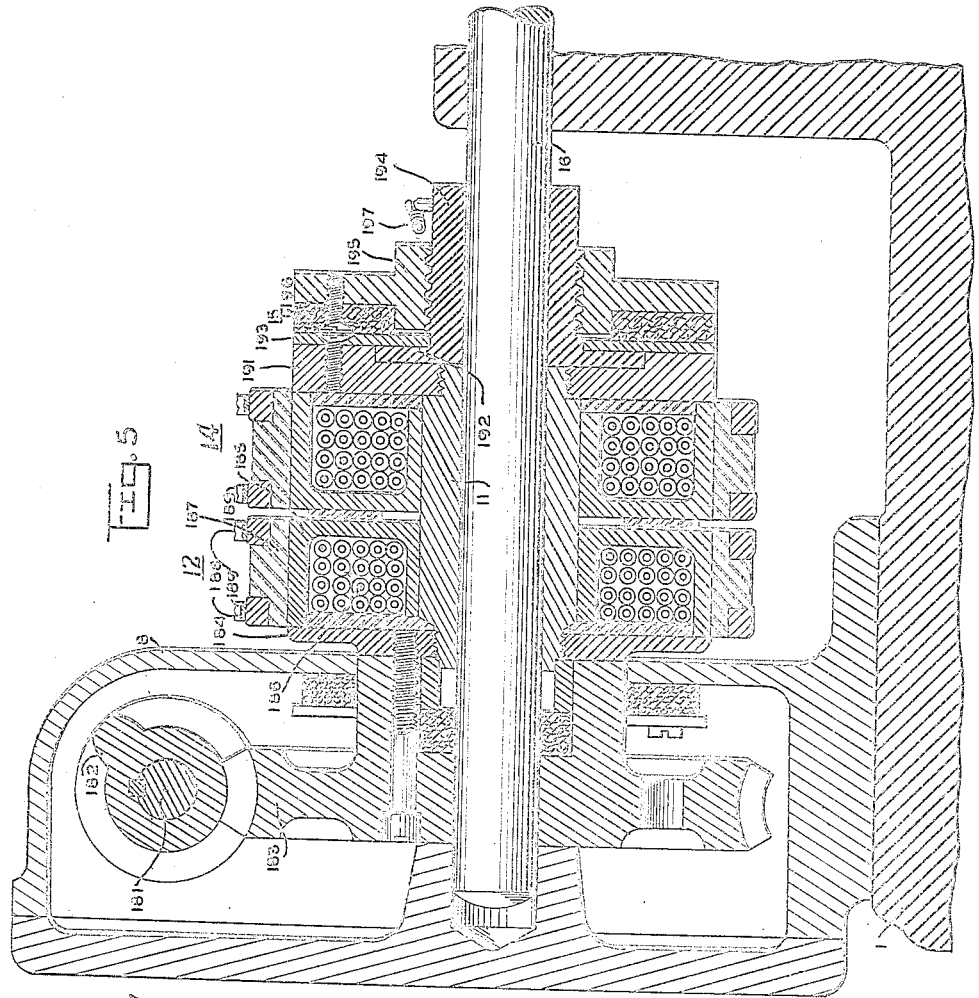
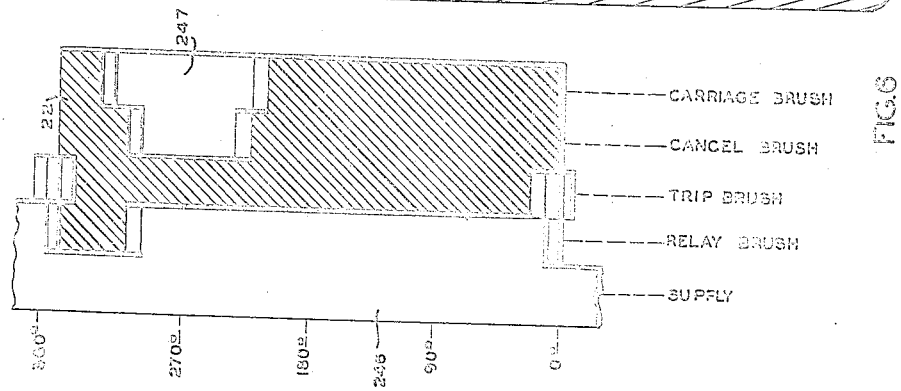
INVENTOR
W. W. LASKER
BY
HIS ATTORNEY

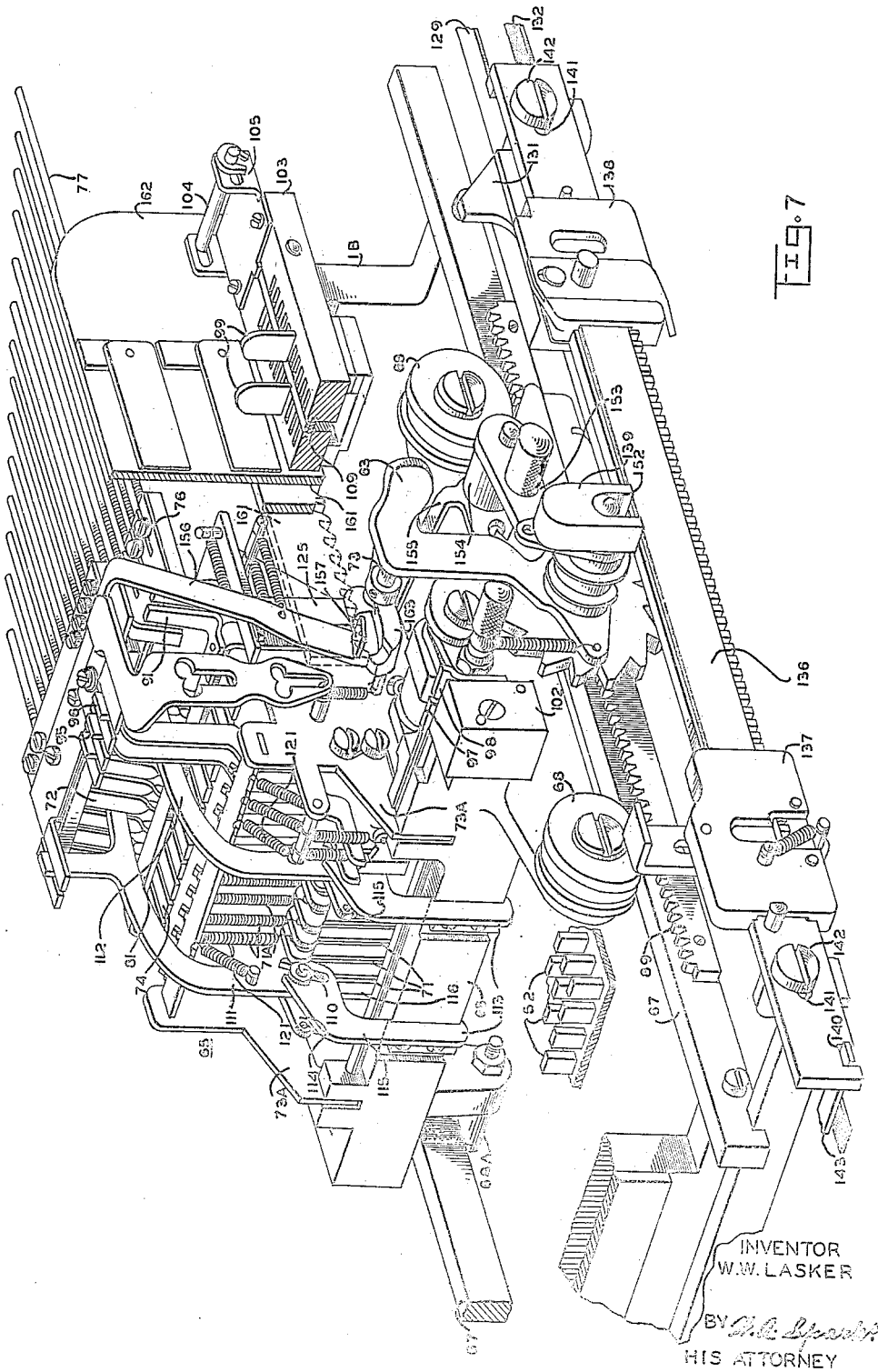

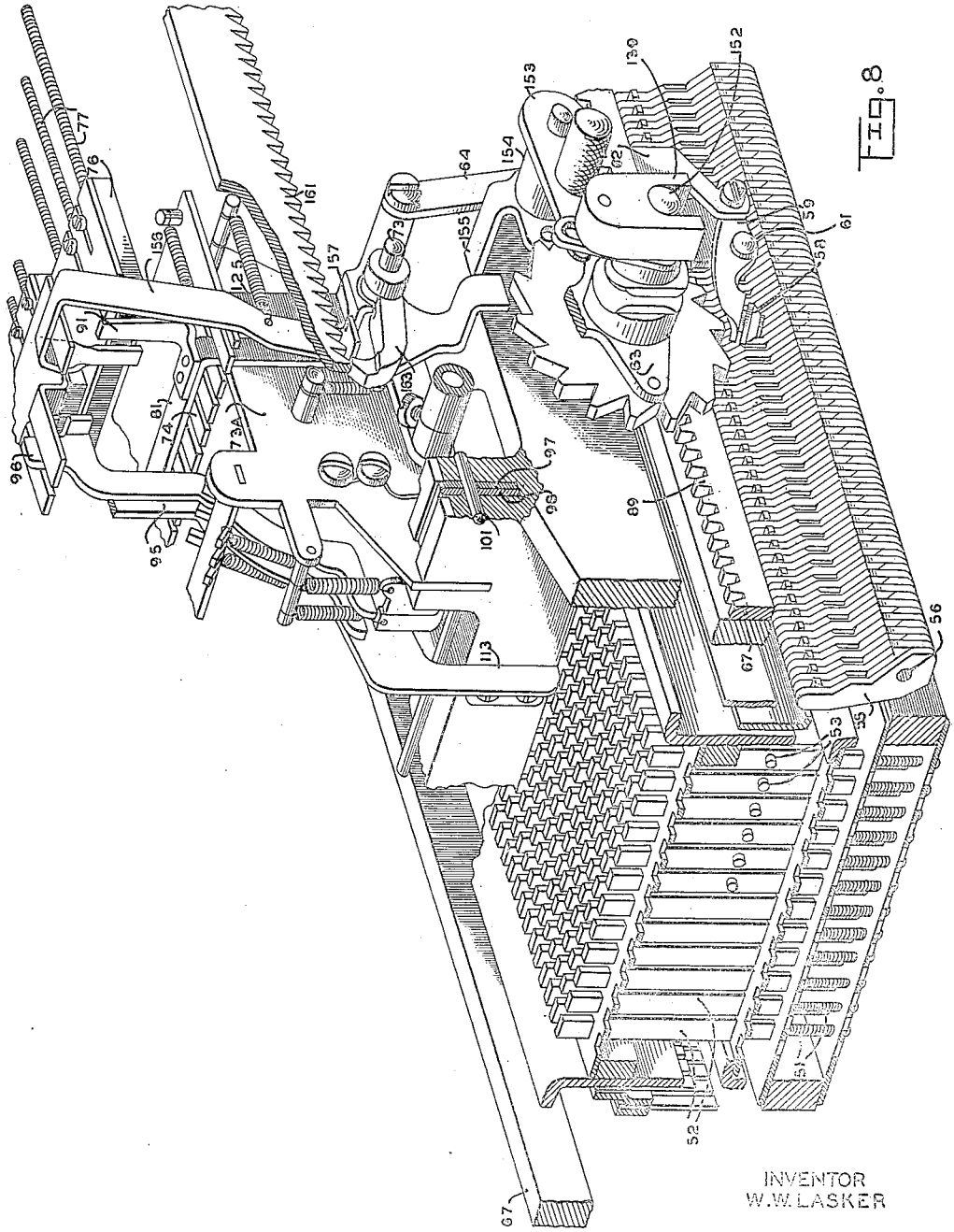

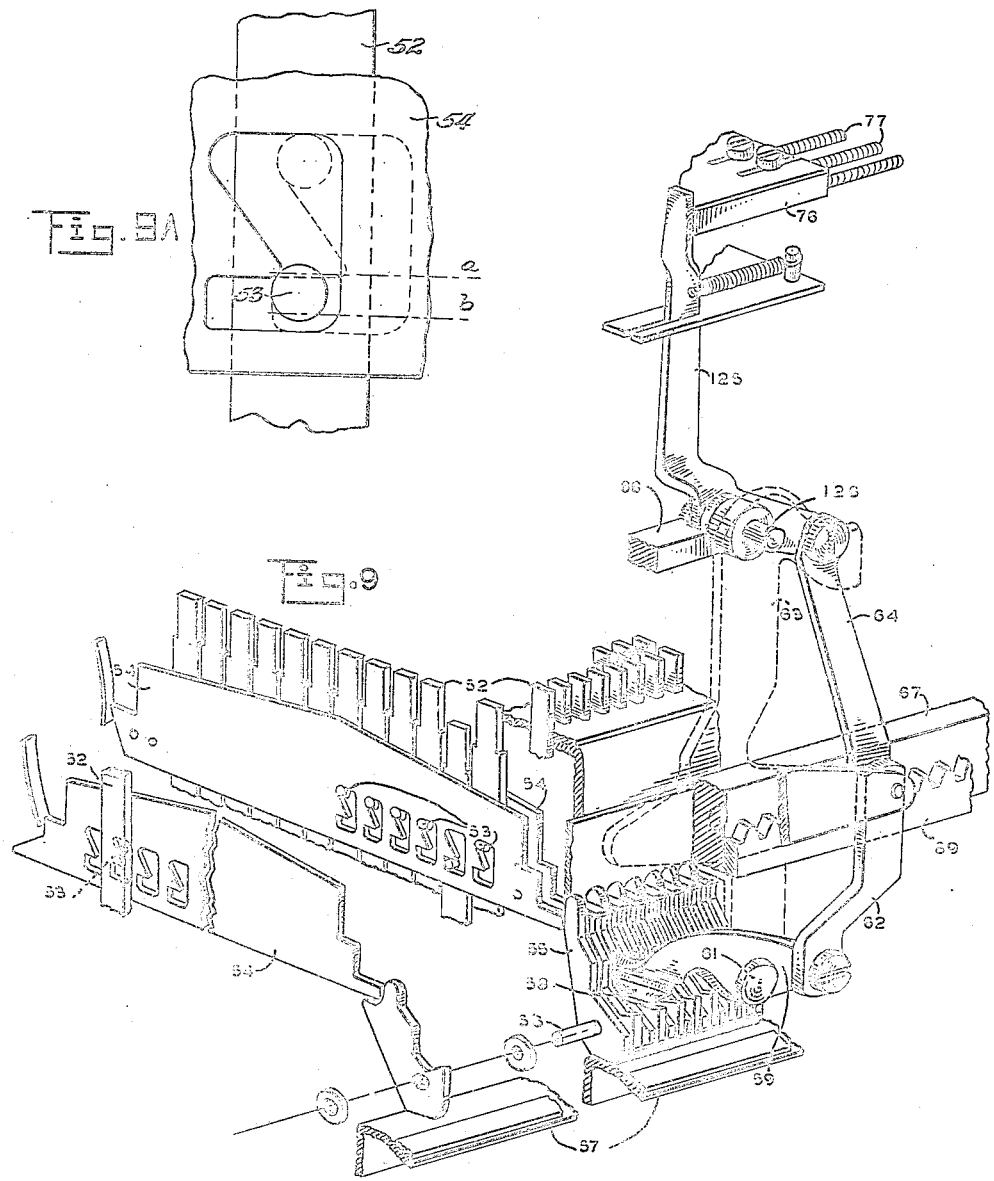

July 19, 1938.   W. W. LASKER   2,124,178
STATISTICAL CARD PUNCH
Filed Oct. 7, 1936   47 Sheets-Sheet 9

INVENTOR
W.W. LASKER

BY *W. A. Sparks*
HIS ATTORNEY

July 19, 1938.  W. W. LASKER  2,124,178
STATISTICAL CARD PUNCH
Filed Oct. 7, 1936  47 Sheets-Sheet 10
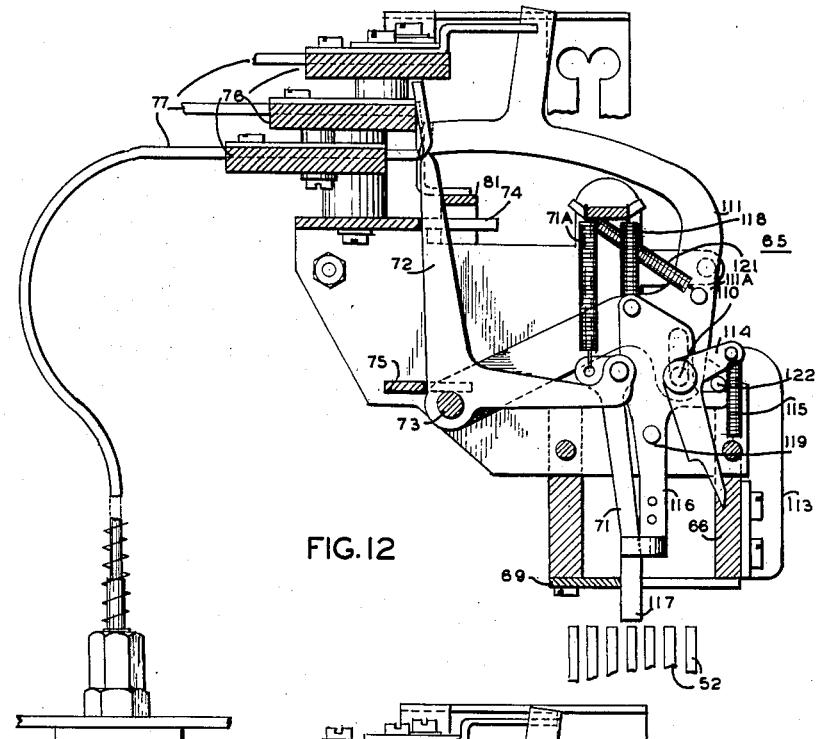
FIG. 12
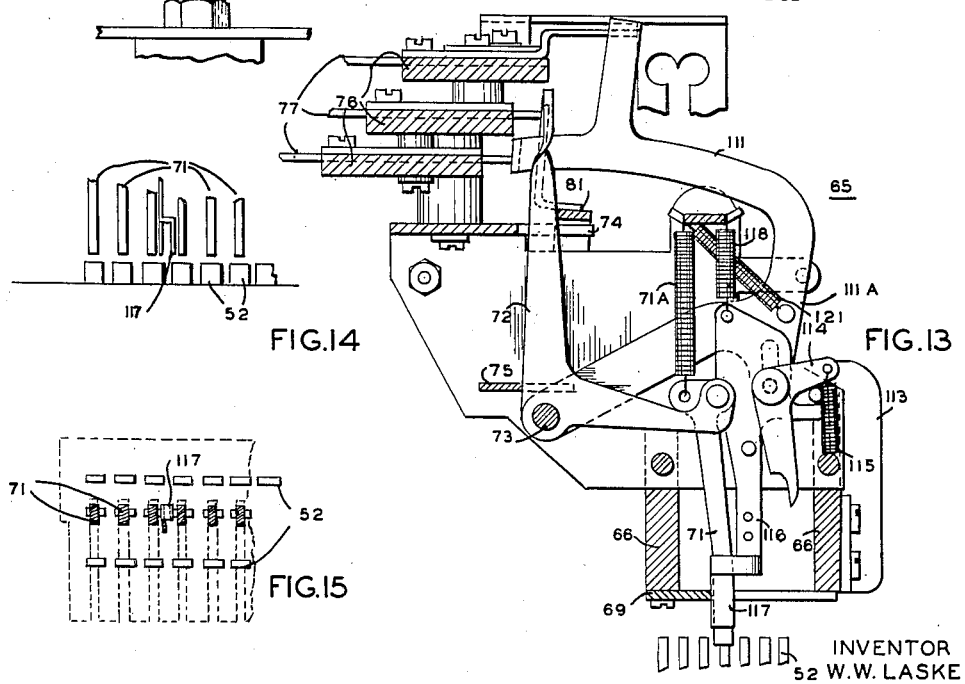
FIG. 13
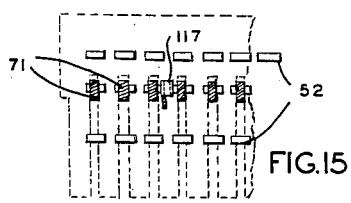
FIG. 14
FIG. 15
INVENTOR
W. W. LASKER
BY *W. A. Sparks*
HIS ATTORNEY

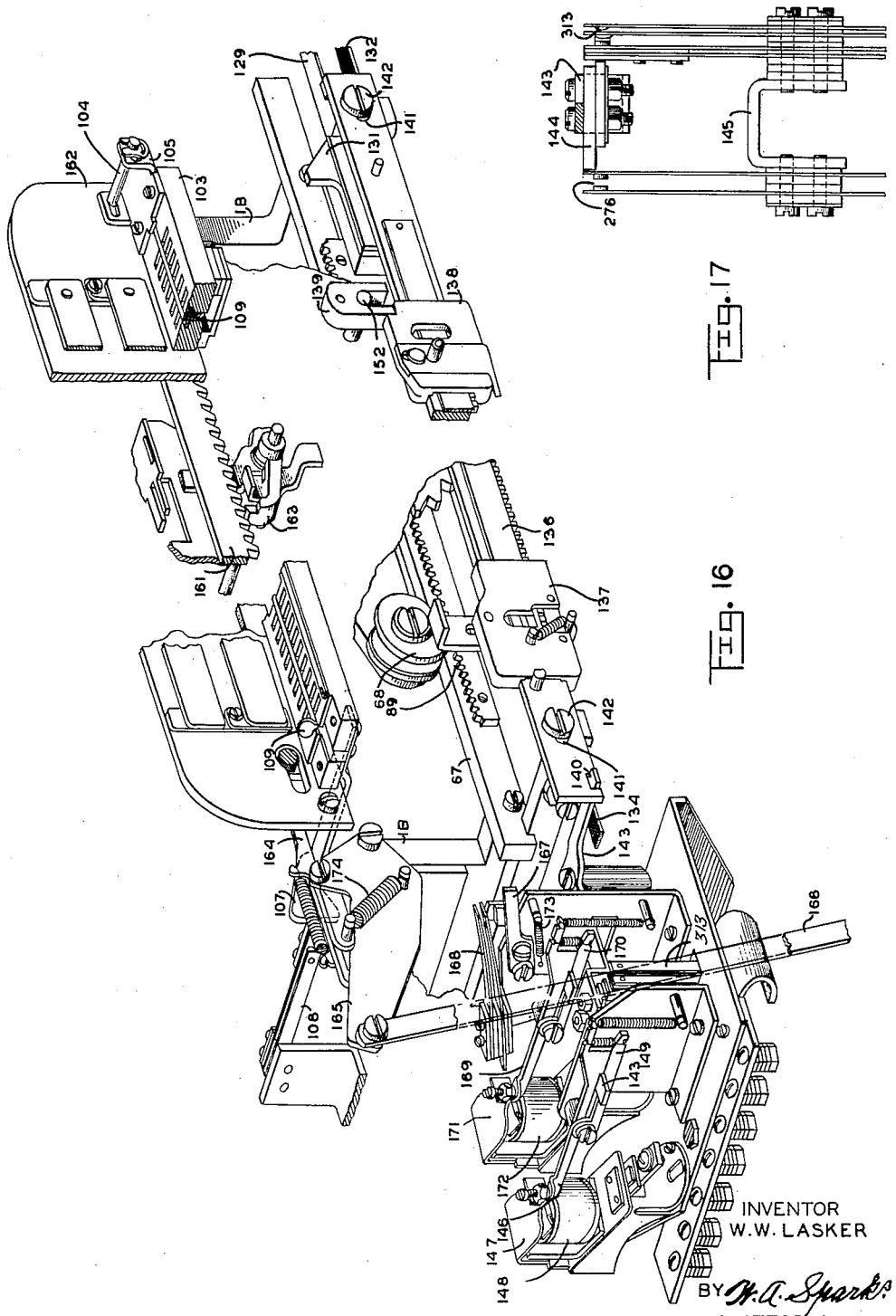

July 19, 1938.  W. W. LASKER  2,124,178
STATISTICAL CARD PUNCH
Filed Oct. 7, 1936  47 Sheets-Sheet 12
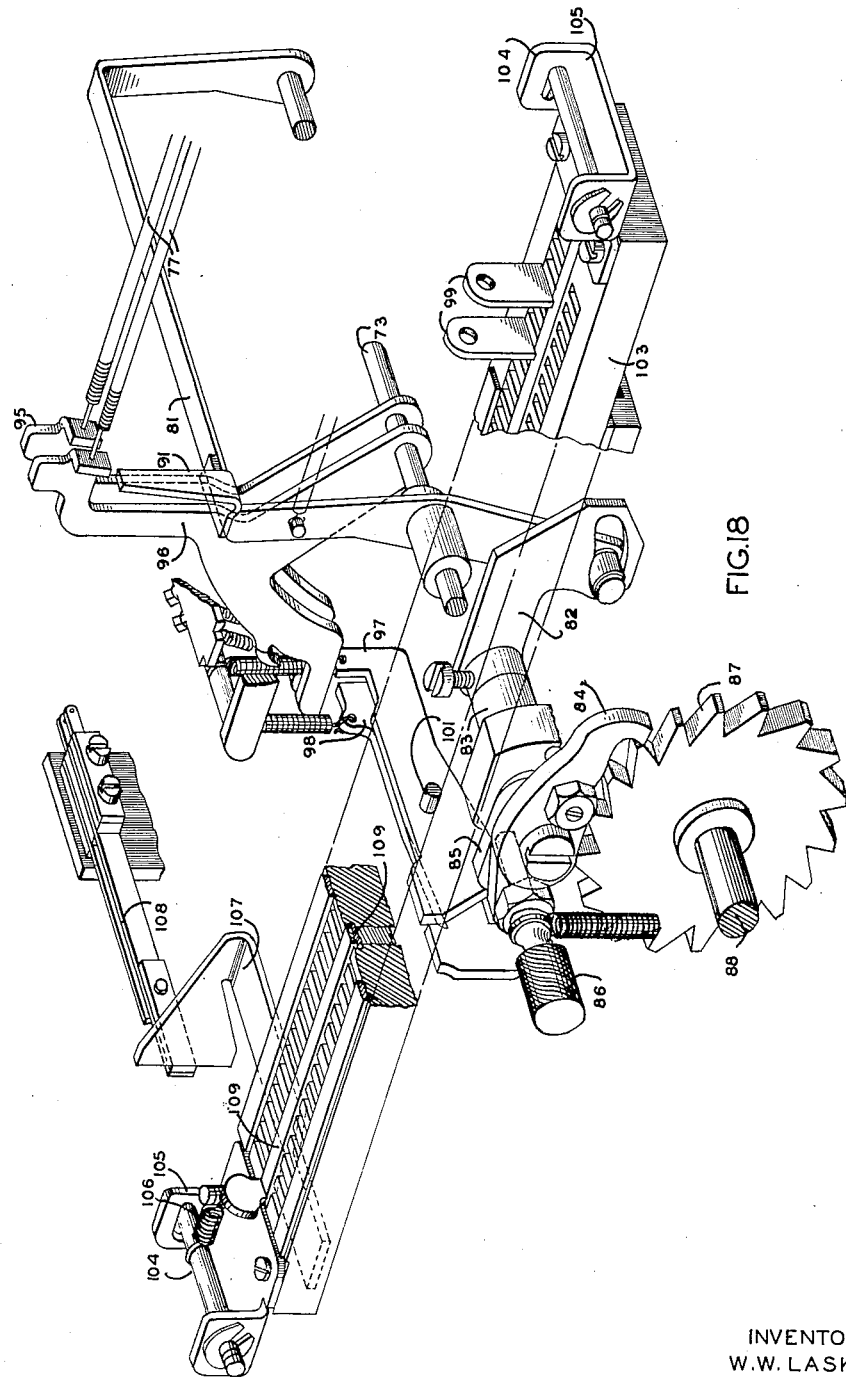
INVENTOR
W.W. LASKER
BY H. A. Spark
HIS ATTORNEY July 19, 1938.  W. W. LASKER  2,124,178
STATISTICAL CARD PUNCH
Filed Oct. 7, 1936  47 Sheets-Sheet 15

INVENTOR
W. W. LASKER
BY *W. A. Sparks*
HIS ATTORNEY

INVENTOR
W.W. LASKER
BY *W. A. Sparks*
HIS ATTORNEY

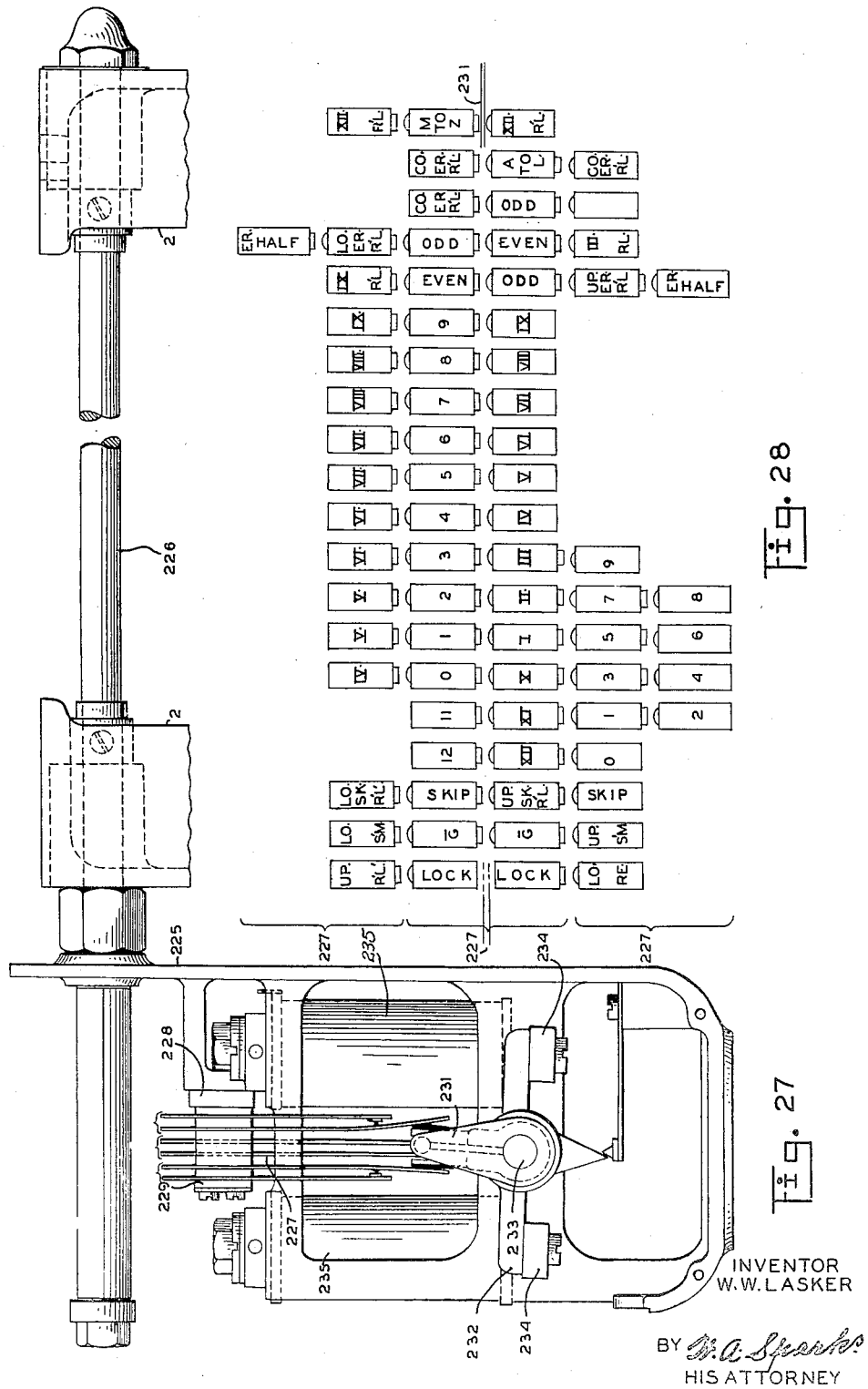

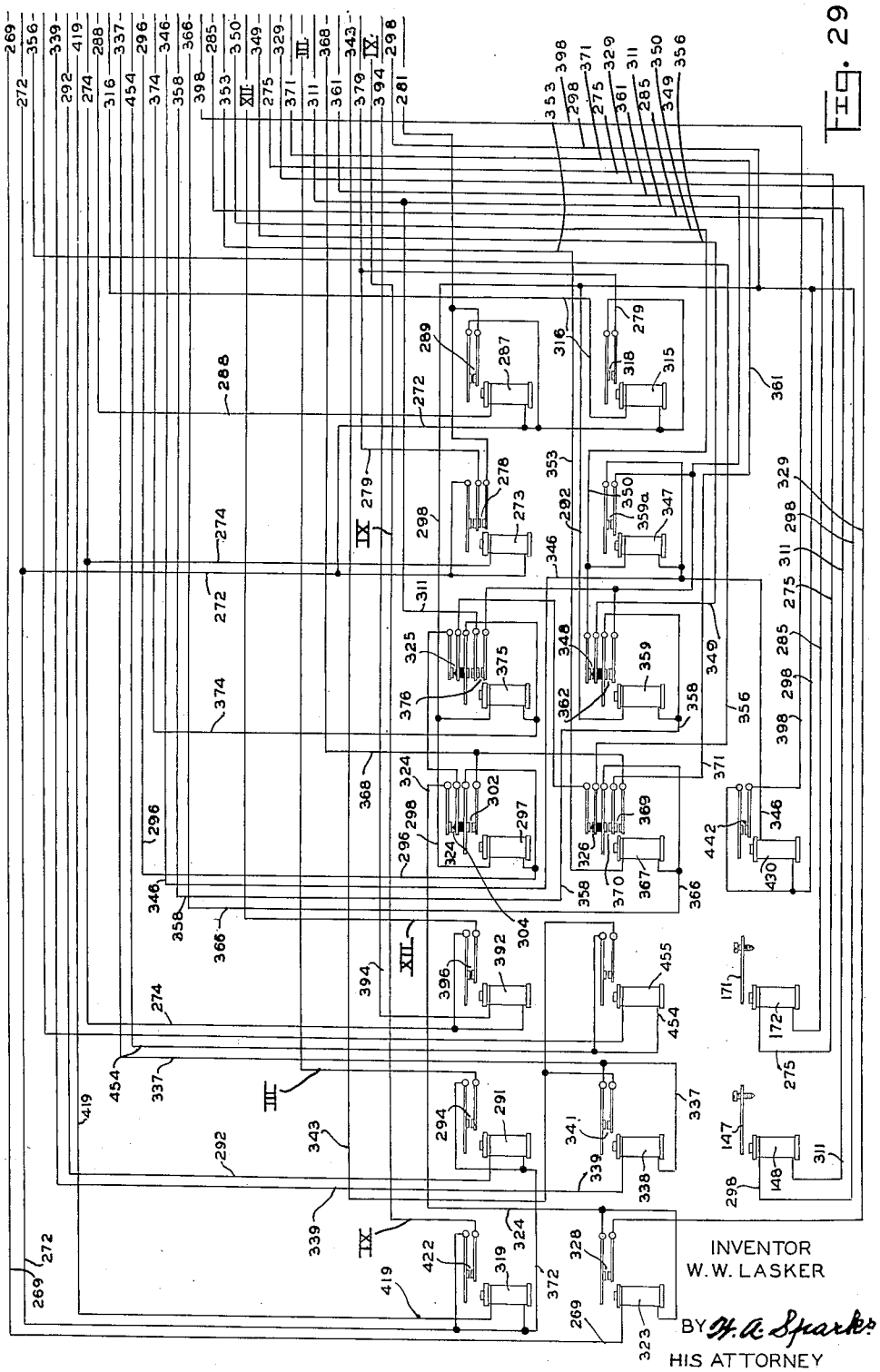

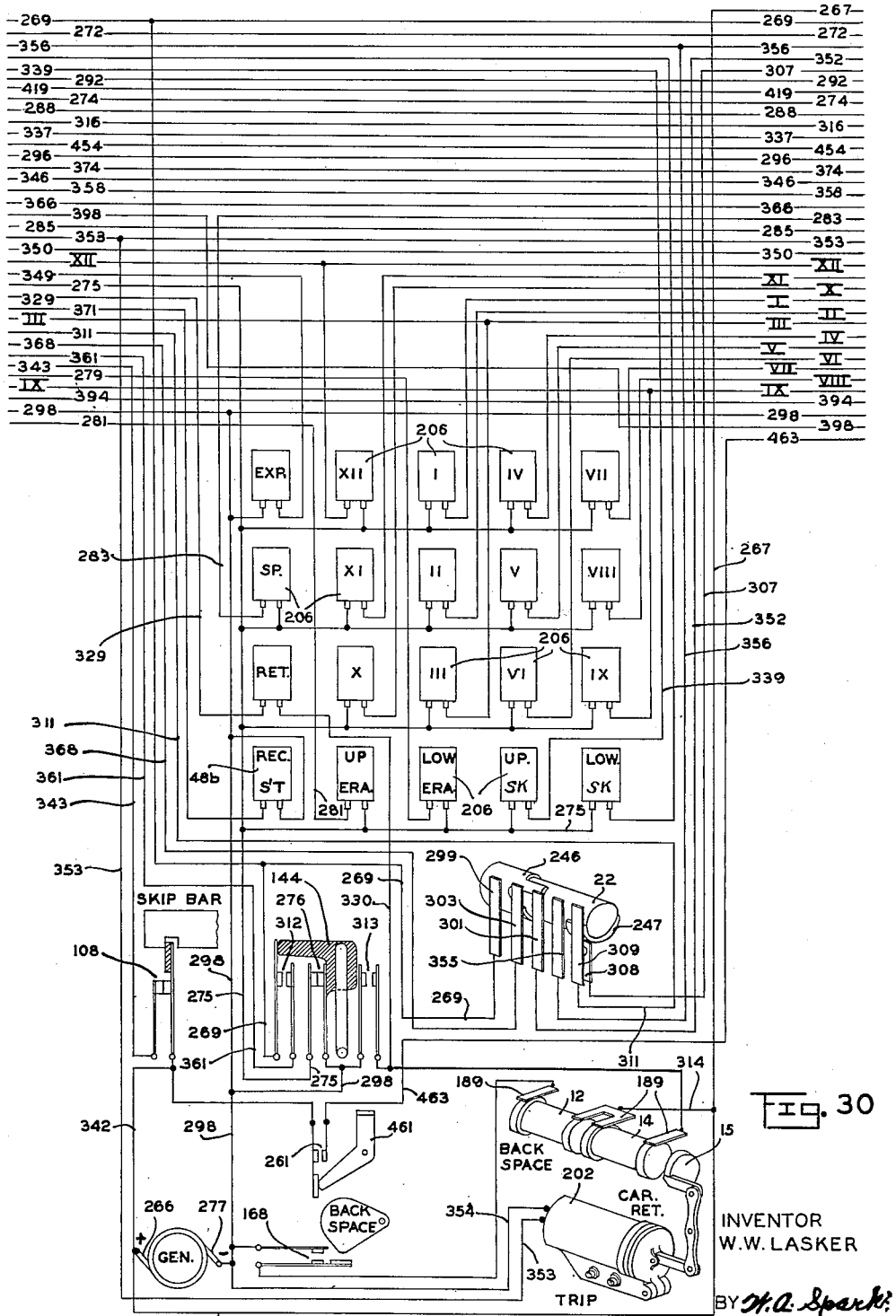

July 19, 1938.  W. W. LASKER  2,124,178
STATISTICAL CARD PUNCH
Filed Oct. 7, 1936   47 Sheets-Sheet 22

INVENTOR
W. W. LASKER
BY H. A. Sparks
HIS ATTORNEY

July 19, 1938.  W. W. LASKER  2,124,178
STATISTICAL CARD PUNCH
Filed Oct. 7, 1936    47 Sheets-Sheet 25

INVENTOR
W. W. LASKER
HIS ATTORNEY

July 19, 1938.  W. W. LASKER  2,124,178
STATISTICAL CARD PUNCH
Filed Oct. 7, 1936   47 Sheets-Sheet 29

INVENTOR
W.W. LASKER
BY H. A. Sparks
HIS ATTORNEY

July 19, 1938.   W. W. LASKER   2,124,178
STATISTICAL CARD PUNCH
Filed Oct. 7, 1936   47 Sheets-Sheet 30

INVENTOR
W.W. LASKER
BY
*W. A. Sparks*
HIS ATTORNEY

July 19, 1938.  W. W. LASKER  2,124,178
STATISTICAL CARD PUNCH
Filed Oct. 7, 1936  47 Sheets-Sheet 31

INVENTOR
W. W. LASKER
BY
HIS ATTORNEY

July 19, 1938.  W. W. LASKER  2,124,178
STATISTICAL CARD PUNCH
Filed Oct. 7, 1936  47 Sheets-Sheet 32

INVENTOR
W. W. LASKER
BY W. A. Sparks
HIS ATTORNEY

July 19, 1938.  W. W. LASKER  2,124,178
STATISTICAL CARD PUNCH
Filed Oct. 7, 1936  47 Sheets-Sheet 33

INVENTOR
W. W. LASKER
BY W. A. Sparks
HIS ATTORNEY

July 19, 1938.  W. W. LASKER  2,124,178
STATISTICAL CARD PUNCH
Filed Oct. 7, 1936  47 Sheets-Sheet 34

INVENTOR
W.W. LASKER
BY *H.C. Sparks*
HIS ATTORNEY

July 19, 1938.  W. W. LASKER  2,124,178
STATISTICAL CARD PUNCH
Filed Oct. 7, 1936   47 Sheets-Sheet 36

INVENTOR
W. W. LASKER
BY W. A. Sparks
HIS ATTORNEY

July 19, 1938.  W. W. LASKER  2,124,178
STATISTICAL CARD PUNCH
Filed Oct. 7, 1936   47 Sheets-Sheet 37

INVENTOR
W. W. LASKER
BY *W. A. Sparks*
HIS ATTORNEY

July 19, 1938.  W. W. LASKER  2,124,178
STATISTICAL CARD PUNCH
Filed Oct. 7, 1936  47 Sheets-Sheet 39

INVENTOR
W. W. LASKER
BY W. A. Sparks
HIS ATTORNEY

July 19, 1938.    W. W. LASKER    2,124,178
STATISTICAL CARD PUNCH
Filed Oct. 7, 1936    47 Sheets-Sheet 40
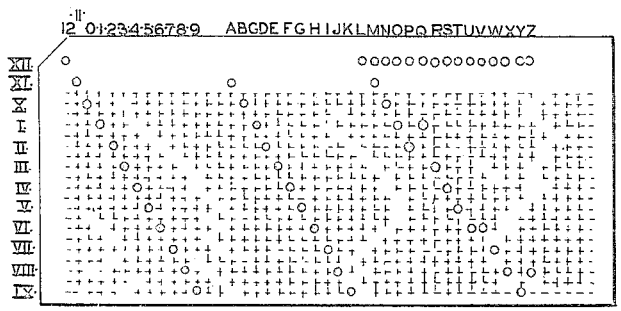
Fig. 49
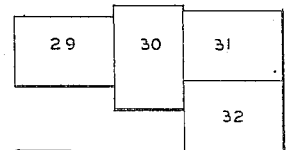
Fig. 51
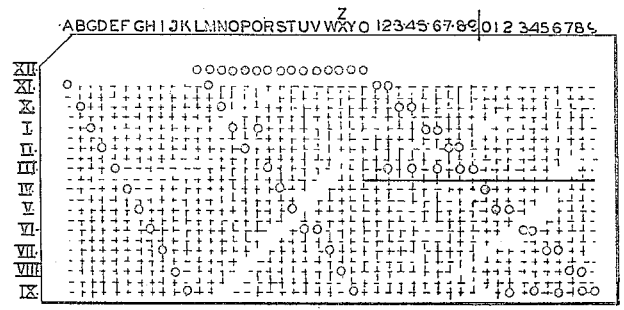
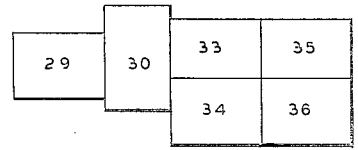
Fig. 52
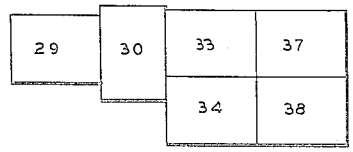
Fig. 53
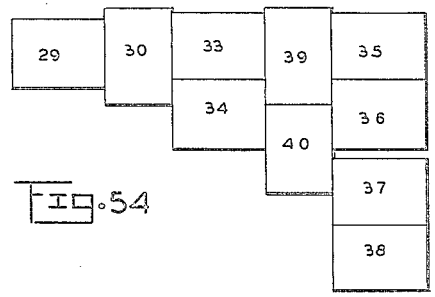
Fig. 54
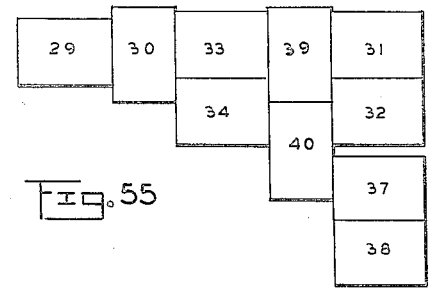
Fig. 55
INVENTOR
W. W. LASKER
BY *W. A. Sparks*
HIS ATTORNEY July 19, 1938.　　　W. W. LASKER　　　2,124,178
STATISTICAL CARD PUNCH
Filed Oct. 7, 1936　　　47 Sheets-Sheet 41

INVENTOR
W. W. LASKER
BY *W. A. Sparks*
HIS ATTORNEY

July 19, 1938. W. W. LASKER 2,124,178
STATISTICAL CARD PUNCH
Filed Oct. 7, 1936 47 Sheets-Sheet 43

INVENTOR
W.W. LASKER
BY W. A. Sparks
HIS ATTORNEY

July 19, 1938.  W. W. LASKER  2,124,178
STATISTICAL CARD PUNCH
Filed Oct. 7, 1936  47 Sheets-Sheet 44

INVENTOR
W.W. LASKER
BY *W. A. Sparks*
HIS ATTORNEY

July 19, 1938.  W. W. LASKER  2,124,178
STATISTICAL CARD PUNCH
Filed Oct. 7, 1936  47 Sheets-Sheet 45

INVENTOR
W. W. LASKER
BY H. A. Sparks
ATTORNEY

INVENTOR
W. W. LASKER
BY *H. C. Sparks*
ATTORNEY

July 19, 1938.   W. W. LASKER   2,124,178
STATISTICAL CARD PUNCH
Filed Oct. 7, 1936   47 Sheets-Sheet 47
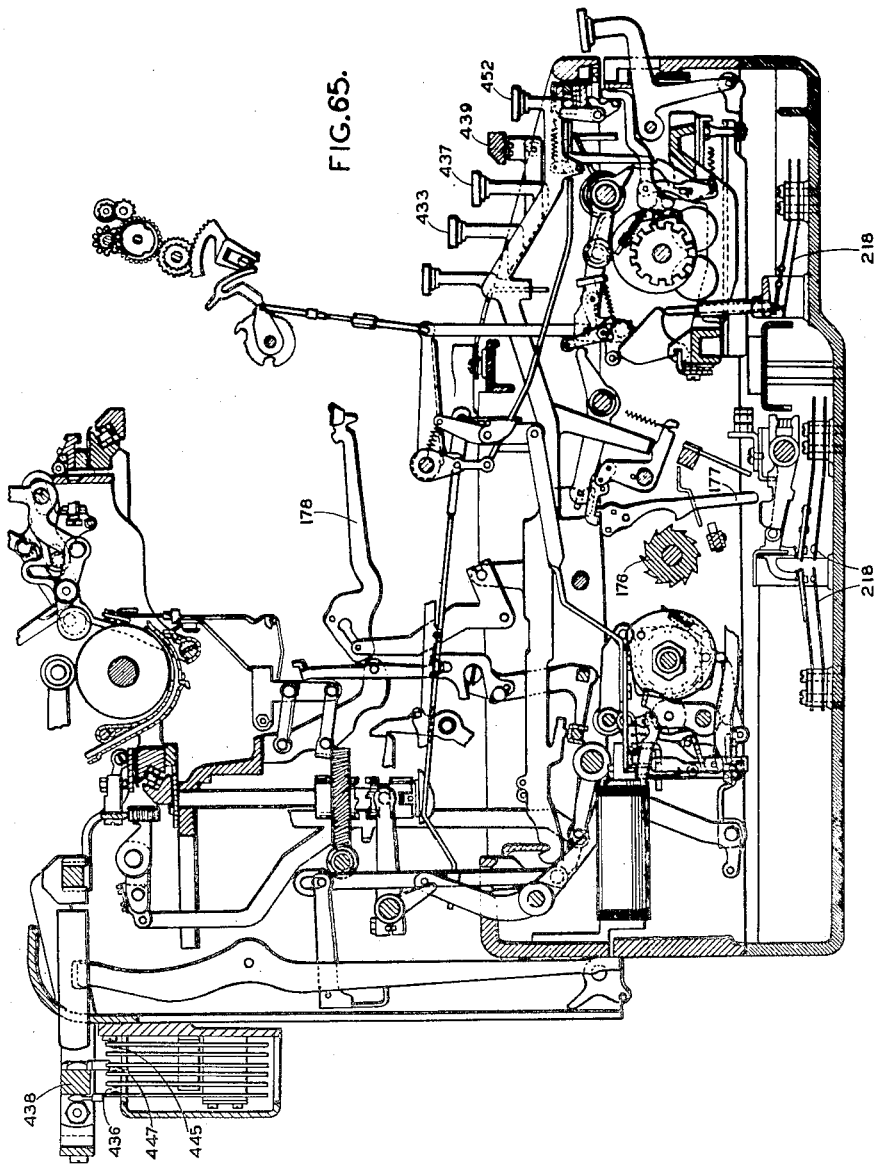
INVENTOR
W. W. LASKER
BY
ATTORNEY Patented July 19, 1938

2,124,178

UNITED STATES PATENT OFFICE 2,124,178

STATISTICAL CARD PUNCH

William W. Lasker, Brooklyn, N. Y., assignor to Remington Rand Inc., Buffalo, N. Y., a corporation of Delaware Application October 7, 1936, Serial No. 104,391

48 Claims. (Cl. 164—113)

This invention relates to the punched card type of tabulating machinery, and specifically to the punching mechanism for preparing the tabulator cards; and it is particularly concerned with improvements in the gang punch mechanism for the preparation of punched cards.

The gang punch records the data upon the cards in a manner comparable to the manner in which a typewriter records it; that is, the operation of keys controls the impressing into the cards of insignia, in the form of perforations, according to the data items to be recorded. This insignia can then be sensed by other mechanism, such as the tabulator, for the production of a printed record or transcription, and a summary, of the data indicated on the cards. However, up to the present, the gang punch has lacked many of the conveniences of operation which have been provided for the typewriter, and an aim of the present invention is to improve the gang punch by the addition thereto of mechanism for the performance of functions analogous to those of the typewriter, and others of such a character as to permit of entire control of the punch from a typewriter keyboard, including such desirable functions of operation, as a single-column set-up-clearing or "erasing" mechanism; a skip key mechanism; mechanism for the return of the set-bar actuating carriage to an intermediate stop; a key-controlled mechanism for transfer between upper and lower card zones (or upper and lower "lines" on the card); a single numeric and alphabetic keyboard for both the upper and lower card zones of the multi-unit code as well as for the single unit code; a carriage backspace mechanism adapted if desired to clear or erase the set-up in the column to which the carriage is returned, and to avoid interference by the erase mechanism with the intermediate stop mechanism, a transfer switch, to punch data in various zones and codes from one keyboard; mechanism for dividing the card into zones, to increase its record capacity; and also the various conveniences for card punching control in the various desirable forms, such as key-controlled means for punching the card without return of the carriage at that time; key-controlled means for returning the carriage without punching the card and with or without clearing of the set-up bars; key-controlled means for return of the carriage to the margin or to an intermediate stop and simultaneous transfer of the recording key connection from one card zone to the other; key-controlled mechanism for punching two cards from each set-up and distributing them into different card receiver pockets and mechanism for saving a given set-up, from card to card, and for resetting it when desired. There is also provided mechanism for the continuous operation of the punch to produce a considerable number of identical cards, followed, when the desired number is obtained, by a carriage return, and clearing of the set-up.

The invention provides in addition interchangeability of keyboards, and a keyboard whereby operation in upper and lower card zones may be obtained from a single set of keys with a transfer switch, or by a group of special keyboards, such as a group having one keyboard for single unit code punching, and two additional keyboards, one for multi-unit code punching in the upper zone, and another for multi-unit code punching in the lower zone.

The invention also includes convenient and advantageous circuit connections to typewriter-key-controlled contacts, connecting them in parallel with the punch key contacts, for alternative operation with the normal punch keys, and for parallel operation of several punching mechanisms, whereby the punch may be operated from, and synchronously with, a standard typewriter, such as a Remington bookkeeping machine. The invention is particularly adapted to this purpose, because of the fact that substantially all of the typewriter controls, such as backspace, etc., are duplicated in the punch, and special operations of the punch are not required in the ordinary course of the punching of cards from the typewriter controls.

The invention further provides interlocks, and cooperating mechanism to insure proper sequences of operations, synchronism between typewriter and punch operations, and non-interference between various operations which may be simultaneously initiated.

The Powers gang punch for the operation of preparing tabulator cards is a well known instrumentality, which has been in use over a period of more than twenty-five years, during which time it has undergone an extensive series of changes, modifications and improvements, all of which are significant and pertinent to the present invention. This development, or evolution, is shown in the following patents, which are cited as cross references herein to show the structure to which the present invention is applied.

In its present state of commercial development, the characteristic method of operation of the gang punch involves the utilization of a single die, which is movable by power and cooperates with a group of individual punches, there being customarily 540 punches, and 540 holes in the die to cooperate with the punches, these being arranged in 45 columns of twelve each. Above the individual punches there is positioned a set-bar field containing a similar number of set-bars, which when latched down, will prevent upward movement of the punches when the die is raised and thereby the card, which is placed upon the upper surface of the die, is punched by being driven against the held punches. Above the set-bars there is a key-operated setting carriage which depresses the desired set-bars, column by column, in succession as the successive items of the data to be recorded are indicated on the keyboard. The punching of all of the holes is accomplished by a single movement of the die as distinguished from the so-called "hand-punch" by which the data to be recorded is punched in the card, column by column, according to the desired data record. The very substantial advantage is obtained by this characteristic that much more accurate relative spacing of the data perforations is obtainable than is possible by a hand punch.

An early, detailed showing of the gang punch is to be found in Patent No. 992,245, which shows the single die, the plurality of punches held in a suitable frame, power means for raising the die and a superposed card up to the punches, and columns of keys having tails positioned over the punches with locking means for holding a key and its tail depressed to drive the punch through the card when the die is raised.

One of the outstanding advantages of the gang punch, as shown even in this elementary form, is the accuracy of spacing between the several punchings in the card, which is found to be very advantageous when the card is used in the tabulator, since it avoids many errors which otherwise occur because of incorrect spacing.

A companion Patent No. 992,246, shows the card feeding and card positioning mechanism in the form which is still in use in present day punches and is a part of the present disclosure, with only minor changes in detail.

A single column of setting keys, as distinguished from a complete set of keys for every column to be punched in the card, is for many reasons desirable, and Patent No. 1,138,314 shows a gang punch having a movable carriage with a single column of keys carried thereon, spaceable over the punch field, the same set of keys being utilized to set lockable blocking members or set-bars which, in turn, drive the punches through the card when the die is raised. Improvements on this form of carriage set-punch, with the single column of set-keys placed in a stationary position on one side of the machine (as distinguished from a mounting directly on the punch carriage) is shown in Patent No. 1,287,706, direct connection being had between the keys and the setting members in the carriage through the agency of Bowden wires. This punch carriage, with minor modifications, is still in use and is a part of the machine of the present invention. A foot power operated punch with a different form of key control and a more rugged form of set-up-bar-locking-slide is shown in Patent No. 1,299,022, the locking slide and its releasing members being generally similar to those in use at the present time. Various improvements in the setting carriage and escapement are shown in Patent No. 1,305,556. Still further improvements in the carriage and its mountings are shown in Patent No. 1,307,682, many of these improvements also being utilized in the machine of the present invention. Still further improvements in the setting carriage and its controls are shown in Patent No. 1,311,565, and a more rugged set-bar-locking-slide system is shown in Patent No. 1,311,566. It may be observed that in these earlier machines the setting carriage was returned to the starting position by hand, involving a somewhat undesirable manual operation, even though one which is still common with typewriters. Patent No. 1,643,779 shows a power-operated mechanism, key-controlled, for the return of the setting carriage to start position, mechanism which with minor changes is a part of the machine of the present invention.

In the course of the development of the gang punch, the desirability of a supplemental control of the punch from a typewriter keyboard was realized, and the system developed for this purpose is shown in Patent No. 1,682,451, the basic circuit and mechanism of which are also part of the machine of the present invention. Further improvements in this same system are shown in Patents Nos. 1,684,001, 1,790,479 and 1,843,772. A carriage return for the gang punch was developed, as shown in Patent No. 1,684,546; and also a backspace mechanism was developed as shown in Patent No. 1,798,610, the backspace mechanism with various changes being a part of the machine of the present invention. Still further improvements in the carriage-return mechanism are shown in Patent No. 1,807,627, some of these improvements also being significant in connection with the machine of the present invention. Substantially the present commercial form of the gang punch is shown in Patent No. 1,868,111, this patent showing, however, only a single keyboard for single unit code punching, but showing the current form of carriage-return mechanism, carriage backspace, and also a mechanism for punching two identical cards, and delivering them into different card receiver pockets. A convenient and desirable form of card-position indexing members is shown in Patent No. 1,883,985, and a mechanism for the repeated punching of identical cards is shown in Patent No. 1,883,986, together with an indication of the commercial form of the gang punch and the control circuits prior to those of the present invention.

Still further details of this mechanism are shown in Patent No. 1,985,101, including circuit improvements and an improved "trip two" card mechanism.

It may be noted that the gang punches shown in these prior art patents are adaptable only to the preparation of cards punched according to a single unit code,—the so-called Powers 45-column code.

A further improvement on the punch, to cause it to operate according to a multi-unit code in upper and lower card zones—the so-called 90-column system—is shown in Patent No. 2,044,707, issued June 16, 1936, to William W. Lasker. This system was further developed in the manner set forth in Patent No. 2,044,708, issued June 16, 1936, to William W. Lasker.

Many of the details of the punch mechanism hereinafter referred to and particularly the mechanism for interconnecting and operating one or more punch mechanisms by a typewriter mechanism are described and disclosed in the application of W. W. Lasker et al., Serial No. 635,186, filed September 28, 1932

These prior art patents are incorporated herein for the purpose of showing the structure to which the present invention is applied, and a substantial portion of the parts, assemblages, and combinations set forth in these cross references are incorporated in the machine of the present invention, together with the additional members and combinations which form the specific invention hereinafter claimed.

Thus, an object of this invention is to operate a punch from a typewriter for the successive preparation of groups of cards having common subject matter therein without resetting in the punch the common subject matter for each successive card in a given group.

Another object is to operate all of the necessary controls of a gang punch from a typewriter keyboard.

Still another object of the invention is to operate a plurality of punches from a single typewriter keyboard without interference between the several punches.

Still another object is to record data in a plurality of zones on a data card from a single keyboard.

Still another object of the invention is to transfer a keyboard connection from the setting means for one card zone to the setting means for another card zone.

Still a further object is to record full column data on a card from a set of keys, and alternatively to record data in upper or lower zones on the same card in a different code from the same keyboard.

A still further object is to erase from each card column any prior data setting which may occur therein before setting a new data item therein.

A further object is to retain the data in a punch setting for a predetermined field, through the setting and punching of several cards and thereafter to erase the data in that field and reset new data independently of the ordinary field clearing procedure.

A further object is to set data on a gang punch mechanism for the recording of data items according to several codes and in several fields and zones from a single keyboard, and to control all of the punch operating functions from the same keyboard.

A still further object is to provide in a gang punch mechanism responsive to all of the controls in a typewriter.

Another object is to divide the gang punch field into upper and lower zones to group the set-bar members for punching in separate zones independently, and to provide a transfer-switch whereby a single keyboard may be used to set up set-bars in either zone.

A further object is to control a plurality of zones of set-bars alternatively from a single numeric keyboard and to control both zones of set-bars by a single alphabetic keyboard, provision being made to exclude control by the alphabetic keyboard when the numeric keyboard is operative on one zone.

Still another object of the invention is to skip the punch carriage over a plurality of columns in independent upper and lower zones; and to control the skip operation alternatively from a single key through a transfer switch, or from a plurality of different keys.

Still a further object is to control the punch by a key for the operation of punching a card without other action, that is, a perforate a card without return of the setting carriage and without clearing of the previously set punches.

An additional object of the invention is to return the punch setting carriage to the starting point without punching a card, either without clearing the previously set up punches or with clearing of the previously set punches.

Still an additional object is to return the setting carriage to the starting point or to an intermediate stop position without clearing previously set up punches, and without punching a card, and simultaneously to actuate a transfer switch for the setting of punches in another zone, and to provide for the setting of additional punches in the second zone from the same keyboard from which the first punches were set.

A further object of the invention is to space the carriage for the inclusion of a space in separate card zones of the card producing the spacing from a single space key, determining the zones for which the spacing occurs by means of a transfer switch.

Another object of the invention is to return the carriage to an intermedaite stop and simultaneously actuate a transfer switch preparatory to setting the punches in another zone on the card.

A still further object is to return the carriage alternatively to an intermediate stop or to the left hand margin of the card, and cancel the setting of all of the previously set up punches, without punching a card.

Still a further object of the invention is to erase the setting of punches in single columns, to erase such setting either in a full column of the card or in an upper zone or a lower zone, as desired; and to erase any residual settings in an upper field, a lower field, or full column, prior to and as a part of the setting therein of new data.

Still another object is to retain a preselected setting in certain portions of the card through the setting up and perforating of a number of successive cards and to correct the setting of data in these preselected fields by the procedure of erasing single column items, and thereafter resetting new data therein by the single operation of single keys.

Still a further object is to punch two cards from a single setting of the punch, distribute the cards into separate pockets and clear the punch setting after the punching of the second card, independently of the prior punching of an odd or even number of cards.

Still another object is to set up data in full columns, or partial column card zones, punch therefrom a substantial number of cards, more than two, and return the carriage to the starting point with clearing of the set-up after the last card of the desired number.

Still another object is to provide a backspace operable in connection with full-column punch setting or upper- and lower-zone setting from a single key, and backspace either with or without erasing of the set-up in a column to which the backspacing moves the carriage.

A further object is to connect to a single punch a plurality of different and differently operable keyboards, alternatively, or in parallel.

Still another object is to actuate a punch carriage simultaneously with a typewriter carriage, in synchronism with all of the typewriter carriage functions and operations.

Another object is to set-up a gang punch for several lines or zones of data on a single card under automatic control from a typewriter, the several lines or zones on the card being automatically distinguished by the operation of keys in the typewriter.

Still another object is to set punches for data in a plurality of fields, alternatively, from a single keyboard through a transfer switch, to control the transfer switch automatically from keys operated in connection with the typewriter, to indicate the position of the transfer switch automatically at the typewriter, and to control the position of the transfer switch from independent keys in a keyboard.

Thus, the present invention provides a gang punch having a single die, a plurality of punches, a punch set-bar field with lock slides, a setting carriage and actuating magnets together with an escapement for movement of the carriage along successive punch columns, a plurality of interchangeable punch control keyboards including contacts operable from a typewriter keyboard, a plurality of control keys including a space key, a plurality of erase keys, a skip key, a backspace key, keys for carriage return alone, for card punching alone, for carriage return to intermediate stop with or without the punching of a card, a key for the punching of two cards from a single setting of the punch, a cancel key, a carriage return key, a trip key, a key for control of the intermediate stop, a key for the punching of substantial numbers of identical cards, a set of numeric keys, a set of alphabetic keys, a transfer switch, relays for the control of the transfer switch, a set of punch actuating magnets and relays, and connections between the several keys and magnets including connections for the setting of alphabetic data from the alphabetic keyboard, connections for the setting of numeric data in full column form, or in upper and lower zone multi-unit code form from independent keyboards or from a single keyboard under the control of the transfer switch, circuits for the control of the transfer switch from keys having other functions, and connections from a typewriter keyboard for actuating the punch under strict correspondence and synchronism with the actuation of a typewriter keyboard and mechanism.

Other objects and structural details of the invention will be apparent from the following description when read in connection with the accompanying drawings, wherein:

Fig. 5 is a front view in vertical section of the several clutches.

Fig. 6 is a development view of the commutator segments.

Fig. 7 is a view in isometric projection of the setting carriage, showing the escapement mechanism, the set-bar actuating rods, the setting levers, the erase levers, and the backspace rack and pawl, as well as a portion of the skip bar.

Fig. 8 is a view in isometric projection of a portion of the setting carriage and set bar field showing particularly the set-bars, the latch pins, the retract roll and the clearing or retract lever system.

Fig. 9 is a view in isometric projection of the control system for the clearing or retract mechanism.

Fig. 9A is an enlarged, fragmentary, detail view illustrating the release of set bars by operation of the erase mechanism.

Figs. 10, 11, 12 and 13 are side views, partly in section, of the carriage and erase mechanism showing the successive positions of the mechanism for an erase operation.

Fig. 14 is a side view of a fragment of the set-bar field showing the relationships of the set-bars, and the set-rods and the erase slides.

Fig. 15 is a top view of the set-bars and erase slides of Fig. 14.

Fig. 16 is a view in isometric projection of the carriage return control and backspace control.

Fig. 17 is a view of the contact members of the carriage return mechanism.

Fig. 18 is a view of the skip bar mechanism including the skip levers, and contact springs for the control magnets.

Fig. 27 is an end view of the transfer switch, showing the contact springs, frame and magnets.

Fig. 28 is a diagram of the contact springs showing their functions.

Figs. 29 to 40, inclusive, are the several sheets of wiring diagrams, which together make up the complete wiring diagram of the invention.

Figs. 41 to 48, inclusive, are analysis diagrams of the several circuits for the specific punch functions.

Fig. 49 is a view of a punched card showing the 45-column code for alphabetic and single unit numeric data.

Fig. 50 is a view of a punched card showing the alphabetic code and the "90 column" multi-unit code for upper and lower zones.

Fig. 51 is a chart showing the assembly of the several sheets of wiring diagram figures to produce the wiring diagram for the punch with a triple-numeric keyboard.

Fig. 52 is a chart for the assembling of wiring diagram figures for the wiring diagram for the alphabet and single numeric keyboard.

Fig. 53 is a chart for the assembly of wiring diagrams for the circuit for control of the punch from a typewriter keyboard without an independent punch keyboard.

Fig. 54 is a chart showing the assembly of wiring diagrams for the circuits for parallel control of the punch from a typewriter keyboard and from a triple-numeric keyboard.

Fig. 55 is a chart showing the assembly of wiring diagram figures for circuits to control the punch from a typewriter, and an alphabet and single numeric punch keyboard in parallel.

Figure 56:
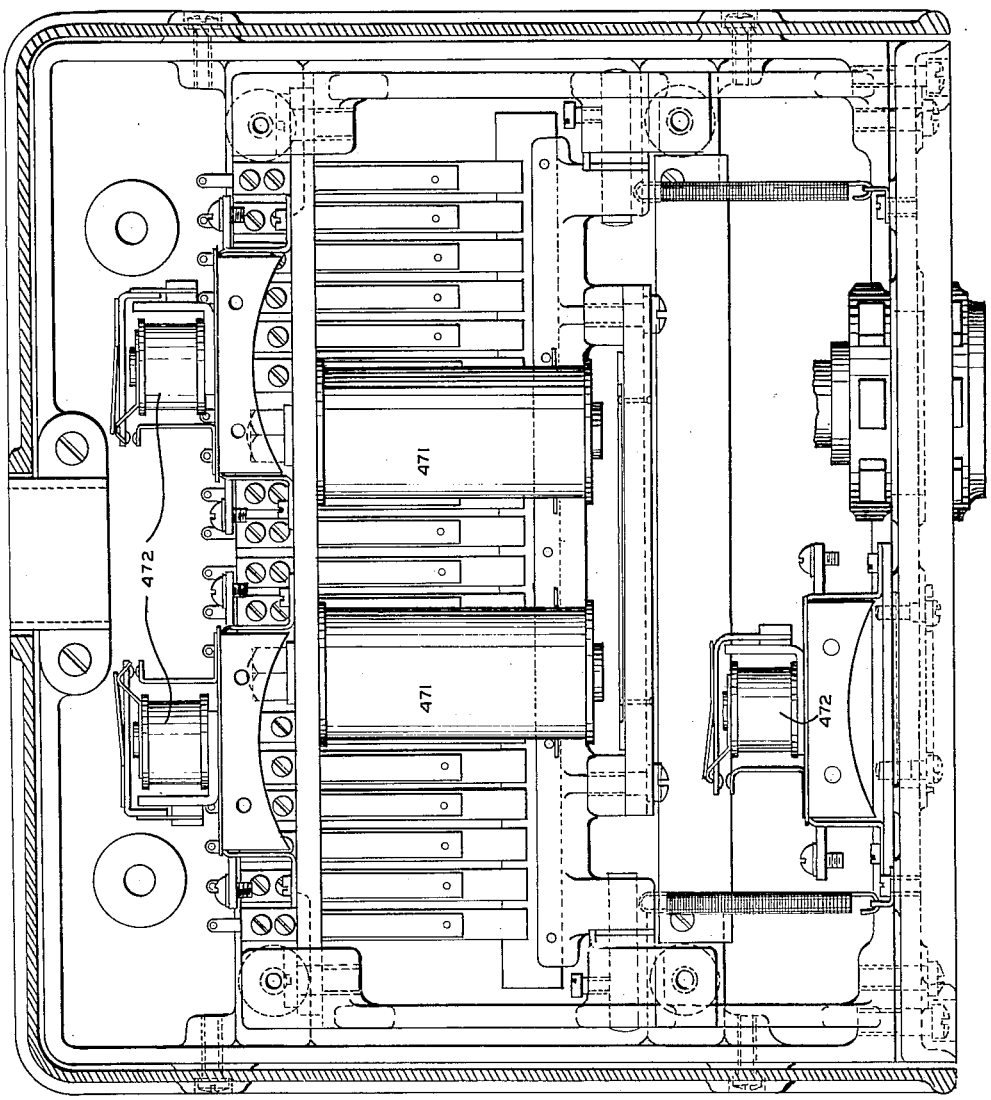

Fig. 56 is a side view of an alternative form of transfer switch.

Figure 57:
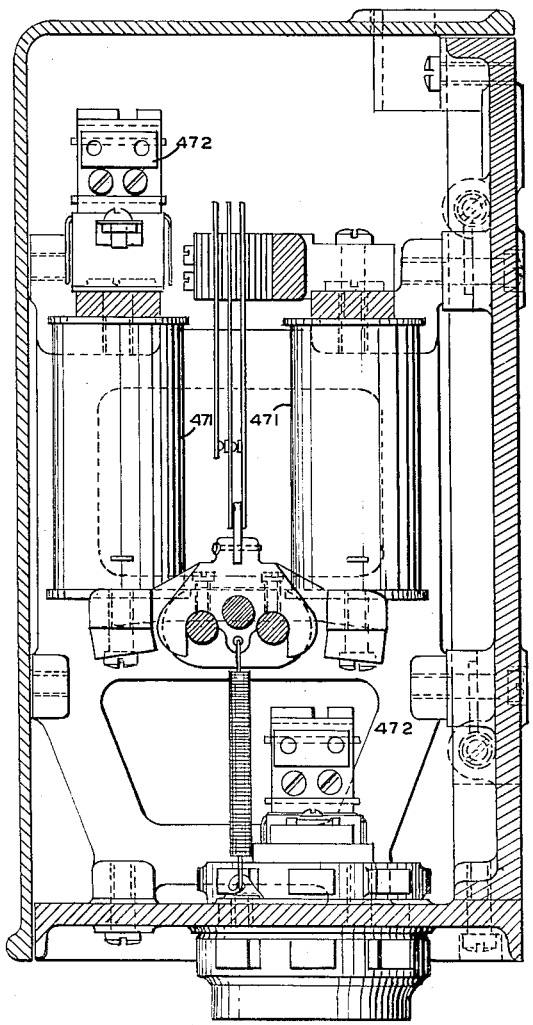

Fig. 57 is an end view of the same alternative form of transfer switch.

Figure 58:
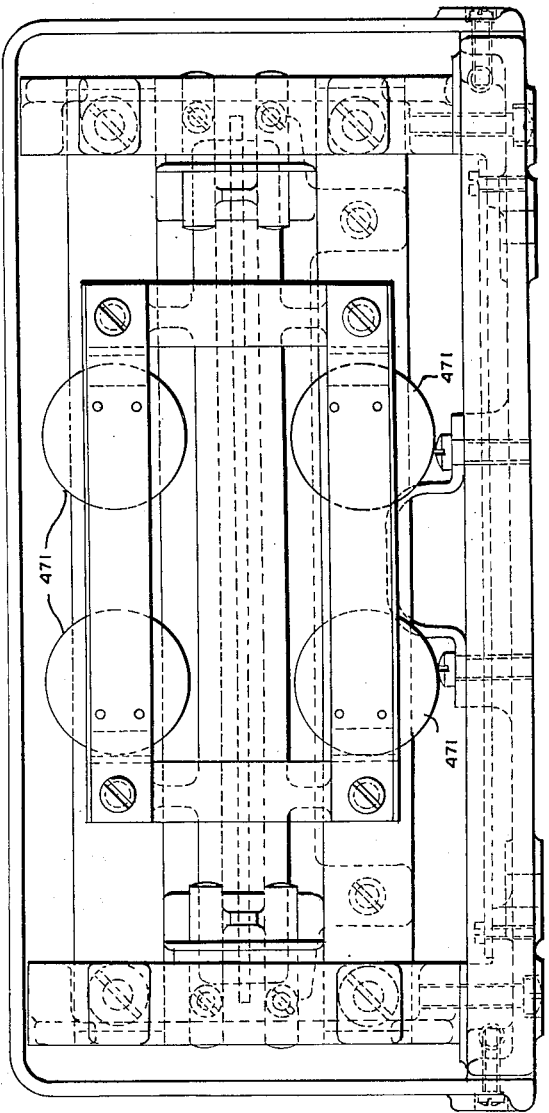

Fig. 58 is a top view of the same alternative form of transfer switch.

Figures 59, 60:
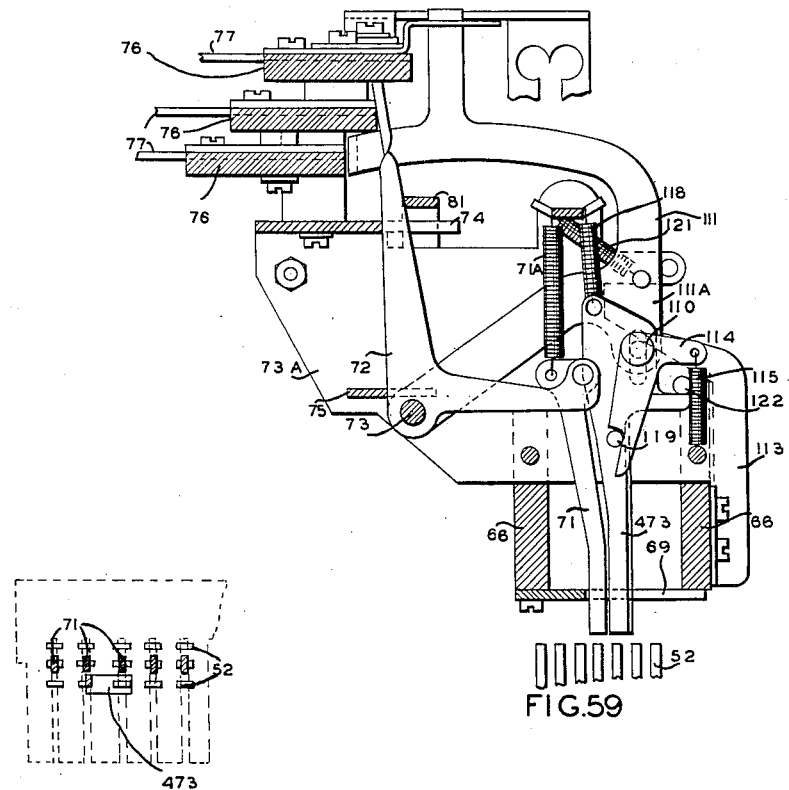

Fig. 59 is a side view of an alternative form of erase mechanism, and

Fig. 60 is a top view of a fragment of the set-bar field, showing the relation to the set-rods and erase slides.

Figure 61:
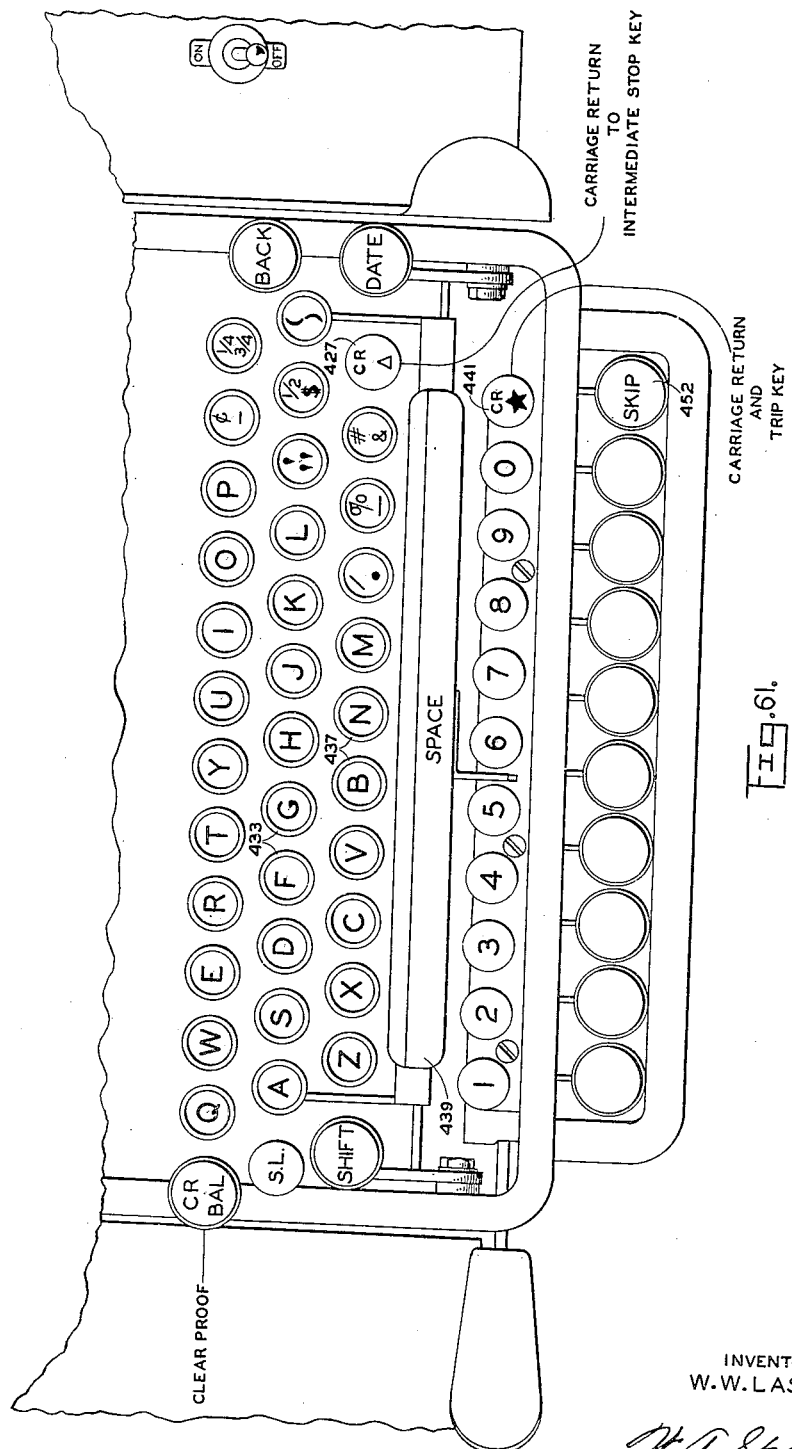

Fig. 61 is a plan view of a bookkeeper keyboard.

Figure 62:
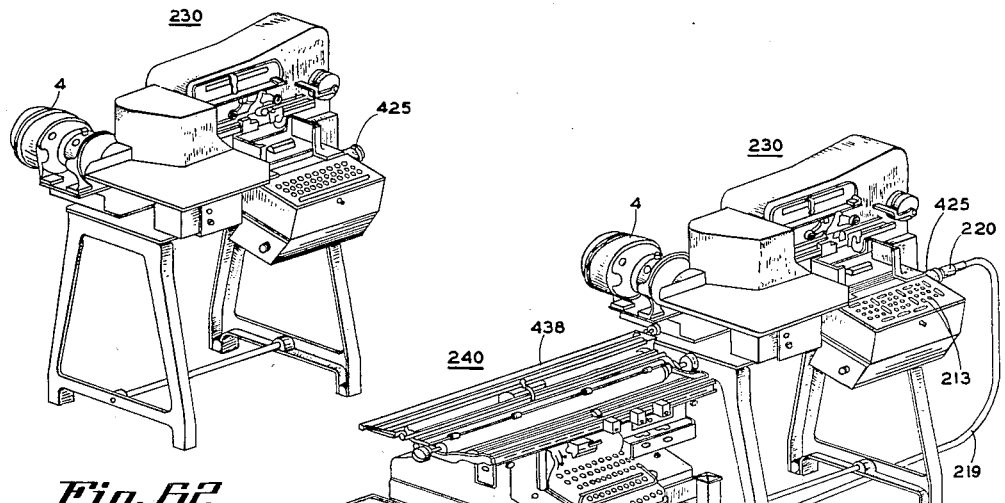

Fig. 62 is an isometric view of a punch having an alphabet and single numeric keyboard.

Figure 63:
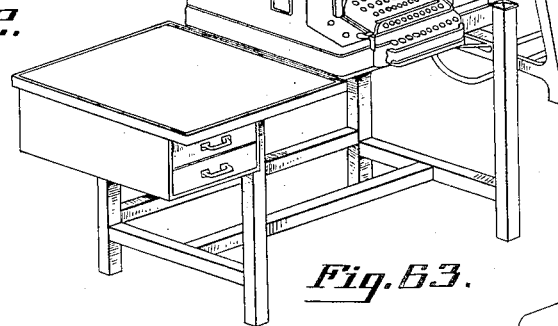

Fig. 63 is an isometric view of a bookkeeper connected to a punch having a triple numeric keyboard.

Figure 64:
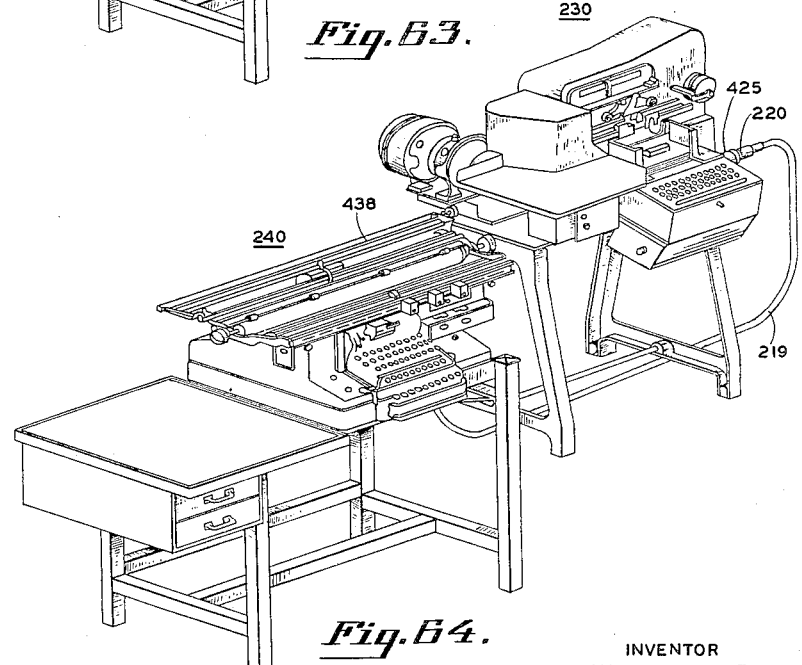

Fig. 64 is an isometric view of a bookkeeper connected to a punch having an alphabet and single numeric keyboard.

Fig. 65 is a cross section through the typewriter mechanism showing the key contacts and control bar.

*General punch assembly (Figs. 1, 2, and 3)*

The complete structure of this punch mechanism may be regarded as made up of several cooperating groups of members. These groups of members are; the frame and the driving mechanism, as shown in Fig. 2; the die with its 540 openings, the gang of 540 punches cooperating with the die, together with the die operating mechanism, the punch guides, and the card-handling mechanism; the group of set-bars for holding the selected punches to effect card perforating when the card and die are driven toward the punches, together with the latch slides and the retract or clearing mechanism; the setting carriage, with its several operating mechanisms; the magnet system, and Bowden wire connection to the carriage; the carriage backspace and carriage return mechanism, including the backspace rack and operating magnet, the carriage return stop bar and operating magnet, and the actuating clutches; the several interchangeable keyboards; the relay group; the transfer switch; the circuit connections; and the typewriter key controlled contact system.

*The frame and driving mechanisms (Figs. 1, 2, 3, and 4)*

Figure 1:
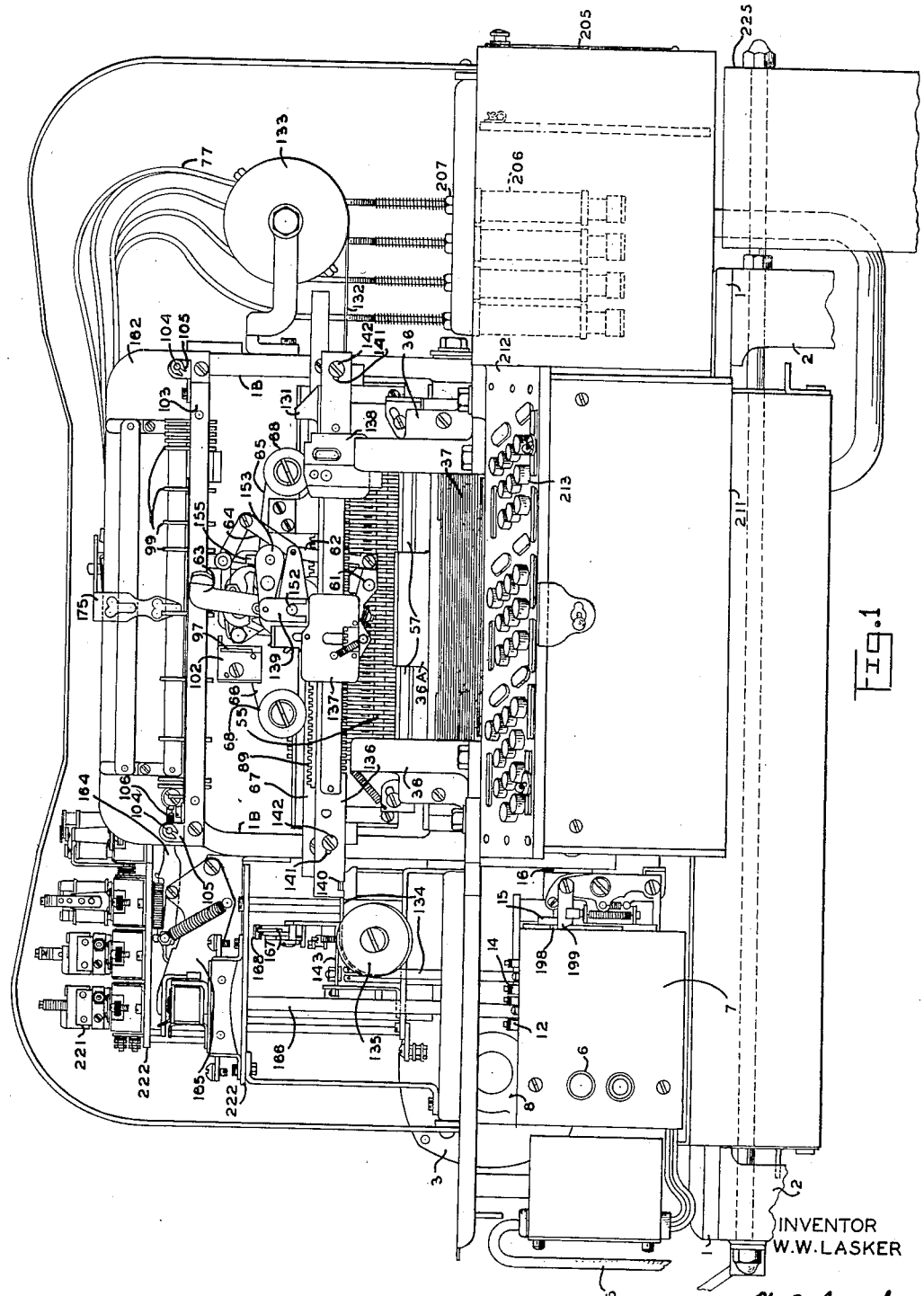
Fig. 1 is a view in front elevation of a punch mechanism according to this invention (with the covers shown in section).
Figure 2:
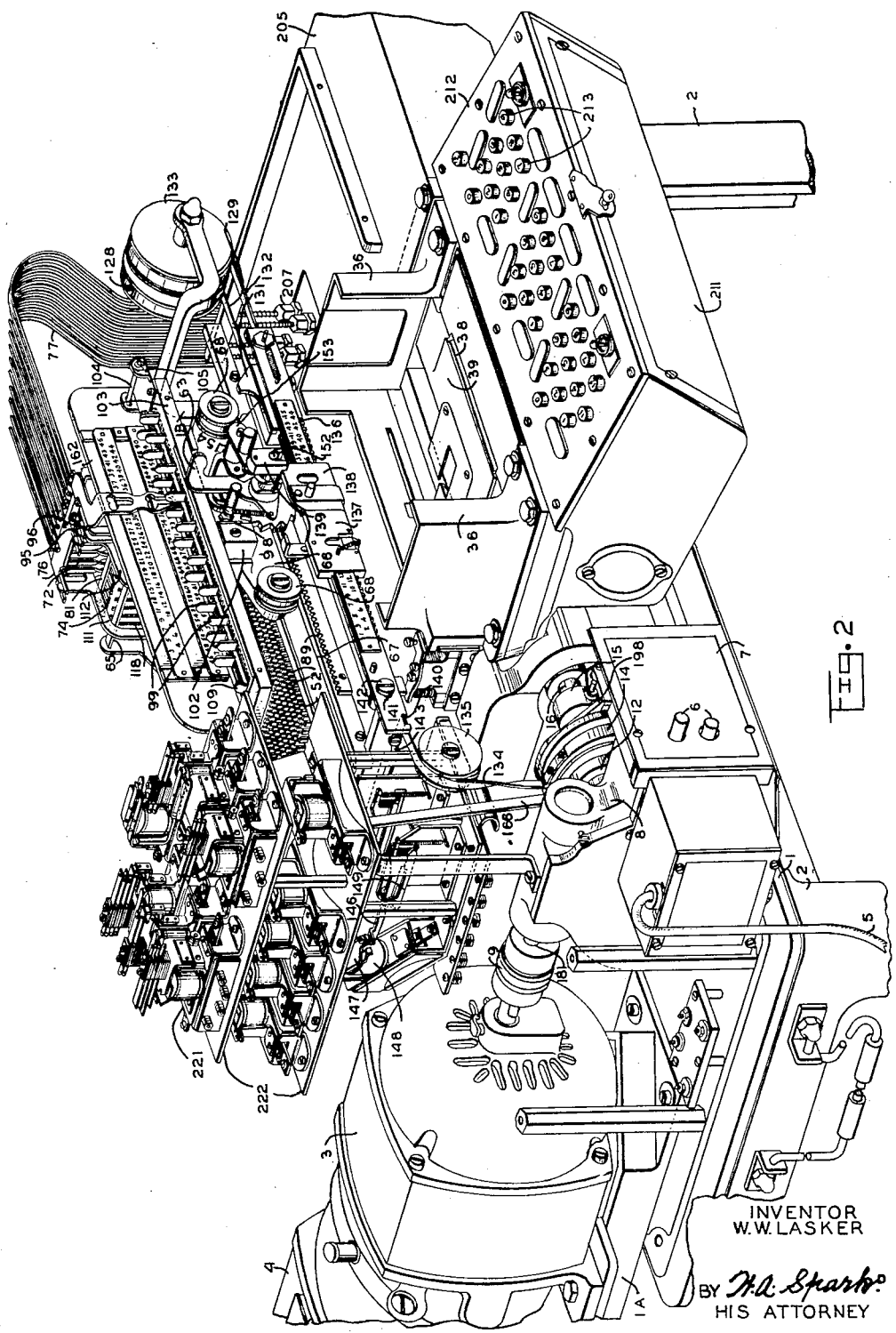
Fig. 2 is a view in isometric projection of the punch mechanism of this invention with the covers and part of the table portion removed and omitting the blank cards to show the picker.
Figure 3:
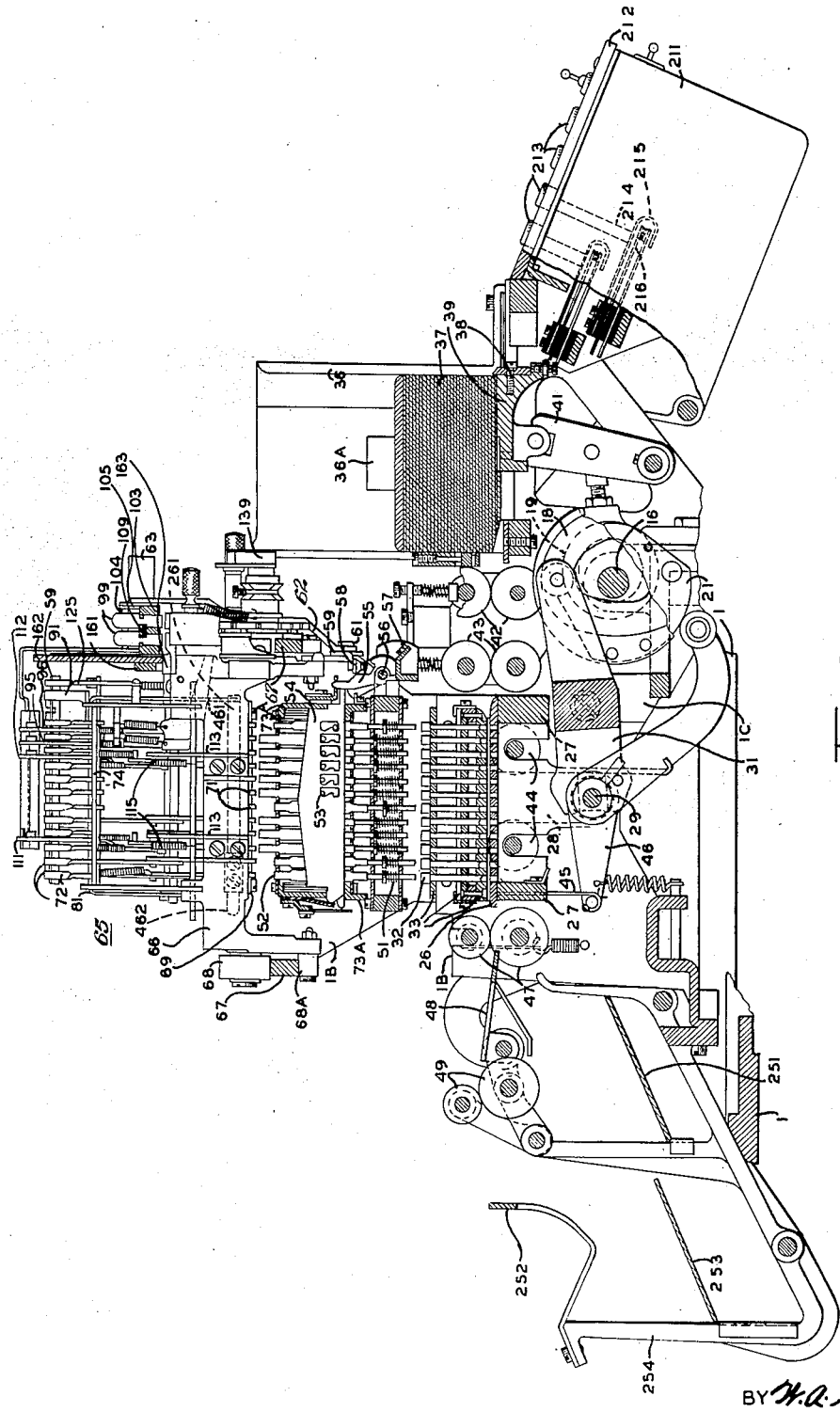
Fig. 3 is a side view in vertical section of the punch of the invention.
Figure 4:
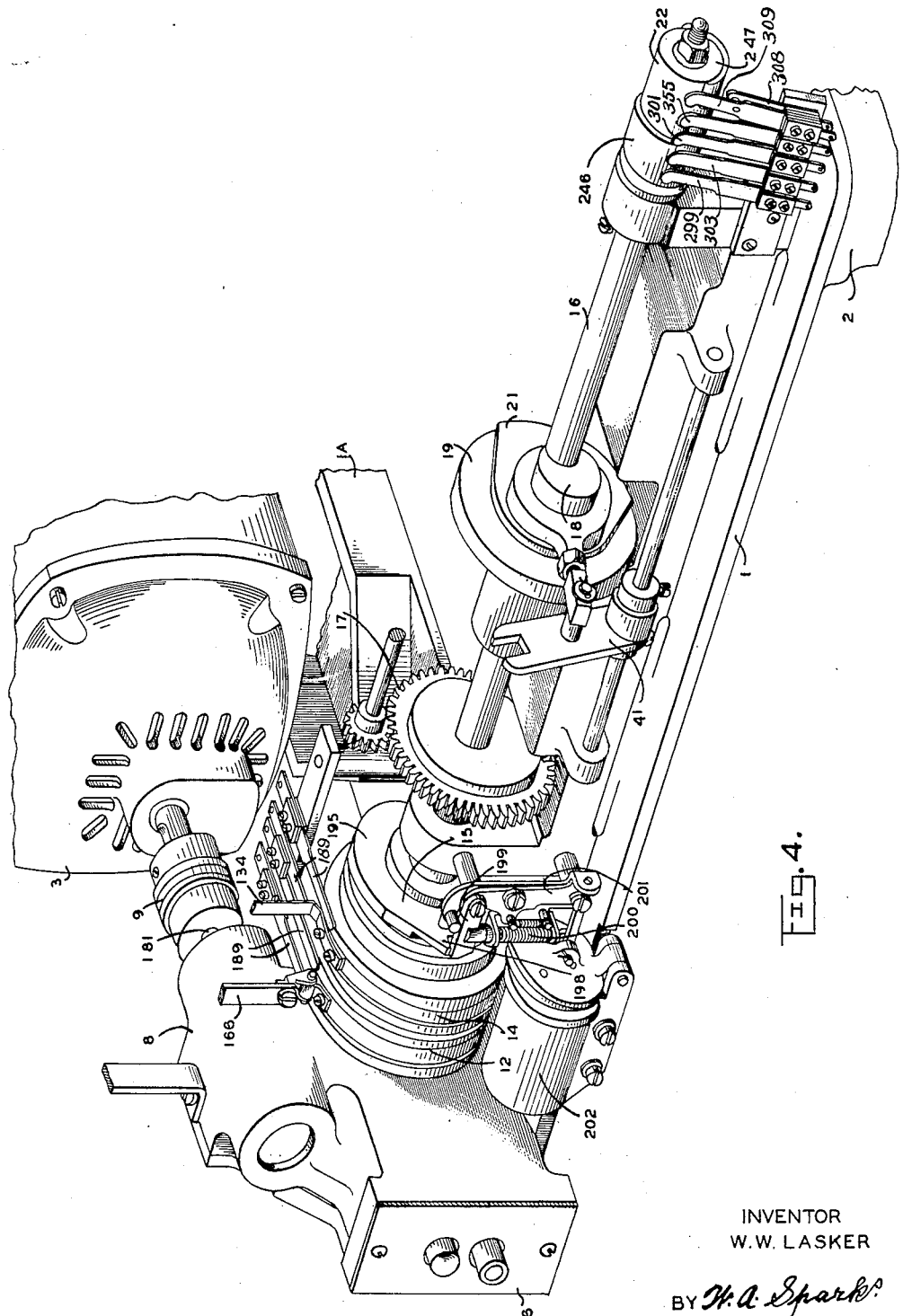
Fig. 4 is a view in isometric projection of the frame, the motor, the reduction gearing, the punch shaft, the backspace and carriage return magnetic clutches, the punch shaft clutch and the magnetic trip member, the card feeding cam, the punch cam, the card stop cam and the commutator.

As is shown in particular detail in Figs. 1 to 4, inclusive, the various punch mechanism members are mounted upon a frame member 1, which is supported by legs 2, which bring the main frame 1 of the punch at a convenient height above the floor for access by an operator. The main frame 1 has mounted thereon a driving motor 3, to which is connected a generator 4, these two members being mounted upon a sub-frame 1a, as shown in Figs. 2 and 4, to take care of the overhang of the generator beyond the rear edge of the main frame 1. The motor 3 is customarily a single phase, 60 cycle motor, having a rating of about ¼ H. P. at 1750 R. P. M., since the usual power supply from which small motors are operated is the 60 cycle alternating current. However, where other forms of power supply are used, a suitable type of motor is substituted.

Coupled to the motor 3 there is provided a generator 4 which is preferably wound for about 18 volts direct current. This generator supplies the power for the actuation of the various punch operating and control magnets and relays in response to the closure of the various key contacts.

The motor 3 is equipped, as is customary, with a flexible wire connection cord 5 for power supply. A switch 6 and fuses in the fuse box 7 are connected between the power supply cable 5 and the motor 3. The motor is coupled to a worm-and-gear speed-reduction mechanism 8 as is particularly well shown in Figs. 2, 4 and 5, through a flexible coupling 9. The gear ratio is desirably about an 18 or 20 to 1 reduction, so that the output speed of the reduction gear is a little under 100 R. P. M. The reduction gear drives a sleeve 11 upon which are mounted the clutches 12, 14 and 15, as is particularly well shown in Figs. 4 and 5. The clutch 15 drives the punch shaft 16 upon which there are mounted the several driving members for the various punch operating mechanisms. These include the gear 17 which drives the card-handling mechanism, the cam 18 which drives the card picker knife mechanism, the cam 19 which operates the die for the actual punching operation, the cam 21 which operates the card stop 45, and the commutator 22 which controls certain of the punch actuating functions. This shaft and associated mechanism is carried upon bearings as shown in Fig. 4, which are provided with appropriate lubrication members.

*The die and punches (Fig. 3)*

Above the base member 1 there are positioned a pair of upright frame members 1b, as is particularly shown in Figs. 1, 2, 3, 7 and 16, between which, and upon which, are mounted various members of the punch mechanisms.

As is shown in Fig. 3, the die plate member 26 is carried between the upright frames 1b upon bearer rails 27, which, in turn, are attached to the tie members 28, which slide upon upright guides attached to the frames 1b. (These guides are not shown.) The members 28 have an interposed cross bar 29, as shown in Fig. 3, to which is attached the die operating lever 31, which is pivoted near its middle on a bracket 1c mounted on the frame 1. This lever 31 has on its other end a follower roll cooperating with the cam 19 as shown in Fig. 3. The cam 19 is a box cam, and accordingly, the lever 31, and with it the die plate 26, are positively moved to raise the die plate and to positively pull it downward in an accurately vertical movement under the control of the guides in the frame members 1b.

Above the die plate 26 there are mounted the punches 32, there being a punch 32 for each of the holes in the die plate 26, customarily 540 in number. As shown in Fig. 3, these punches consist of rods having the diameter of the desired punched hole, with enlarged heads (the heads having flat spots on opposite sides to permit the use of relatively larger heads than the spacing of the punches in each column would otherwise allow, this feature preventing undesired rotation of the punches). The punches 32 are carried in three guide plates 33, the uppermost guide plate 33 being attached to the frames 1b, the two lower guide plates 33 being attached to the tie members 28, to move with them. Thus, the lowermost plate 33 forms a stripper plate and, together with the die 26, forms a punching chamber for the reception of the cards. As is shown in Fig. 3, when the machine is in normal stopped position, with the die at the bottom of its travel, the punches are withdrawn into the body of the lower plate 33, thereby leaving the punch chamber free and unobstructed for the reception of a card to be punched.

*The card feeding mechanism (Figs. 1, 2, 3, 4 and 23)*

Figure 23:
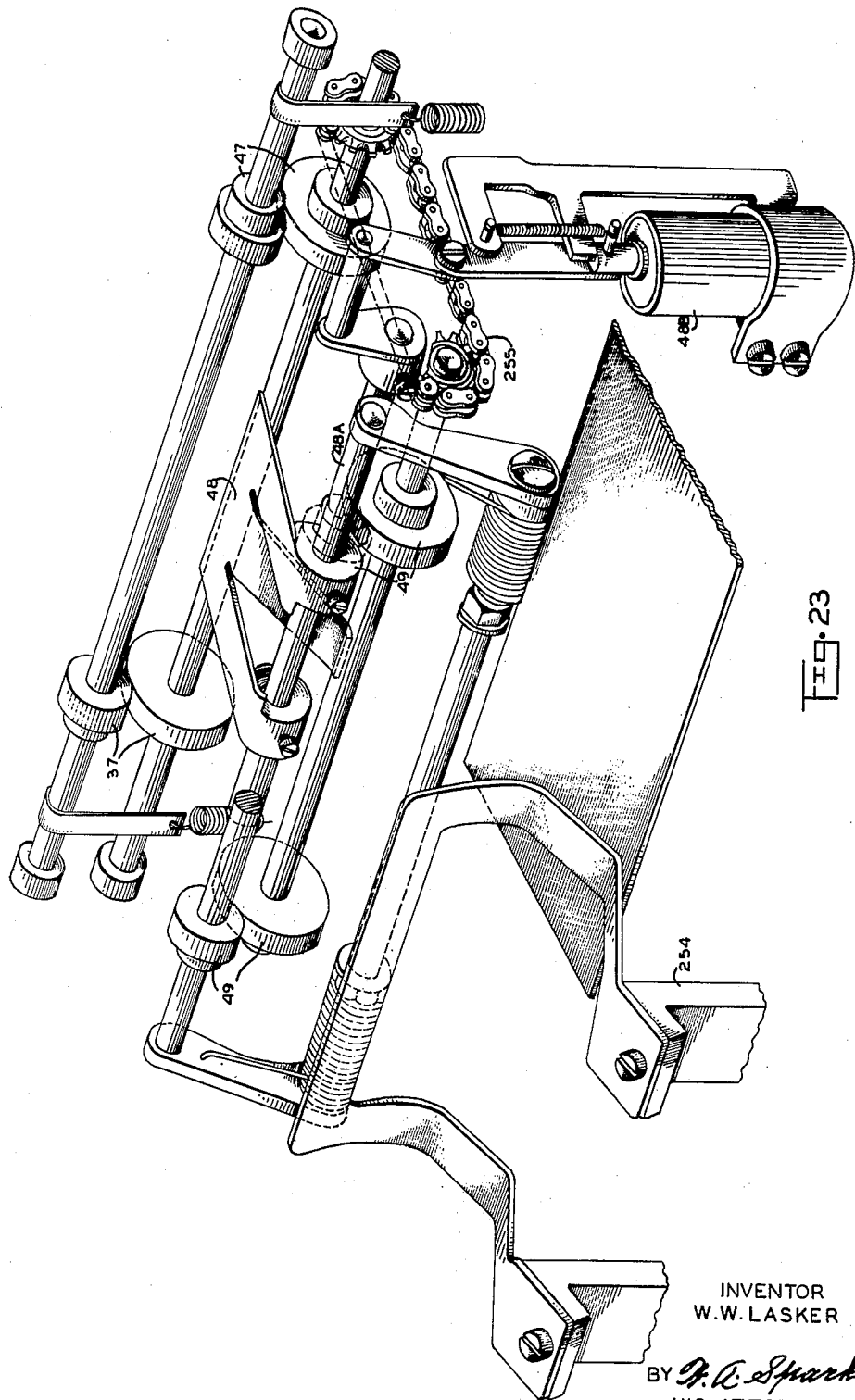
Fig. 23 is a view in isometric projection of the mechanism for sorting two identical cards into separate pockets.

In order to supply cards to the punching chamber, and remove them to the receiver, a card feeding mechanism is provided. This consists of a magazine 36 for the reception and storage of a supply of fresh, unpunched, cards 37, which are placed therein before the punching procedure is begun. The cards 37 usually have placed upon the top of the stack a weight 36a, as shown in Figs. 1 and 3, the weight 36a being a customary part of the supply magazine. The bottom-most card of the stack is caught and fed forward by a picker knife 38, which is mounted upon a picker knife plate 39. The plate 39 and the picker knife 38 are operated by a lever 41, as shown in Figs. 3 and 4, which is connected to the picker cam 18, which, in turn, is driven from the punch shaft 16. Movement of the punch shaft thus actuates the lever 41 and oscillates the plate 39 and knife 38 to advance the bottom card towards the first pair of feed rolls 42 (Fig. 3), which, are driven through a suitable train of gears, as shown in the cross reference patents, from the gear 17. The rolls 42 receive the card and advance it to a second pair of rolls 43 which, in turn, advance the card into the punching chamber over the die plate 26, where the card is caught by the skid rolls 44 and carried up against the card gate 45. The skid rolls 44 are positioned at the extreme opposite ends of the die plate 26 and operate in conjunction with an upper pair of rolls, (which are not shown) carried upon the edges of the guide plates 33. These various card feeding rolls are operated only during a punching cycle, since the punch clutch 15 is ordinarily engaged only during one revolution for a single punching cycle, to punch a card, discharge it, and feed in a fresh card. The card gate 45 is controlled by the gate lever 46 which, in turn, is controlled by the cam 21. When the card gate 45 is lowered, the card is advanced by the skid rolls 44 to the discharge rolls 47, from which it is conveyed past the gate 48 either into the forward card receiver pocket as shown in Figs. 3 and 23 or to the auxiliary rolls 49 and from then into the rear card receiver pocket. The card gate 48 is mounted upon a shaft 48a which is controlled by a "receiver shift" magnet 48b.

*The set bars (Figs. 3, 7, 8, 9, 10, 11, 12 and 13)*

Above the field of punches 32 there is provided a field of spring raised interponent members 51 as is particularly well shown in Figs. 3 and 8, these being carried between plates as shown, which, in turn, are mounted upon the cross bars shown.

Above the field of spring interponents 51 there is provided a field of set-bars 52, which are raised by the spring interponents 51. Each set-bar is equipped with a latching pin 53 as is particularly shown in Figs. 3, 8 and 9, the pins on the set-bars of half of each column being directed towards the right and the pins in the remaining half column of the set-bars being directed towards the left. Each column of set-bars is provided with a pair of latching slides 54 as is particularly well shown in Figs. 3 and 9, each column of the set-bars 52 being interposed between a pair of latch slides 54 as is particularly shown in Fig. 9. Thus, each half of each column of set-bars is controlled and latched by its own latch plate 54, the column of set-bars thus being split into halves which are designated as upper and lower, the upper halves of all of the columns forming an upper zone and the lower halves of all of the columns forming a lower zone for the recording of separate data items in the upper and lower zones.

For each latch plate 54, there is provided a retract lever 55 (Figs. 3, 8 and 9) which is mounted upon a retract shaft member 56, and held in position by a bar 57 which is supported at its ends upon a spring-raised-member which permits it to be depressed by an operator so that the desired retract levers may be swung forward, away from the corresponding latching plates 54, to prevent a clearing or unlatching movement of the plate 54 from the retract lever 55, and thus retain upon the set-bars a given set-up of data until it is otherwise cleared or changed.

Cooperating with the retract levers 55 there is provided a retract roll 58 which is carried upon a retract lever 59, in turn pivoted upon a bearing rod 61. The lever 59 is actuated by a retract link 62, which is, in turn, attached to a manual-carriage return lever 63 and the auxiliary retract link 64, these several members being mounted on the setting carriage.

*The setting carriage (Figs. 1, 2, 3, 7, 8, 9, 10, 11, 12, 13, 16, 18 and 19)*

Above the field of set-bars 52 there is positioned a movable setting-carriage member 65 having a frame 66. The carriage is mounted upon rails 67 which also are attached between the upright sub-frame members 1b, as is particularly well shown in Figs. 1, 2 and 3. The carriage is provided with three rolls 68 which support the weight of the carriage upon the rails 67. There is also provided a guard roll 68a at the rear of the carriage underneath the rear rail, to prevent undue raising of the rear end of the carriage. Underneath the carriage frame member 66 there is provided a bottom plate 69 in the form of a comb. In the notches of the comb plate 69 there is provided a column or row of set-bar setting-rods 71 as is particularly shown in Figs. 3, 7 and 10. These setting-rods are drawn upward by a spring member 71a and they are pivoted to the horizontal arms of the elbow shaped setting levers 72. It will be observed that the springs 71a are attached to the set-rods 71 at a point to one side of the pivot attaching them to the set levers 72, thereby drawing the set-rods 71 both upwards and against the bottom of the slots in the comb plate 69.

This feature is provided to permit movement of the carriage without damage either to the set-bars 52 or the set-rods 71 in case the set-rods are not raised before the carriage is spaced forward to the next column. The set levers 72 are carried upon a cross shaft 73, which is mounted between end plates 73a which, in turn, are attached to the carriage frame members 66. Comb plates 74 and 75 are also provided, and mounted upon the end plates 73a to space the setting levers 72 in a uniform rank, there being twelve set-levers 72, and twelve set-rods 71 to cooperate with the twelve set-bars 52 in each column. The upper ends of the set-levers 72 are positioned adjacent the edge of the middle support member 76 to which the Bowden wires 77 are attached. These several lever and rod members thus serve for the depression of the set-bars 52 to permit them to be latched by the latch plates 54.

*Spacing mechanism (Figs. 2, 3, 7, 8, 10 and 18)*

Adjacent to upper ends of the bank of set-levers 72, there is provided an inverted U-shaped space bail 81 which is pivoted upon the same shaft 73 as the set-levers 72. The lower end of the space bail carries a follower roller which cooperates with a cam surface in the space lever 82, as shown in Fig. 18, to depress the lever. The space lever 82 rotates a sleeve 83 to which the escapement lever 84 is fastened. Upon the same sleeve 83 there is journaled an auxiliary escapement lever 85, having a handle and pin member 86 for manual release of the escapement. Thus, movement of the escapement bail by any set-lever 72 moves the space bail 81, the escapement lever 82, and the sleeve 83 to swing the escapement lever 84 clockwise as shown in Fig. 18, into engagement with the escapement wheel 87. Simultaneously, the auxiliary escapement lever 85, being lifted by the tail of the lever 84, permits a forward movement of the escapement wheel 87 of sufficient amount to bring the top of an escapement tooth under the auxiliary escapement lever. Then, upon return of the bail and levers to the original position, the tooth caught by the lever 84 is released, and a successive tooth is caught by the auxiliary lever 85. The escapement wheel 87 is journaled upon a shaft 88 and attached to an escapement gear cooperating with the escapement rack 89.

This mechanism serves for spacing the carriage when a set-bar is depressed. For spacing the carriage without depressing a set-bar, an auxiliary escapement bail lever member 91 is attached to the bail 81, which cooperates with a Bowden wire 77 leading to the space magnet. This permits of actuation of the escapement bail and carriage spacing mechanism without actuation of any of the set-levers 76, to space over a column (in full column field, or zone field) without depressing a set-bar.

*Skip mechanism (Figs. 1, 2, 3, 7, 16 and 18)*

In addition to the single column spacing mechanism, as above described, there is also provided a "skip mechanism" to permit of movement of the carriage over several columns, to a pre-determined position. This mechanism is shown in Figs. 1, 2, 3, 7, and 16, and in skeleton perspective in Fig. 18. Since different "skip destinations" and skip stopping points may be required for fields in the upper zone and in the lower zone, portions of the skip mechanism are provided in duplicate, respectively for the upper and lower zones, the upper zone skip mechanism being utilized also for skip operation in full column numeric or alphabetic setting, thus requiring only two skip mechanisms for the three characters of punch setting operations. As is shown in Fig. 18, the skip mechanism consists of a pair of levers 95 and 96 mounted upon the same shaft 73, which carries the setting levers 72 (see Fig. 10). The levers 95 and 96 are actuated by Bowden wires 77 and respectively serve to operate the respective skip stop levers 97 and 98. These levers, respectively, cooperate with the stop tabs 99. The skip stop levers 97 and 98 are journaled upon a bearing pin 101, which is mounted in the frame of the carriage as shown in Fig. 8. The skip stop levers 97 and 98 are backed up by a stout block 102, attached to the carriage frame 66 as is particularly well shown in Figs. 1, 2 and 7, to take the shock of the stopping of the carriage. The stop tabs 99 are mounted in two rows in the skip bar 103, which is carried upon bracket rods 104. These, in turn, are mounted upon the upright frame members 1b. The bearing rods move in slots in the end brackets 105 and a spring 106 tends to draw the skip bar 103 towards the left. The skip stop levers 97 and 98 are provided with fingers which extend towards the right underneath the handle and pin member 86 of the escapement and when a forward end of a skip stop lever 97 or 98 is raised, the projecting finger, operating underneath the pin 86, elevates the auxiliary escapement lever 85 to free the escapement wheel 87, the lever 84 not being depressed by operation of the escapement bail. Accordingly, the escapement is freed, and the carriage is free to move to the right until a stop lever 97 or 98 engages a stop tab 99. At the left end of the skip bar 103 there is attached a contact lever 107 which operates the skip control contacts 108. The stop tabs 99 are notched at the side and are held by a castellated rod 109, which can be moved to the left to register the notches therein with the stop tabs 99 to permit withdrawal and insertion of the tabs. These several mechanisms are controlled by magnets and relays from key contacts which are later described in connection with the control circuits.

*Erase mechanism
(Figs. 2, 3, 7, 10, 11, 12, 13, 14 and 15)*

Under certain operating conditions, such for instance as in the preparation of cards for less than carload lots of freight in freight accounting, or cards for a sale of a number of items under a single order number, or to a single customer, it is desirable that the card number, or the order number, or the customer's name should be set up at the time the set-up for the first card is prepared and should remain unchanged through the successive set-ups for items in that car, or items in that sale, or to that customer. In order to obtain this effect, the retract levers 55 for the field in which the car number, or order number, or customer's name is set are turned down, away from the latch bars 54, and out of the path of the clearing roll 58. Thus, when the carriage is returned for a new card setting this data field is not cleared, but the setting is retained for the next card, until changed by another means.

It will be evident that when a new set-bar is depressed, the movement of the new set-bar downward causes its latch pin 53 to push the latch plate 54 sidewise far enough to permit unlatching of any other set-bar pin or pins 53 from the latch nose in the latch slide 54. This sidewise movement of the latch slide 54 thus will release any other previously set set-bar or set-bars and permit it or them to be raised by the spring interponent 51. Thus, if a new set-bar 52 is depressed, any previous setting of the set-bars will be released and cleared. This operation will clear some settings, but it is not sufficient to insure clearing of all previous set ups for the following reasons: The set bar column is divided into halves with two latch plates 54 to each column, a new set-bar depressed in the lower zone portion of a column will move only one latch plate 54, and if, in a full column setting, as for the customer's name, a set-bar was previously latched in the upper half of the column, it will not be released by the setting of a new set-bar in the lower half of the column. Similarly, the second half of the alphabet is indicated by the latching down of the "XII" set-bar. Thus, if the letter N was indicated in the old setting by depression of the "XII" and "X" set-bars, and the letter B is to be recorded for the new setting, actuation of the setting lever 72 and setting rod 71 of the "X" set-bar for the B will not release the "XII" set-bar since the "X" set-bar is already latched down and consequently there is no movement of the latching slide. Similarly, in the upper and lower zone numeric setting, if the old number was an even number, as indicated by the setting of a set-bar and with it the "III" and "IX" set-bars, and the new setting is one digit smaller, requiring the same set-bar without the "III" set-bar or the "IX" set-bar, no new set-bar is depressed to clear the old setting. This situation will be evident upon inspection of the codes as shown in Figs. 49 and 50.

Accordingly, an erase mechanism is provided to insure clearing of the previous set-up, as is particularly shown in Figs. 10, 11, 12 and 13. The erase mechanism provides means for depressing two set-bars, in a combination not used in the code set in the card, far enough to move the latch slide 54 to the point of releasing any latched set-bars, but not far enough to latch either of the two partly depressed set-bars. Thus, at least one of the set-bars will serve for the desired release no matter what data is recorded. As shown in Fig. 9A, the set-bar 52 operated by the erase mechanism may be depressed to the extent shown without being locked by the co-acting lug of the latch slide 54. As this set-bar 52 moves to this position, its pin 53 moves latch bar 54 from locking position (indicated by dotted lines), to releasing position. The exact extent of depression of this set-bar 52 is not critical, the range of safely effective release being indicated by the dot-dash lines a and b. While only one set-bar 52 is shown in this view, there are two which are operable by the erase mechanism, either or both of which may be depressed thereby to the extent shown, according to whether one or both are in elevated position at the beginning of an erase operation. This erase mechanism consists of a pair of levers 111 and 112, the lever 111 serving for upper zone erasing, the lever 112 serving for lower zone erasing, and the two levers together serving for full column erasing. These levers also are journaled upon the shaft 73, and each lever has an appendage 111a and 112a as is particularly shown in Figs. 10 to 13, inclusive. Each appendage 111a and 112a has therein a pin member 110 by which the levers 111 and 112 are guided in slots in the guide members 113 attached to the carriage frame 66. Each erase lever 111, 112 also has journaled on the pin 110 carried by the appendage end, a swinging lever 114, to which is attached a spring 115, the other end of which is anchored to the carriage frame 66. There is also provided an erase slide rod 116, for each erase lever 111, 112, which has a forked lower end 117 adapted to cooperate with two adjacent set-bars 52. The erase slide rod 116 is guided at the bottom in the comb plate 69 and at the top by the guide member 113 and is drawn upward by a spring 118. Attached to the erase slide 116 is a pin 119 which cooperates with the shoulder on the lower end of the swinging lever 114.

Figure 10:
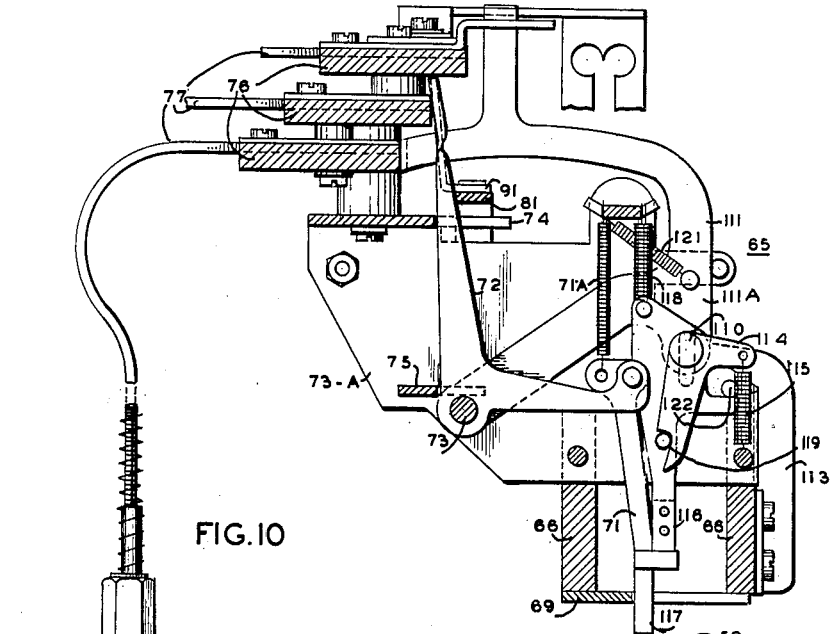
Figure 11:
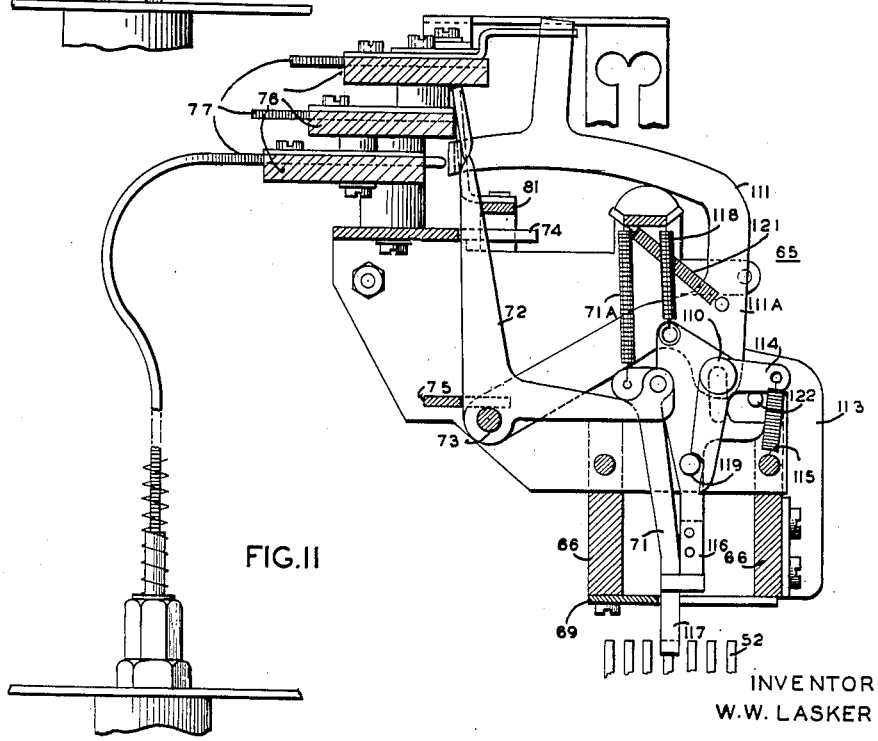

Springs 121 are also provided to draw the levers 111—112 upward against a limit pin 122, which limit pin 122 also cooperates with the lever 114 to swing it counter-clockwise away from the erase slide pin 119 at a mid point in the travel of the levers 111 and 112. This is shown in the successive positions of the lever 111 in Figs. 10, 11, 12 and 13. Fig. 10 shows the lever 111 in its uppermost position with the lever 14 engaged with the pin 110 ready to depress the erase fork 117 on to the set-bars 52. Fig. 11 shows the lever 111 partially moved to bring the lever 114 against the limit pin 122, and the swinging of the lever 114 away from the pin 110 has begun. The erase forks 117 thus have been depressed sufficiently to carry downward a pair of the set-bars 52, (in the upper zone the "X" and "I" set-bars; in the lower zone, the "VII" and "VIII" set-bars) sufficiently far to bring the latch pins 53 of these bars opposite the latch nose of the latch slides 54, thereby moving the latch slides 54 to the left to release any previous set-up. It will be observed that no setting in any of the codes used requires either pair of these set-bars to be locked down at the same time, and, accordingly, even though one of either pair of set-bars is latched down, the other is up, available for the erase action.

Continued movement of the lever 111 causes the lever 114, by engagement with the limit pin 122, to swing entirely away from the erase slide pin 119, leaving the erase slide 116 and the erase block 117 free to rise under the urge of the spring 118 as shown in Fig. 12, thereby releasing the partially depressed set-bars. This action takes place very quickly by the action of the erase magnets through the appropriate Bowden wires 77. This operation occurs as shown in these three figures if merely the erasing action is produced for a given column. When a set-bar is to be set, the same operation occurs, and simultaneously, the desired set-lever 72 and set-rod 71 are actuated for the setting of the desired set-bars, as is shown in Fig. 13, which shows a set-lever 72 and set-rod 71 in fully depressed position with the erase slide in released position, as occurs after the erase operation is completed, but the digit key is not released. There is no interference between the erase mechanism and the set-levers 72, because of the fact that the erasing fork 117 is positioned between the set-rods 71 as is shown in Figs. 14 and 15. This erase action is controlled by relays and circuits which "draw-through" the erase relays to supply current to the key contacts.

It will be observed that there is no mechanical cooperation between the erase levers 111—112 and the escapement bail 81, the erase levers being extended over the said bail. This construction permits of a choice by the user whereby he may select an action under which the erasing feature when it is obtained alone from the key does not space the carriage, or by the inclusion of a relay, the space magnet may be energized by "drawing-through" the relay for the current supply to the erasing contacts.

*Retract or clearing mechanism (Figs. 1, 3, 8 and 9)*

Figure 45:
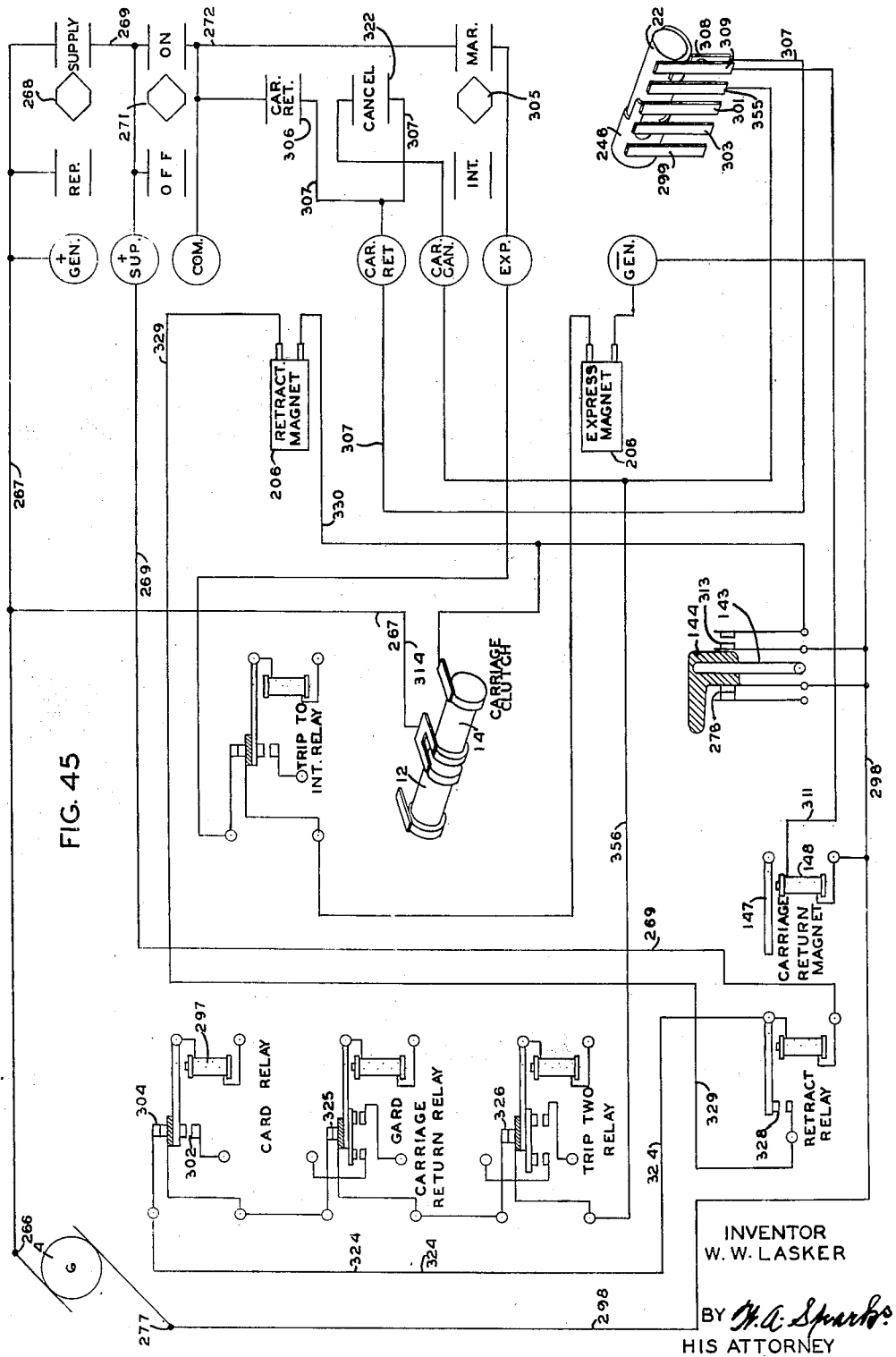

The carriage and its contained mechanism serves for the setting of set-bars in successive columns, through the agency of the Bowden wires 77 and the magnets, circuits and keys associated therewith, during the successive escapement spacing of the carriage from left to right. At the end of the setting operation, the punch shaft clutch is engaged and the card punched. Thereafter, the carriage is returned to the left-hand margin of the set-bar field as hereinafter described. The set-bars having served the purpose of causing the punching of the desired data into a card, it is usually desirable that the set-up be removed from the set-bar field preparatory to the making of another set-up for the punching of another card. A convenient point in the cycle of operations at which to clear the set-bar field is during the time of return of the setting carriage from the right-hand margin of the set-bar field to the left-hand margin. This clearing operation is accomplished by the mechanism shown in skeleton outline in Fig. 9 and in Figs. 1, 2, 3 and 8. As previously pointed out, the set-bars are held in latched position while the card is moved against the punches when the die plate is raised, by the latching action between the pins 53 on the set-bars, and the latch plates 54. In order to release and destroy any given set-up, it is merely necessary to move all of the latch plates 54 controlling that set-up to the left far enough to permit the latching pins 53 to escape from the latch nose in the slides 54. This is accomplished through the agency of the retract levers 55 and retract roll 58 as previously pointed out. The carriage has mounted thereon the retract lever 59, to carry the retract roll 58, the lever 59 being journaled on a bearing pin 61. The roll 58 on the lever 59 is normally in a raised position, above the vertical portions of the retract levers 55, and in that raised position it does not touch the retract levers 55. Accordingly, the carriage may be spaced, column by column from left to right, without any interaction between the roll 58 and the retract levers 55. When, however, the carriage is to be returned from right to left with a clearing of the previous set-up, a retract magnet 208, Fig. 45, is energized, which through the appropriate Bowden wire 77, moves the lever 125 which is journaled on a shaft 126 mounted upon the carriage frame. Movement of the lever 125 pulls the link 64 upward and with it the link 62 to rock the retract roll lever 59 in a counterclockwise direction, bringing the roll 58 into cooperation with the mid portion of the retract levers 55. When the carriage is then moved from right to left, the roll 58 pushes the retract levers 55 successively backward to move the latch plates 54 and release the set pins 53. It will be observed from Fig. 9 that the contours of the roll 58 and of the retract levers 55 are such that the roll may be engaged with the levers at any point in the travel of the carriage.

The control of the retract mechanism and the actuating magnet hereinafter described is obtained through the agency of certain keys, relays, and circuits, which are described in connection with the circuit diagram.

*Carriage return mechanism (Figs. 1, 2 and 16)*

The carriage thus has two separate and distinct types of movement during which separate and distinct functions are performed. That is, the carriage moves, column by column, toward the right for the setting of the set-bars, and towards the left for the clearing of those set-bars. The setting movements of the carriage, involving step-by-step travel towards the right, have for their source of power a spring in the drum 128 as shown particularly in Fig. 2. This spring is very much like the typical typewriter carriage spring and it serves to apply traction to a tape member 129 which is connected to the carriage frame at a convenient point. The return of the carriage is accomplished either by hand or by power from the motor 3. Hand-return of the carriage is obtained by means of the lever 63, which incidentally operates the retract roll for clearing the set-up as previously described.

For the purpose of power return of the carriage, there is provided a return hook member 131, which is carried upon a rod member parallel with the rack bar as shown in Figs. 7 and 16. To the return hook member 131 there is attached a tape 132 which, in turn, is attached to a second spring drum 133 as shown in Fig. 2. There is also attached to the return hook member 131 a carriage return tape member 134, which passes over a pulley 135 to the drum of the magnetic clutch member 14 as shown in Figs. 1 and 4. Thus, for normal setting operations, the hook 131 is brought to the right-hand end of its travel by the spring in the drum 133. When, however, the carriage return operation is required, energization of the clutch 14 pulls on the tape 134 drawing the hook member 131 towards the left and engaging it with the protruding shaft upon the carriage upon which the lever 63 is mounted, thereby pulling the carriage from right to left.

For the control of this carriage return operation, there is provided a control bar 136 as is particularly well shown in Figs. 1, 2, 7 and 16. The bar 136 has thereon two adjustable stop members, a right-hand margin stop 137, and an intermediate stop 138. These stops cooperate with an adjustable block member 139, which also is mounted upon the carriage. The control bar has at its opposite ends slots 141 which cooperate with mounting screws 142, these mounting screws being attached to the frame members 16. At the left-hand end of the control bar 136, there is provided a notch 149, which engages with a lever 143, which carries a block 144 as particularly well shown in Fig. 17, which blocks, in turn, cooperate with a contact assembly 145, composed of three pairs of contacts, as is particularly well shown in Figs. 16 and 17.

The left-hand end of the lever 143 cooperates with a carriage control latch lever 146, which is pivoted as shown in Fig. 16. The latch lever 146 is actuated by the armature 147 of the carriage return magnet 143. An auxiliary latch lever 148, pivoted upon the same shaft as the lever 146, is also provided, together with control springs, as shown. This mechanism controls the carriage return. When the magnet 143 is energized, the armature 147 is attracted, to actuate the lever 146 which thereupon allows the lever 143 to swing, and close certain of the contacts in the group 145 and open others, those closed causing energization of the carriage return clutch 14. When the carriage has returned to the desired point as indicated by contact of the block 139 against either stop on the bar 136, the bar is moved to the left, and the lever 143 is restored to its original position and latched by the lever 146, thus opening the contacts in the circuit of the clutch 14, to deenergize the clutch, and to permit the spring in the drum 133 to pull the hook 131 to the right-hand end of its travel. This mechanism thus provides for power return of the carriage to the desired point under strict control of the setting of the stops upon the stop bar 136.

In order to select the column to which the carriage is returned, the vertically projecting lock rod in the member 137 is made movable upward and downward on pins which cooperate with slots in the rod member. At the bottom of the lock rod there is provided a catch member which cooperates with the serrated lower edge of the control bar 136. Thus, by pushing down on the lever, the stop member 137 may be moved along the bar 136 to any desired position. The bar 136 is also provided with a series of indexing numbers showing the columns from 1 to 45 and the number which appears in the slot in the front of the stop 137 indicates the column to which the carriage will be returned.

*Intermediate stops (Figs. 1, 2, 7, 8 and 19)*

Figure 19:
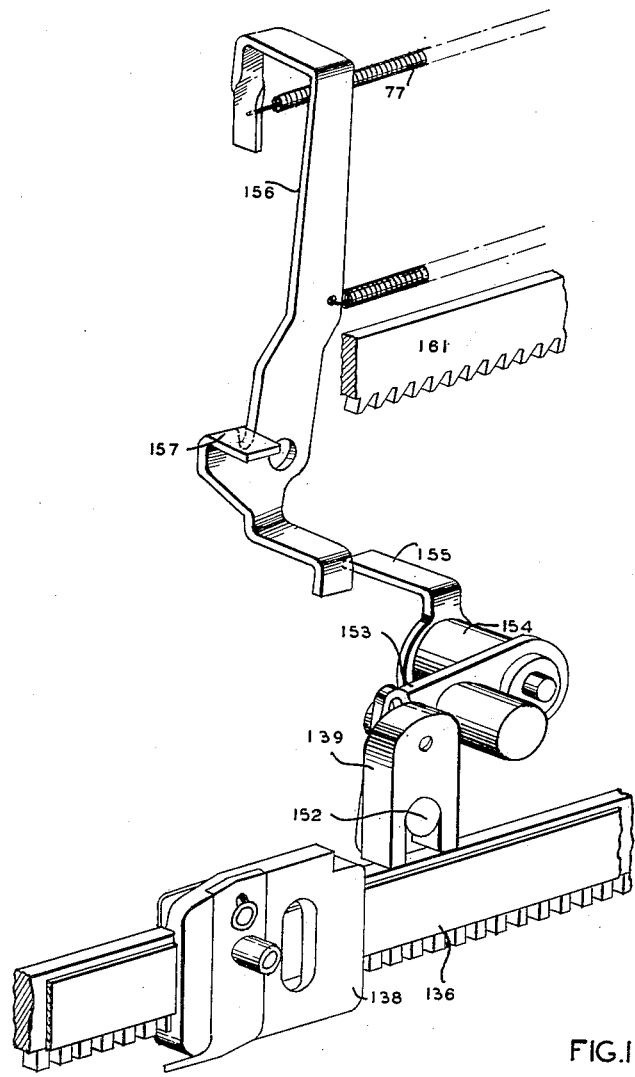
Fig. 19 is a view in isometric projection of the mechanism for the intermediate stop control device including the lever train, actuating magnet connection, etc.

The above described mechanism operates to return the carriage to the left-hand margin° of the set-bar field as determined by the margin stop 137. On some occasions it is desired to return the carriage to an intermediate position over the set-bar field. This requirement occurs particularly when the first portion of the card is to be set according to the alphabetic, or the full column numeric, code and the remainder of the card is to be set in the two-unit, upper and lower zone code as shown in Fig. 50. Under these circumstances, the setting begins at the left-hand margin and is continued through the full column matter and upper zone matter. Then the carriage is returned to a midposition at the end of the full column set matter and the lower zone setting is then continued. For this purpose the mechanism shown in the skeleton projection in Fig. 19 is utilized. This mechanism includes the auxiliary or intermediate stop member 138 which is mounted upon the carriage-return control bar 136 as is shown also in Fig. 16. This stop member likewise has a slide with a latch at the bottom, adapted to cooperate with the serrated lower edge of the bar 136 to permit the stop 138 to be positioned at any desired point.

On the front of the carriage in a position just over the control bar 136 there is mounted an adjustable stop block 139 as is particularly well shown in Figs. 1, 7 and 19. This block is in the form of an inverted U-member, which straddles the shaft 152 upon which the escapement wheel and gear are mounted. The stop block 139 is carried upon the end of the lever 153, which is attached to the sleeve 154, which, in turn, is connected to a second lever 155. The lever 155 operates with still another lever 156, which is actuated by the appropriate Bowden wire 77, which, in turn, is actuated by the corresponding "express" magnet 235. The lever 156 is mounted upon the same shaft 73 with the set levers 72. The lever 156 also has a shelf member 157 which cooperates with the backspace rack hereinafter described to insure the raising of the stop block 139 during backspacing operations to prevent interference between the backspace mechanism and the intermediate stop, thereby permitting the carriage to be spaced backward past the intermediate stop 138 when the intermediate stop mechanism is active. The circuits for the control of the intermediate stop mechanism hereinafter described raise the stop block 139 when the actuating magnet is energized either by operation of a relay, or by operation of a control switch.

*Back space*
*(Figs. 1, 2, 4, 5, 7, 8, and 16)*

Situations not infrequently occur in the operation of the punch in which it is desirable to move the carriage towards the left by a single space, as for the correction of a wrongly made set-up, or when the space key is operated by mistake, etc.; and especially, when the punch is operated from a typewriter it is highly desirable that if the typewriter backspace key is operated, the punch carriage likewise should be backspaced. For this purpose, the backspace rack, pawl, and operating mechanism are provided as is particularly shown in Fig. 16. This mechanism consists of a rack member 161 having slots in the ends which operate over bearing rods carried on members attached to the frame, as shown in Fig. 8, this pin in the present embodiment being mounted on the back of the index plate 162. Cooperating with the rack 161 is a pawl 163 which is attached to the carriage. The front edge of the pawl 163 bears against the lower edge of the index plate 162 and is spring raised to that position. The bearing slots in the backspace rack 161 hold the teeth of the backspace rack above the edge of the index plate 162, and, therefore, out of engagement with the backspace pawl when the rack 161 is advanced to the extreme right. Attached to the left-hand end of the backspace rack 161 is a link member 164 which couples the rack 161 to the backspace lever 165. This, in turn, is attached to the backspace pull rod 166, which leads to the clutch 12, as is particularly shown in Figs. 1 and 2.

The backspace lever 165 swings downward in the course of the backspacing operation, and at the bottom of its travel strikes a control lever 167 which controls a pair of contacts 168. The lever 167 is latched down by a lever 169 which, in turn, is actuated by an armature 171, which, in turn, is operated when the backspace control magnet 172 is energized. The contacts 168 are connected in the circuit of the clutch 12 and the magnet 172 is in circuit with the backspace key. Thus, when the key is operated, the magnet is energized, the latch lever 169 released to disengage the lever 167 which is spring pulled upward by the spring 173. Thus, the lever 167 closes the contacts 168, current flows in the magnetic clutch 12 and causes it to pull down on the pull rod 166, swinging the lever 165, and through the agency of the link 164 pulling the rack 161 towards the left. The contour of the slots in the ends of the rack causes the rack to move downward in the first portion of its travel, into engagement with the backspace pawl 163 and then through the remainder of its travel, to pull the carriage to the left one column, or one space. Simultaneously, the downward movement of the lever 165 at the end of its travel causes it to strike the lever 167, opening the contacts 168 to deenergize the clutch magnet and disengage the clutch. Thereupon the lower end of the lever 167 is caught by the latch lever 169 and held down while the rack and its connected members are returned toward the right by the spring 174. Thus energization of the magnet 172 by closure of the backspace key contacts, either in the punch keyboard or under the typewriter keyboard, causes the mechanism to backspace the carriage to the next preceding column. The position of the carriage is indicated by the showing of the pointer 175 on the index plate 162. This plate is marked with the column numbers from 1-90, the first 45 being in an upper row as is particularly well shown in Fig. 1, the remainder being in the lower row. The index pointer 175 is attached to the carriage, and moves with the carriage over the index graduations to show the position of the carriage, as is disclosed in Patent No. 1,883,985.

The clutches
(Figs. 1, 2, 4, and 5)

The construction of the several clutches utilized for the backspace operation, for the carriage return operation, and for the punching operation is particularly well shown in Fig. 5, which also shows the speed reduction gearing mechanism. The motor 3 drives the shaft 181 through the coupling 9, the shaft 181 being journaled in bearings in the case of the reduction gear 8. The worm 182 of the worm and gear pair is mounted on the shaft 181 and meshes with the gear 183, which, in turn, is attached by screws as shown to the backspace clutch plate 184. Attached to the plate 184 is the sleeve 11 which is journaled upon the shaft 16. The plate 184 is of iron and cooperating with it is an annular iron member 185 which is journaled upon the sleeve 11. Within the annulus there is mounted a clutch winding 186, and around the annulus 185 is an insulating ring 187 upon which are mounted slip rings 188, to which the ends of the winding 186 are electrically connected. Bearing upon the rings 188 is a pair of brushes 189 as shown in Fig. 2. The backspace pull rod 166 is attached by a hinge to the insulating member 187 of the backspace clutch, since only a portion of a revolution of the clutch is required for the backspacing operation. The above constitutes the backspace clutch 12. The carriage return clutch 14 is similar in every respect, as shown in Fig. 5, except that the annulus of the body 185 is reversed and faces to the right instead of the left.

Attached to the sleeve 11 is another iron clutch plate 191 which serves as engaging plate for the carriage return clutch, and also as driving member for the punch clutch. The disc 191 is recessed to receive the ring portion 192 of the punch clutch. To the ring 191 there is attached a clutch disc 193. The clutch ring 192 is attached to a sleeve 194 also journaled upon the shaft 16 and carrying a screw thread on its outer surface. Engaging with the thread on the sleeve 194 is a clutch pressure ring 195 which has a friction facing member held in place by screws as shown.

A clutch engaging spring 197 is connected between a pin on the sleeve 194 and the clutch pressure ring 195 and tends to draw the clutch members into engagement. The clutch pressure ring 195 as shown in Fig. 4 has a projection 198. This projection cooperates with a stop bar 199, and, when the stop bar 199 is interposed in the path of the projection 198, the member 195 is caught by it and rotated backward against the tension of the spring 197 to release the clutch pressure and disengage the clutch. It will be observed that this mechanism is a one revolution clutch which arrests in an accurately predetermined position the driving shaft after one revolution. The stop bar 199 is held up by a spring member 200 as shown in Fig. 4, which cushions the shock of stopping the clutch, and the stop bar 199 is carried upon the swinging lever 201, which is operated through a link and lever by the armature of the trip magnet 202. Thus, when the trip magnet 202 is energized, the stop bar 199 is withdrawn from the contact with the projection 198 allowing the spring 197 to engage the clutch. If the magnet 202 is thereupon disengaged, the clutch completes one revolution and is disengaged by coaction of the projection 198 with the stop bar 199.

The set magnets
(Figs. 1, 2, and 30)

Still another mechanism cooperating with the carriage is the set magnet assembly, as shown in Figs. 1 and 2. This assembly consists of a case member 205 within which the fourteen set magnets and control magnets 206 are positioned. These magnets, as is well known in the art, consist of a non-magnetic spool in which the wire coil is positioned. The coil is then surrounded with a split iron cylinder and iron ends to form a solenoid. Within the tubular core of the spool there is positioned a freely movable iron armature which cooperates with the lower end of the corresponding Bowden wire 77 to push the core of the Bowden wire upward, this motion being transmitted to the corresponding member in the punch carriage. The upper end of each magnet has a tubular threaded end which passes through the top plate of the case 205 and is held in place by the nuts 207.

Keyboards
(Figs. 1, 2, 3, 20 and 21)

The keyboards each consist, as shown in Figs. 1, 2 and 3, of a case member 211 having a top board 212 in which are mounted the keys proper 213. These keys have stems 214 as is particularly shown in Fig. 3. The stems are guided at the bottom by a contact support member 215 and operate the contacts 216.

Figure 20:
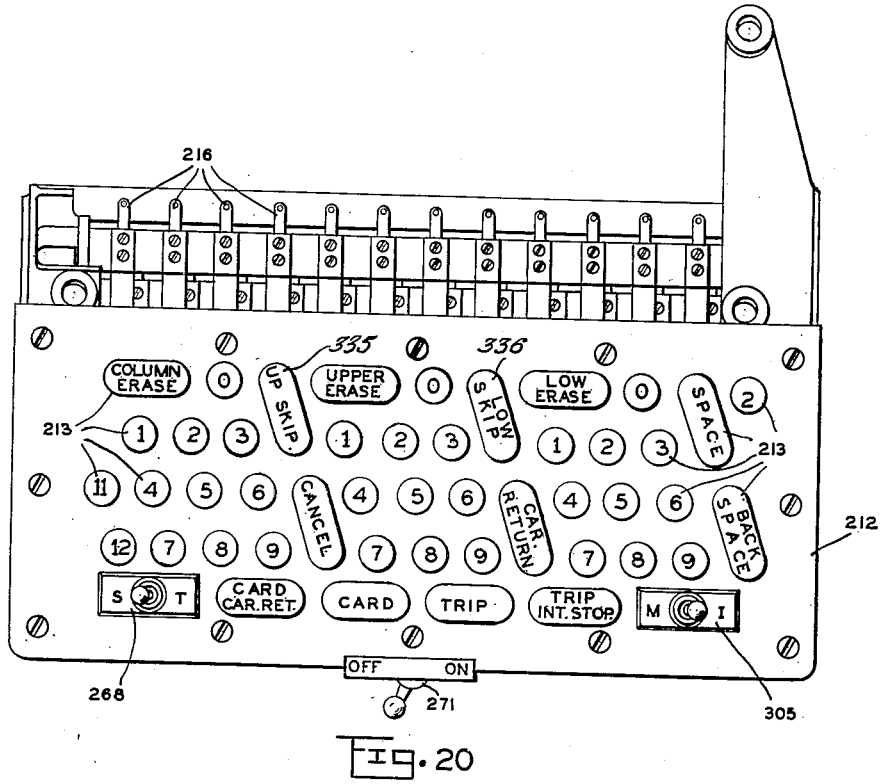
Fig. 20 is a top view of a triple numeric keyboard.
Figure 21:
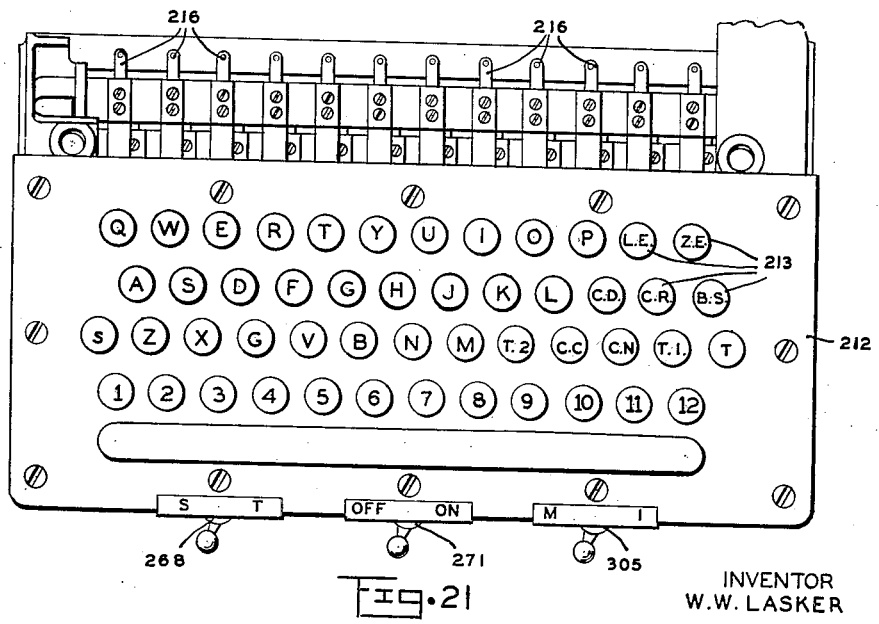
Fig. 21 is a top view of an alphabet-numeric keyboard.

The arrangement of the keys may take any desired form but two especially suitable arrangements are shown in Figs. 20 and 21. The keyboard arrangement of Fig. 20 is identified as the "triple-numeric" type, and, as will be observed, has a group of 12 digit keys at the left-hand side which serve for full-column numeric setting, a group of 10 digit keys in the center which serve for upper-zone numeric settings, and a third group of 10 digit keys at the right-hand end which serve for lower-zone numeric setting, as is shown in Fig. 50. Control keys are then interspersed as shown between and around the several groups of digit keys. The column-erase key which is used only with the full-column key group is positioned above the full-column group, the upper-erase key similarly is positioned above the upper-zone keys, and the lower-erase key is positioned adjacent the lower-zone keys. The upper skip key is positioned between the full-column digit keys and the upper-zone digit keys, since it cooperates with both groups.

The cancel key is positioned between the full-column and the upper-zone groups as a convenient location. The lower skip key is positioned adjacent the lower erase key, with the carriage-return-key below it as a convenient location. The space key and the backspace key are positioned at the right of the lower-zone key-group and the "trip two" key is positioned in the upper right-hand corner. Across the bottom on the keyboard from left to right there are, first, the trip repeat switch, then the "card with carriage return" key, then the "card" key, then the "trip" key, then the "trip with carriage return to intermediate stop" key, then the "margin-intermediate" switch. On the front side of the case 211, there is then positioned the "on-and-off" switch as shown. This keyboard arrangement has been found to be a convenient and efficient construction. This keyboard is shown on the punch in Figs. 1 and 63.

When it is desired to record alphabetic data, as well as numeric data, it is necessary for efficiency to provide a set of alphabetic keys as well. This group of alphabetic keys may, if desired, be added to the three groups shown in the triple-numeric keyboard of Fig. 20, the keyboard merely being lengthened to accommodate the added twenty-six keys, and in some instances this construction is found advantageous. However, such a keyboard usually is undesirably large and unwieldy, and somewhat complicated for the average operator.

Accordingly, the special alpha-numeric keyboard of Fig. 21 is preferably used. This keyboard is frequently used in connection with a parallel control from an accounting machine typewriter and accordingly it is desirable that it should resemble, to some extent at least, the accounting machine keyboard (Fig. 61). For this purpose, the alphabetic keys are grouped in three rows, the order of arrangement of the letters being substantially that of the standard typewriter keyboard. The 12 digit keys are then arranged in a single row below the alphabetic keys with the space key in the form of a bar below the digit keys. The several control keys are then arranged to the right of the alphabetic keys, taking the place of the usual typewriter punctuation keys. The three control switches are arranged at the top of the front portion of the keyboard case. This arrangement makes a highly efficient and satisfactory keyboard which is shown on the punches of Figs. 62 and 64.

*The typewriter contact pan*
*(Fig. 22)*

Figure 22:
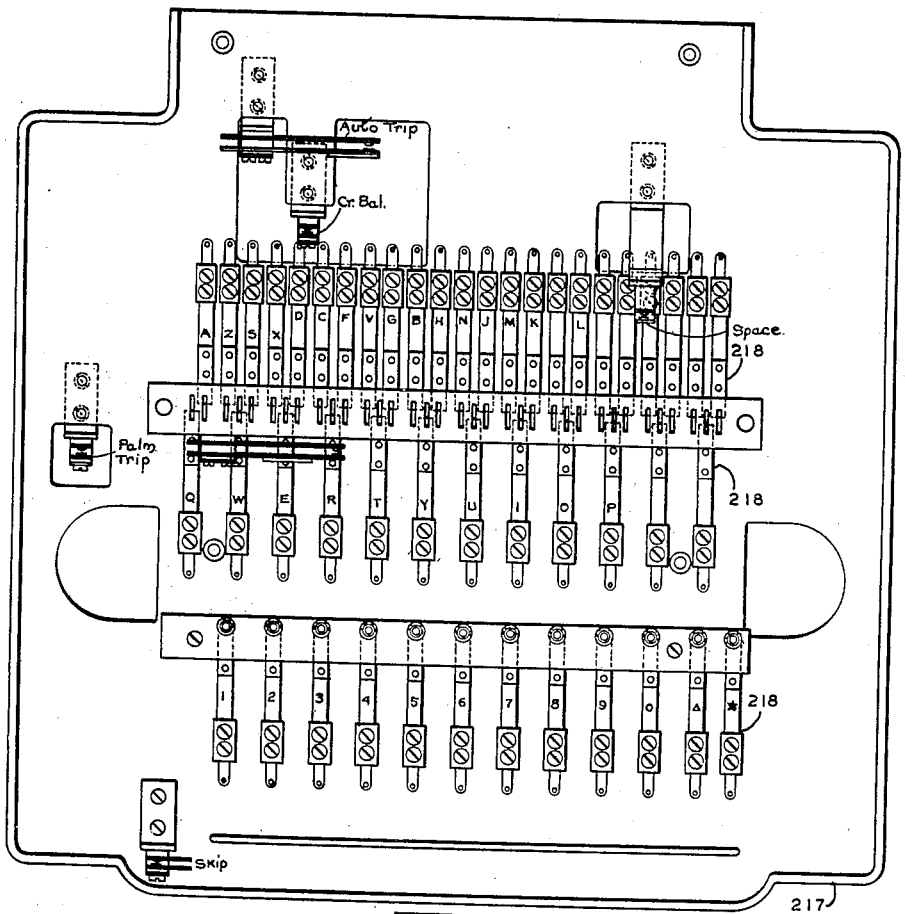
Fig. 22 is a top view of a typewriter contact pan.

The punch mechanism here disclosed is particularly advantageous for use when coupled with a typewriter, to form a typewriter-punch-hookup. For this purpose the contact pan 217 as shown in Fig. 22 is conveniently utilized and positioned underneath the typewriter as shown in Fig. 65 and the W. W. Lasker et al. application Serial No. 635,186, filed September 28, 1932. As is shown in that application, depression of a typewriter digit key engages the snatch pawl 177 with the snatch roll 176 to actuate the type bar 178, and an extension on the snatch pawl closes the corresponding contact 218. The various typewriter function mechanisms are adapted to operate the several contact springs in the contact pan and close circuits for control of the punch mechanism, either for set-bar setting, or for punch operation control, as is pointed out in connection with the tracing of circuits.

*The relays*
*(Figs. 1, 2, and 29)*

Some of the punch functions are controlled directly by circuits extending from the key contacts 216 to the actuating magnets 206, but others of the operation require the intervention of relays for proper operation and for the prevention of improper operation, the relays serving in some instances to control two functions from a single key, or to prevent the occurrence of a function when some other function is desired alone. These relays 221 are an integral part of the punch mechanism and are mounted upon insulating material shelves 222 at the left-hand end of the punch above the clutches 12, 14 and 15, the reduction gear 8, and the drive motor 3, as shown in Figs. 1 and 2.

The precise arrangement of these relays on the shelves is more or less immaterial and the functions of the several relays are shown and described in connection with the wiring diagrams and the operating circuits. These relays may take any desired form such as the standard telephone relays, since they operate upon 18 volts, but a particularly advantageous and convenient type for this service is the automobile charging relay, as produced by a number of manufacturers. Such relays are readily modified to include additional contacts and when wound for 18 volts they have ample power to assure firm, positive, closing of contacts and prompt opening of the contacts.

*The transfer switch*
*(Figs. 1, 24, 25, 26, 27, and 28)*

In addition to the relays, there is also provided a transfer switch as shown in Figs. 24, 25, 26, 27 and 28. This transfer switch is not required when the punch is operated from the triple-numeric keyboard, but it, or its equivalent, is required when upper and lower zone setting according to the two unit code is to be done either from the alpha-numeric keyboard or from the typewriter controlled contacts. The transfer switch is desirably positioned in the case 225 which is preferably mounted directly underneath the set-magnet case 205, at the right-hand end of the punch as shown in Fig. 1. The case 225 is conveniently held in place by long through bolts 226 passing through the legs 2 of the punch as shown in Figs. 1 and 27. The switch proper consists of a series of contact springs 227 as shown, which are mounted upon a bar 228, and supported by insulating members 229 through which are passed supporting screws as shown. The center pairs of the springs 227 straddle a non-conducting operating bar 231. This bar is carried in brackets 232 on a shaft 233. The brackets extend outward from each side of the shaft and at their ends carry the armature bars 234. Cooperating with the armatures 234 are two pairs of magnets 235.

Figure 25:
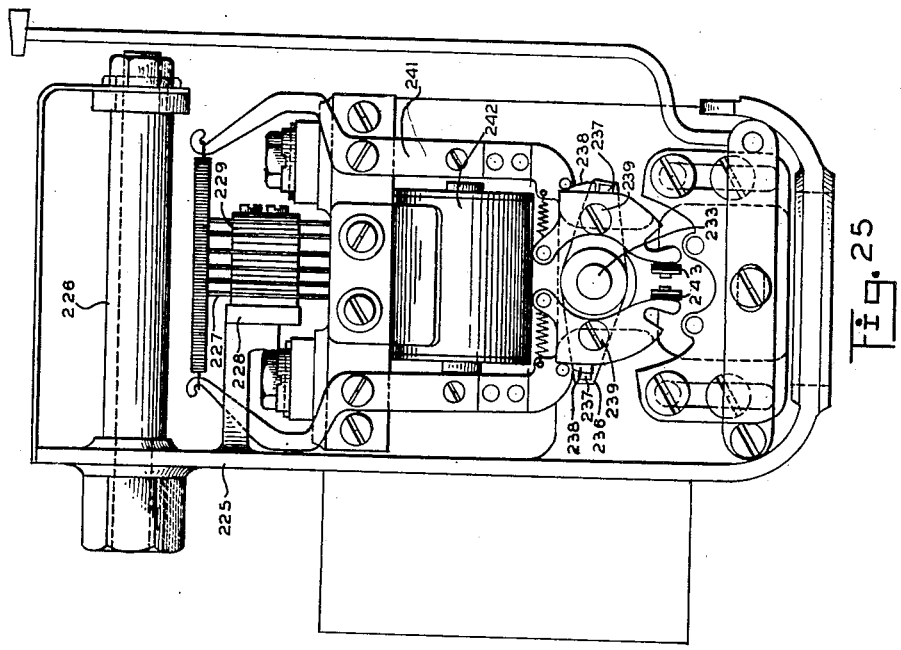
Fig. 25 is an end view of the transfer switch, showing the lock mechanism.

At the front end of the switch there is provided a lock mechanism as shown in Fig. 25. This consists of a cross arm 236 having projections 237 which are adapted to cooperate with the locking portions 238 of armatures 241 as shown. These armatures are pivotally mounted and, when actuated by lock releasing magnet 242, render locking portions 238 ineffective. Lock control contacts 243 are provided and are adapted to close a circuit when actuated by members 241a pivoted by screws 239 to armatures 241.

The transfer switch mechanism is arranged to assume three different positions, a mid position with the center pair of contacts engaged, and two side positions with the "upper" or "lower" sets of contacts engaged, as is particularly shown in Fig. 28.

Figure 24:
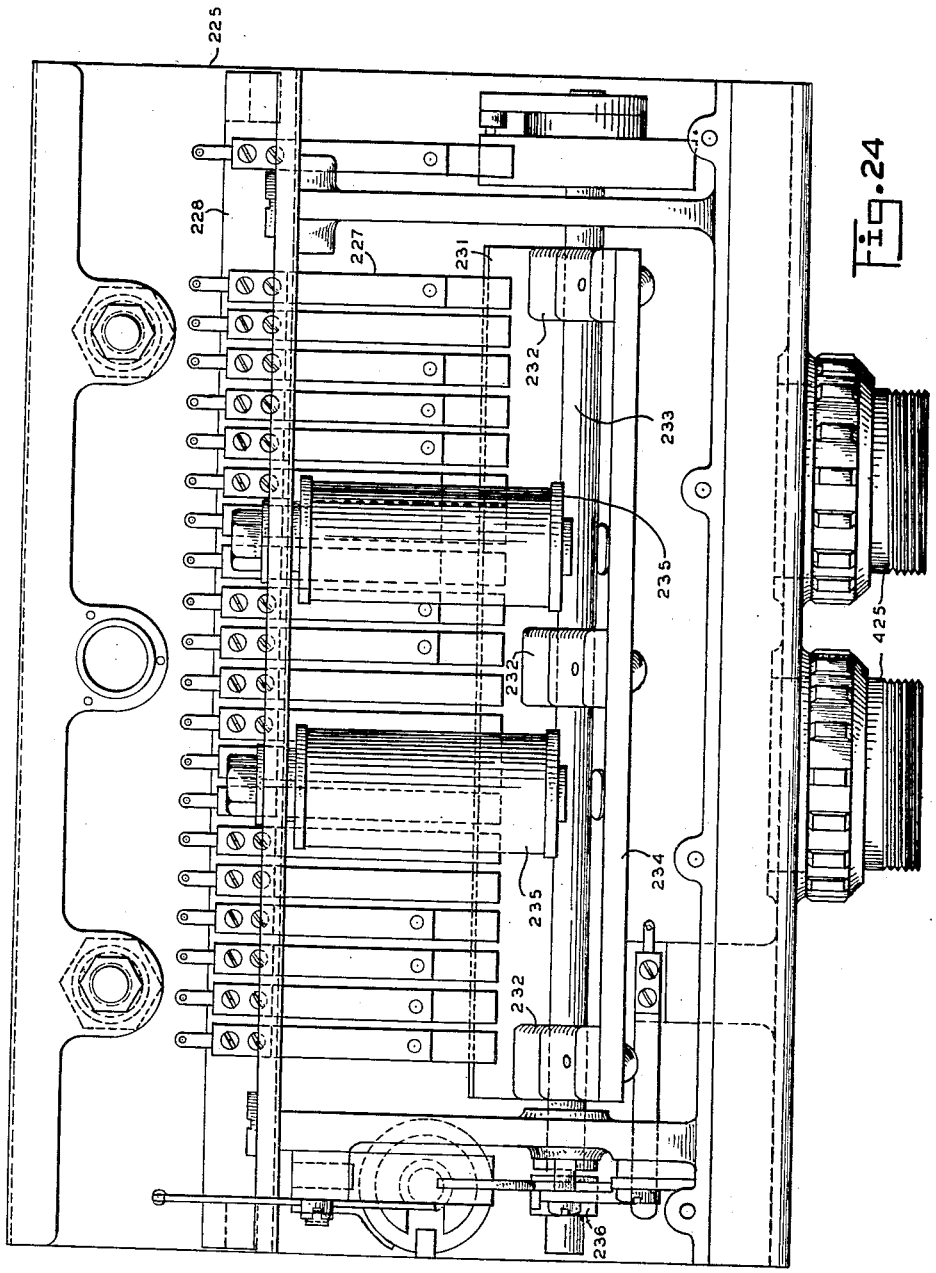
Fig. 24 is a side view of the transfer switch.
Figure 26:
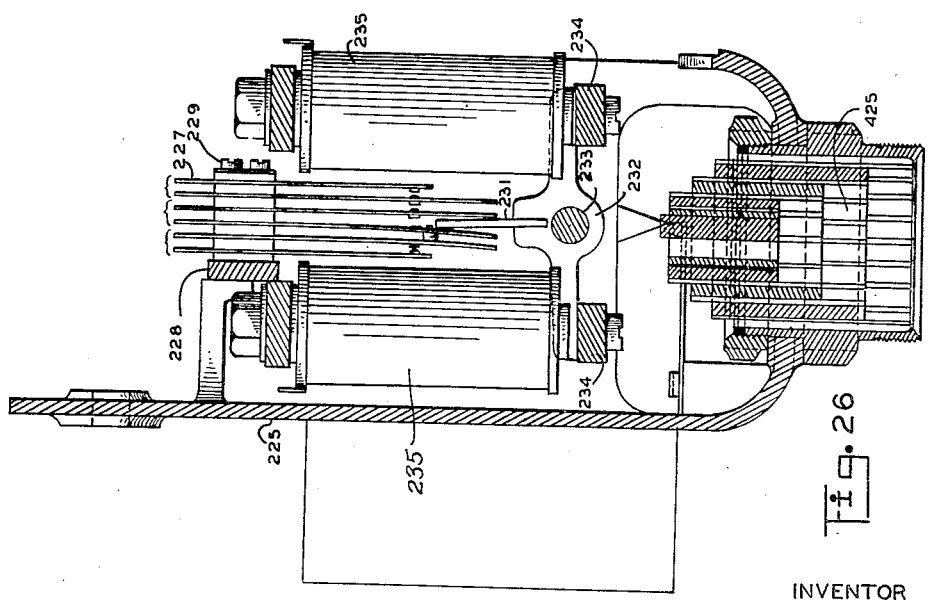
Fig. 26 is an end view, partly in section, of the transfer switch showing the contact springs and actuating magnets.

The transfer switch is desirably connected through a cable to a connection panel having a group of Pfhanstock clips to which the punch leads are soldered. If the "triple-numeric" keyboard is used in combination with a typewriter contact pan, two connection cables lead respectively to the keyboard and to the typewriter contact pan, and the keyboard, and transfer switch may be connected in parallel to the appropriate Pfhanstock clips to which the punch circuits are connected. For connection to the typewriter, it is desirable that a readily removable cable terminal be provided as shown in Fig. 26. This terminal is so arranged that the plug member can be inserted in only one position to insure proper connections of the circuits, and when inserted it is held firmly in place by a threaded locking ring. As shown in Fig. 24, two cable terminals are conveniently provided. These may be used for the connection of two typewriters to one punch on the rare occasions that such a connection is desirable, or they may be used, one for connection to the typewriter and the other for connection to the alpha-numeric keyboard which is the usual type of hook-up.

The commutator
(Figs. 4, 6, and 30)

Another member which is connected between the keyboard, and the set magnets and relays, is the commutator 22 as shown in Figs. 4 and 6. This commutator is mounted upon the punch shaft 16 and has an insulating material body. It has on its surface two segments as shown in Fig. 6. The segment 246 is the main segment and the segment 247 is the auxiliary segment. As shown, there are five brushes 299, 303, 304, 355, and 399 (Fig. 4) adapted to bear upon the commutator. The segments, particularly the segment 247, are of substantial thickness, and when they engage the brushes, the brushes are lifted above the surface of the insulating material by a substantial amount. Use is made of this brush movement to open and close the contacts leading from the right-hand brush to a contact spring 308. The normal position of the commutator, when the punch shaft clutch is disengaged, is with the "supply" brush engaging the continuous ring portion of the main segment 246, the "relay break" brush disengaged from the commutator segments, the "trip breaker" brush engaged, and the cancel and carriage return brushes disengaged from the auxiliary segment, so that the carriage return brush makes contact with the carriage return key contact spring 308.

The sorting pockets
(Figs. 3 and 23)

When the "trip two" key is employed, the two identical cards which are punched thereby are desirably sorted into separate pockets. For this operation front and rear card receiving pockets are provided as shown in Figs. 3 and 23. The bottom portion of the card gate 48 serves as a deflector to convey a card into the front pocket over the bottom plate 251 and a special deflector 252 serves to carry the card on to the bottom plate 253 of the second or rear pocket as shown. These mechanisms are mounted in a frame member 254 as shown in Fig. 3, which is mounted upon the base frame member 1. This mounting is arranged to be readily detachable, since only a small number of punches utilize the "trip two" mechanism. The auxiliary rolls 49 are conveniently driven by a chain member 255, as shown in Fig. 23, from the same shaft which drives the discharge rolls 47, and the card gate is mounted upon a control shaft 48a which as previously pointed out, is actuated by the receiver shift magnet 48b, this magnet likewise being mounted upon the frame 254.

When the double pocket receiver is not used, the standard single receiver of the prior art is attached in its place.

The punch-typewriter interlock

Figure 38:
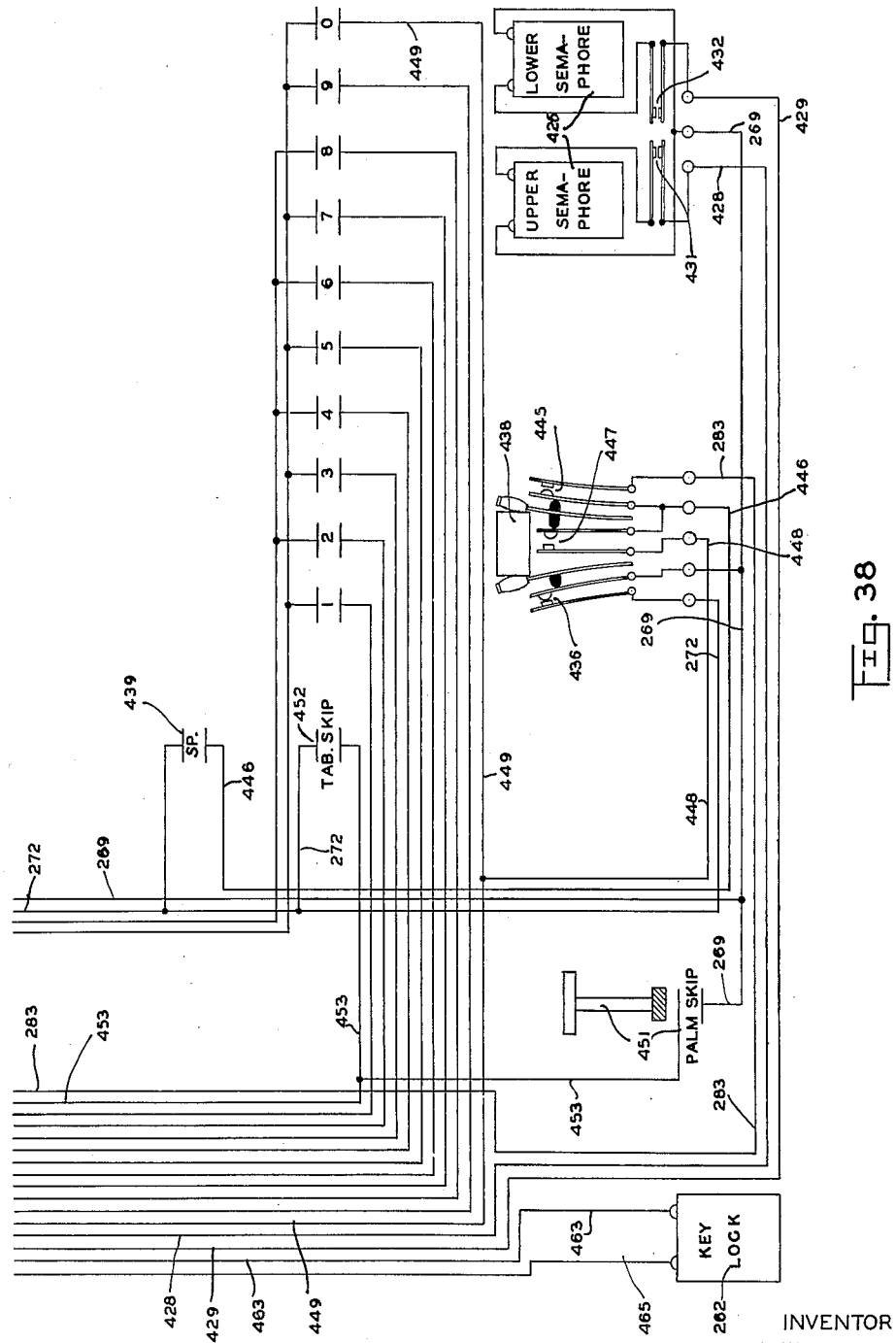
Figure 39:
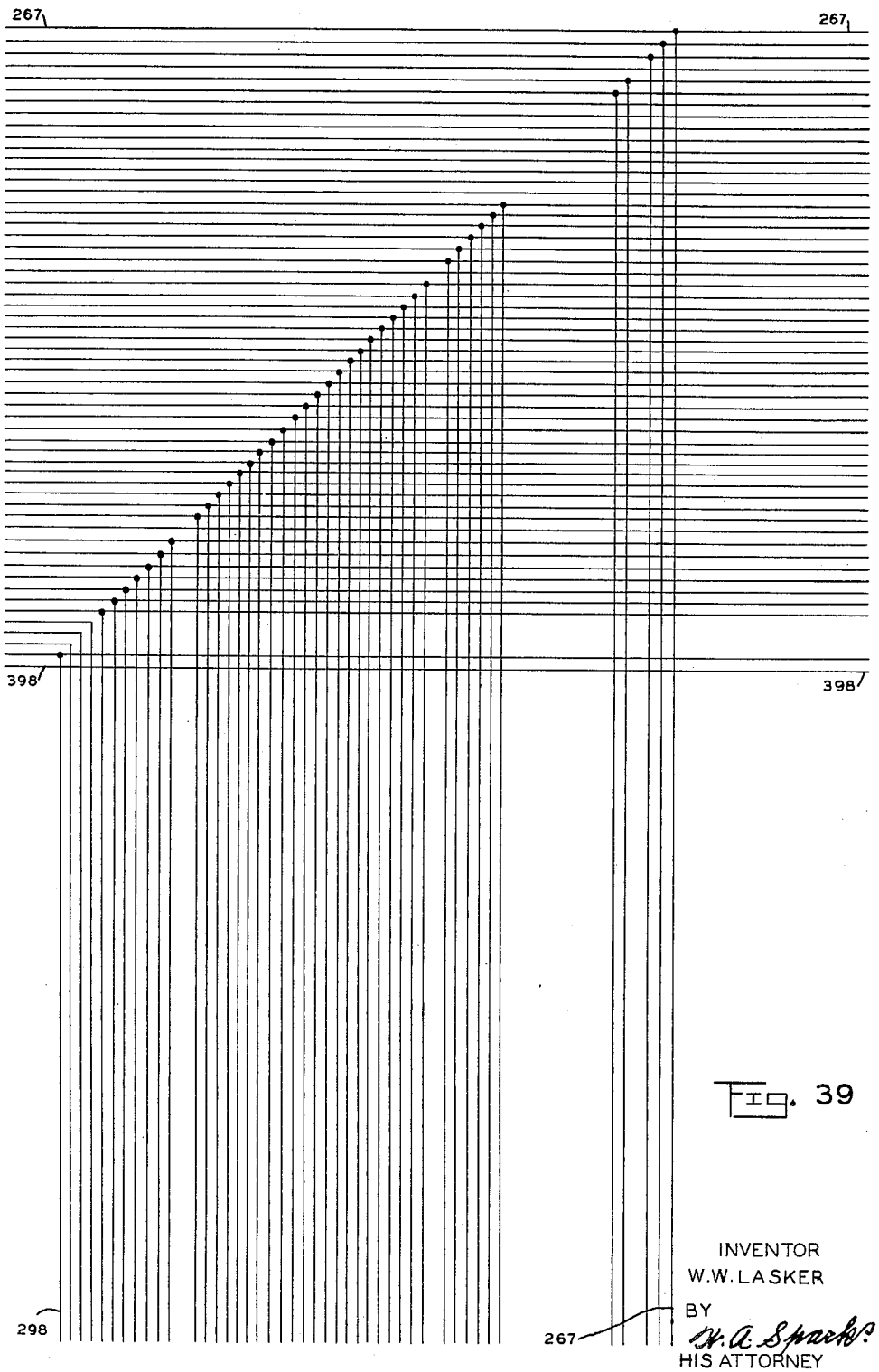
Figure 40:
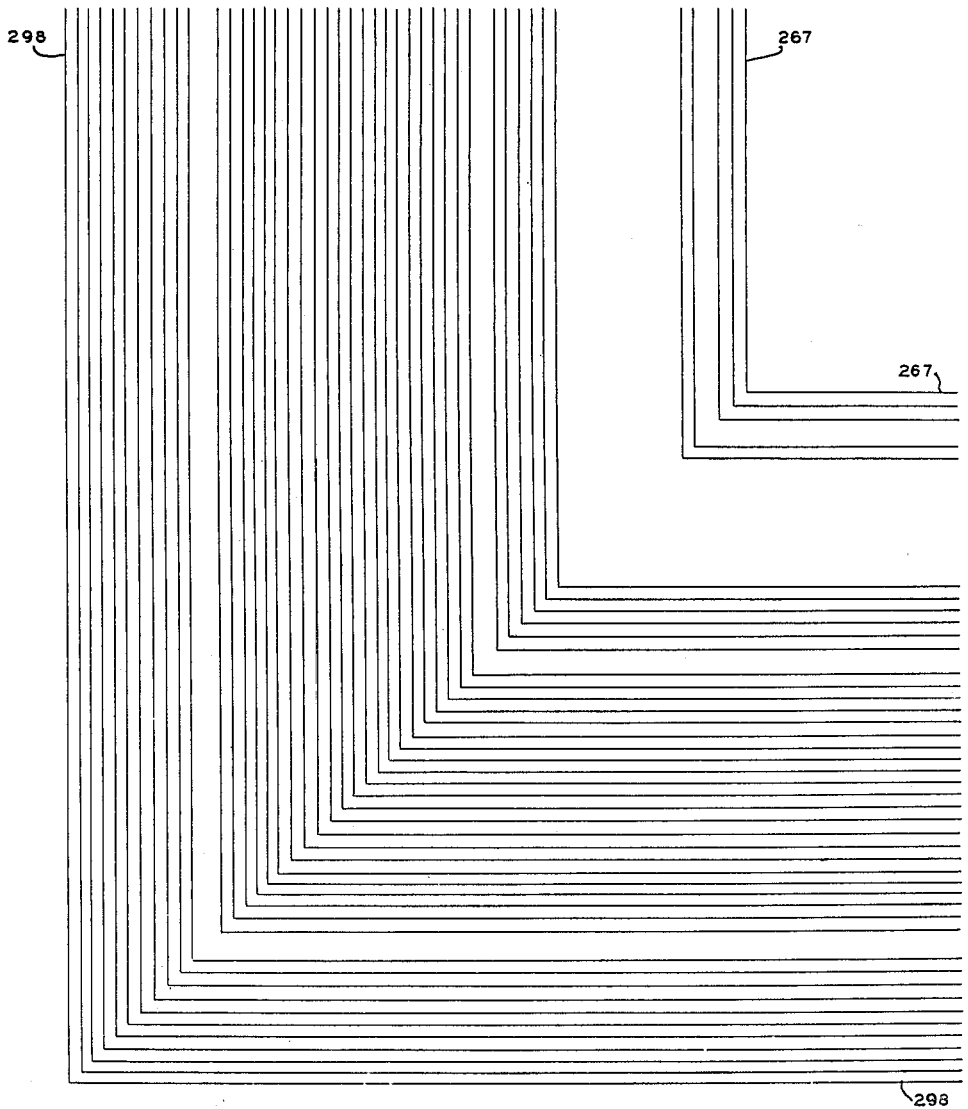

When a punch and typewriter are connected together as shown in Figs. 63 and 64 the keyboard of the punch must be locked to prevent operation of the keys. Appropriate circuit connections are made from the contacts 216 (Fig. 3) through the cable 219 to the interlock magnet 262 in the typewriter, as shown in Fig. 38, and as hereinafter described.

Codes

This punch mechanism is particularly adapted to the preparation of cards according to the several codes shown in Figs. 49 and 50. The simpler of these codes, the so-called "full column code" or "single unit" code, or "Powers 45 column code" is shown in the first group of dots in Fig. 49, successive rows corresponding to the set-bars being indicated by Roman numerals at the card end and the digits indicated by a punching in a given row being indicated by Arabic numerals above the respective columns.

The alphabetic code as previously worked out is a two-unit code and requires a full column for the indication of each letter. Thus, the first portion of the alphabet, up to and including the letter L, utilizes a single perforation in the desired row as shown for the desired letter.

For the second half of the alphabet, the letters M to the end, two perforations are utilized, the perforation at the top of the column which if alone would indicate L being utilized to indicate that the perforation means a letter in the latter half of the alphabet. This code provides only 23 combinations whereas there are twenty-six letters, and, accordingly, three of the letters are unprovided for. To take care of this situation, several letters which are closely similar are represented by a single code combination, i. e. O and Q have the same combination; U and V, the same combination, and X and Z although not closely alike are relatively little used, and have the same combination. This is the entire 45 column code. The "90 column" code or "upper and lower zone" two-unit code as shown in Patent No. 1,730,621 is represented herewith in Fig. 50. As in Fig. 49, the Roman numerals indicate the row and the position in the column to which the set-bars correspond, and the letters and Arabic numerals at the top of the card indicate the meaning of the several code perforation combinations.

Circuits

A substantial portion of the invention herein disclosed is in the circuits utilized. For purposes of clarity and completeness of disclosure, these circuits are presented in two forms, that is, in the form of complete wiring diagrams and in the form of analysis diagrams. Figs. 41 to 48, inclusive, are the analysis diagrams which show the circuits involved for any given function, without the complication of other circuits not at the moment used for the specific function. These circuits are always used for the specific function without regard to the keyboard assembly utilized, and reference may be had to them to show the characteristics of the circuit for any particular function.

For the complete wiring diagrams reference may be had to Figs. 29–40, inclusive, when assembled according to the particular combination of punch and keyboard used. That is, Figs. 29–32, inclusive when assembled as shown in the chart of Fig. 51 show the complete wiring diagram for the punch equipped with the triple-numeric keyboard. Similarly, Figs. 29, 30, 33, 34, 35, 36, when assembled as shown in the chart of Fig. 52 show the complete wiring diagram for the punch when used with the alpha-numeric keyboard, and the transfer switch. Similarly, the chart of Fig. 53 shows the complete wiring diagram for the punch when controlled only from the typewriter key actuated contacts through the transfer switch. The chart of Fig. 54 shows the complete wiring diagram of the punch when controlled by the alpha-numeric keyboard and the typewriter key actuated contacts in parallel; and Fig. 55 shows the complete wiring diagram when the punch is controlled by a triple-numeric keyboard, and the typewriter key actuated contacts in parallel. These complete circuits are utilized in connection with the description of the method of operation of the punch presented hereinafter, and the basic function circuits in the complete wiring diagram will be found to correspond accurately to the analysis diagrams with the single exception that in the analysis diagrams the trip repeat and supply switches are shown in series, whereas in some of the keyboard circuits, particularly the typewriter contact circuits, it has been found convenient to connect these switches in parallel. However, this minor modification introduces no change in operation.

Dual punch operation

A particularly advantageous feature of this invention is in the combination of one or more punches with a single typewriter controlled contact set as shown in Figs. 63 and 64. That is, the typewriter contact pan of Figs. 65 and 22, having a single set of contacts, respectively operated by the several typewriter key mechanisms may be used for the control of two different punch mechanisms.

In the above presented disclosure, there is provided a driving motor 3 for each punch, and each of the several punches has its own independent driving motor. Similarly, each punch has its own generator 4, and the circuits are so arranged and organized that several punches may be operated in parallel from a single set of key contacts without interference between the several punches. The circuits are so connected that it is impossible for the generator of one punch to feed energy through the common typewriter contact set to the generator of another punch, making it a motor to form a feed-back system with circulating currents through and between the several motor generator sets. Instead, each punch system operates synchronously with the others, setting the identical data, when desired from the single set of contacts without interference between the several punching systems.

In addition, each punch has a common lead to the typewriter-key contact-set, which is conveniently adapted to be controlled by a pair of contacts opened and closed by the control bar, as shown in Fig. 38. Any desired number of contact-sets may be actuated from the control bar to open and close the common leads of their several punches. This structure thus permits one punch to record part only of the material typed by the accounting machine typewriter and permits another punch to record also a part only of the material typed, the portion recorded by the second punch being at will entirely different from that recorded by the first punch, or a part, or all, of the data recorded by the first punch and other matter not recorded by the first punch. That is, the several punches may set-up and record entirely different subject matter from the typewriter or they may set-up a record overlapping data records from the typewriter material.

Thus, the typewriter punch hook-up may consist of one punch operated from a set of contacts in the typewriter contact pan under the supervision of a typewriter control bar; or the combination may consist of two punches operated from the contacts of a single typewriter contact pan, each under the separate control of contacts operated by the typewriter control bar, or three or more punches may be operated from the single contact pan, either singly or in groups controlled from contacts actuated by the control bar.

For such operations as stock sales accounting, railway freight accounting and many other accounting procedures, there is more data recorded by the typewriter than is possible to record on a single card, and very often some of the data is required on cards for one phase of the accounting problem and other data is recorded for other phases of the accounting problem, such, for instance, as the buyer's account, the seller's account and the broker's account. In such requirements, the solution of the accounting problem is greatly facilitated if separate cards are produced to be tabulated for the separate accounts, especially since by the use of separate cards, the several accounts may be tabulated simultaneously. The structure of this combination is particularly advantageous for this feature, since it permits of the simultaneous punching of a plurality of independent tabulator cards from a single original record.

Operation

In the operation of this punch mechanism for the production of tabulator cards carrying perforations which record desired data, the following sequence of operational steps may occur, the order of the several steps being varied according to the requirements of the data to be recorded on the cards, and according to the particular keyboard or control device used in the mechanism. The simplest type of operations occurs when the triple-numeric keyboard, such as is shown in Fig. 20, is used for the punch control.

As has been previously pointed out, the complete punch mechanism may be made up in a number of alternative forms, using different control devices. That is, the punch and die mechanism and its associated parts, together with the set magnets and relays, may be connected by the circuits shown to several alternative keyboard mechanisms. Thus, the complete punch may include the triple-numeric keyboard of Fig. 20, or it may include the alpha-numeric keyboard of Fig. 21; or the typewriter contact pan of Fig. 22 and keyboard of Fig. 61 may be utilized either alone, or connected in parallel with either of the other keyboards. With either the alpha-numeric keyboard or the typewriter keyboard contact group the transfer switch of Figs. 24 to 28, inclusive, may be utilized for connection between the punch and keyboard. The punch assembly, including only the "triple-numeric" keyboard is the simplest and utilizes the simplest circuits, and accordingly, will be described first. Figs. 29, 30, 31 and 32 when assembled according to the chart of Fig. 51 present a complete wiring diagram for the punch and "triple-numeric" keyboard combination.

In operating a punch equipped with a "triple-numeric" keyboard, it may be considered that the previous user of the punch has left the punch cleared of settings, with the carriage returned to the left-hand stop, and the power off. The first step in the operation then is to close the power switch 6, which connects the motor 3 to the commercial power lines. The motor 3 thereupon comes up to speed, driving the generator 4, which, in turn, builds up its voltage to the adjusted value, which, in the present instance, is preferably about 18 volts. This voltage is desirable because of the fact that the inductance of windings in the magnets and relays suitable for operation at this voltage is sufficiently low to avoid the production of dangerous or destructive arcs at the contacts when they are opened. The motor 3 likewise rotates the speed reduction gear 5 and the drive discs of the clutches 12, 14, and 15 preparatory to the several clutch operations.

The operator may, during the time in which the motor 3 is coming up to speed and the generator 4 coming up to voltage, place in the supply magazine a suitable stack of unpunched cards, and may verify and adjust the settings of the margin stop 137 and the intermediate stop 138.

Full column code setting

Figure 31:
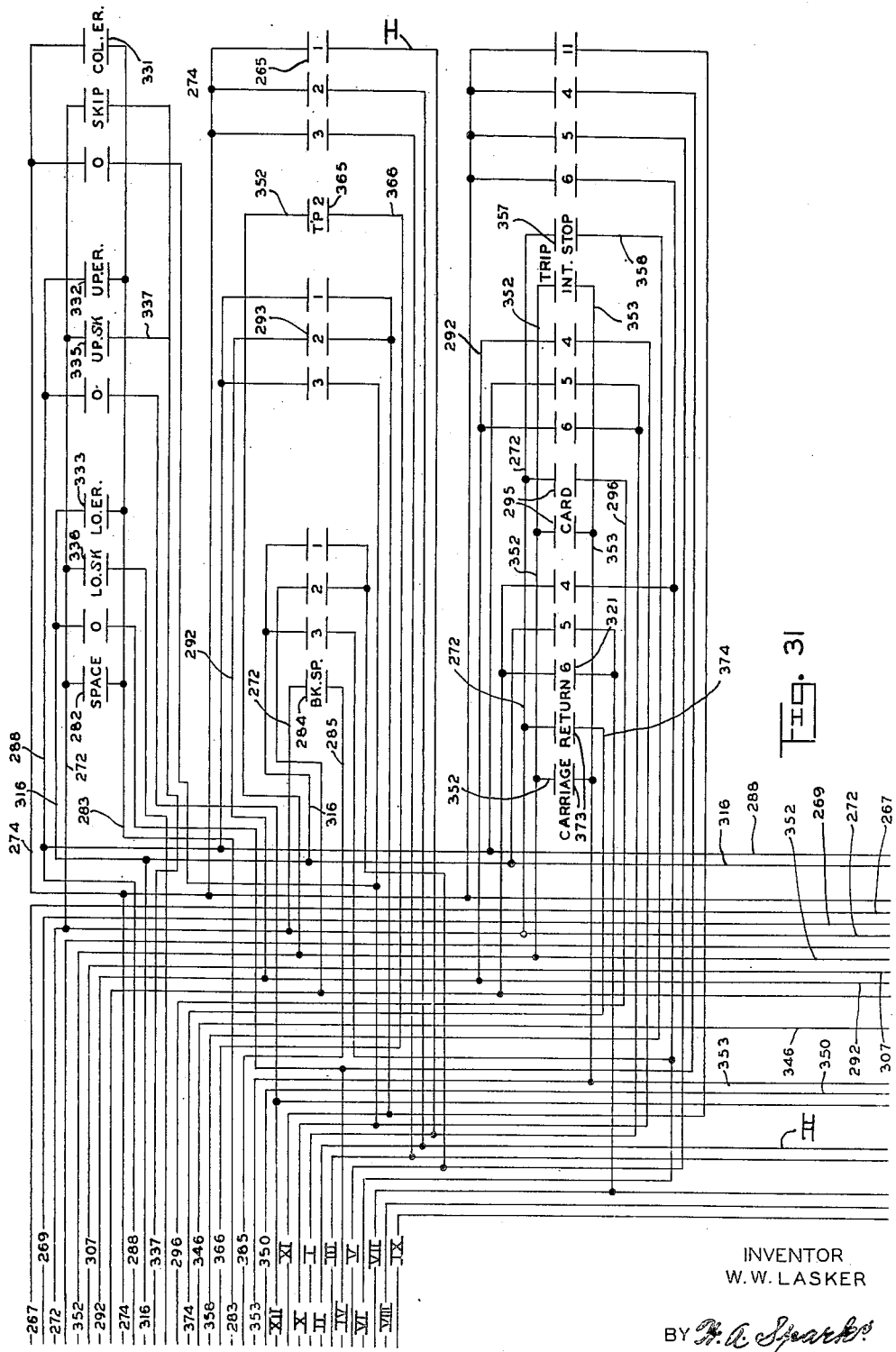
Figure 32:
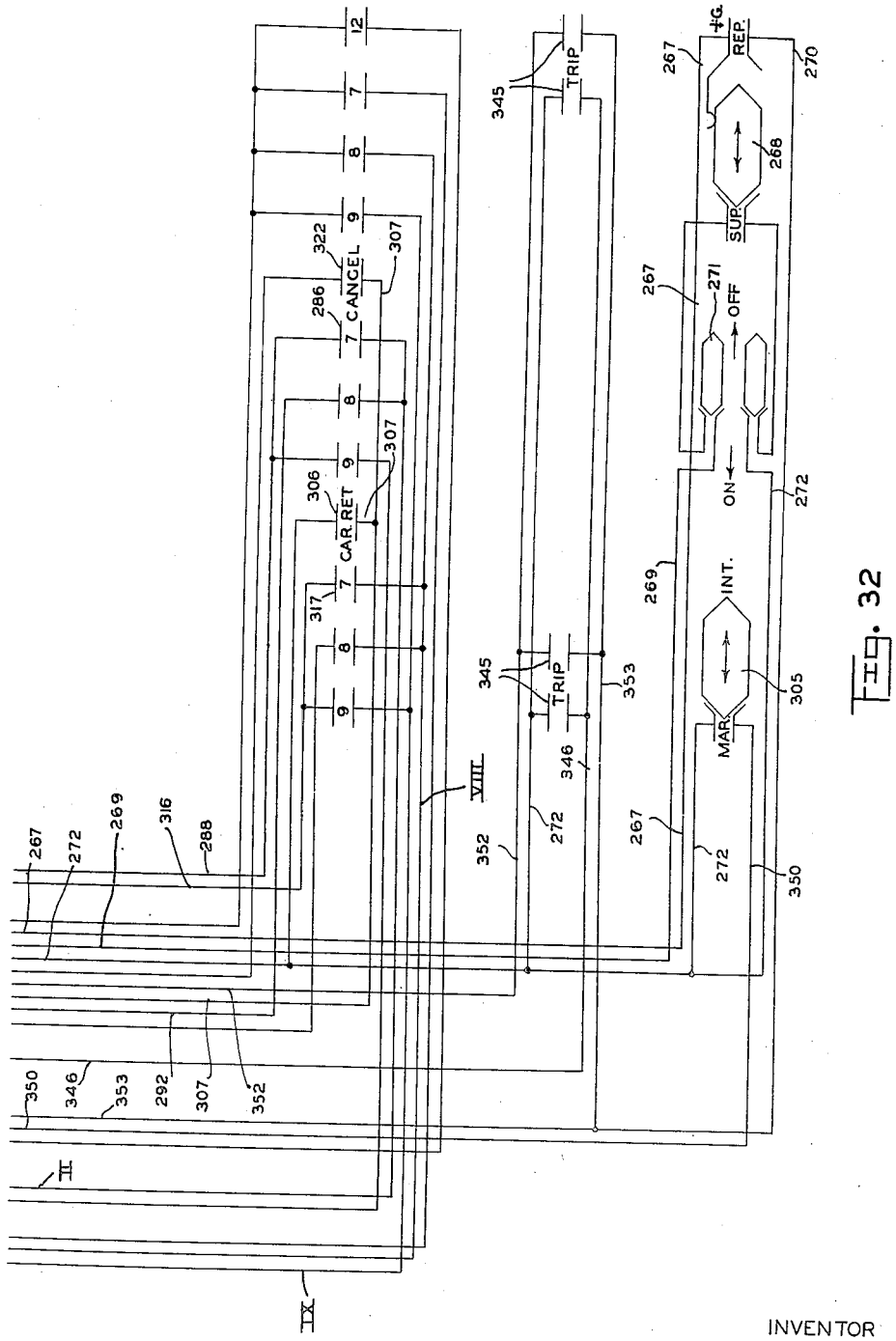
Figure 33:
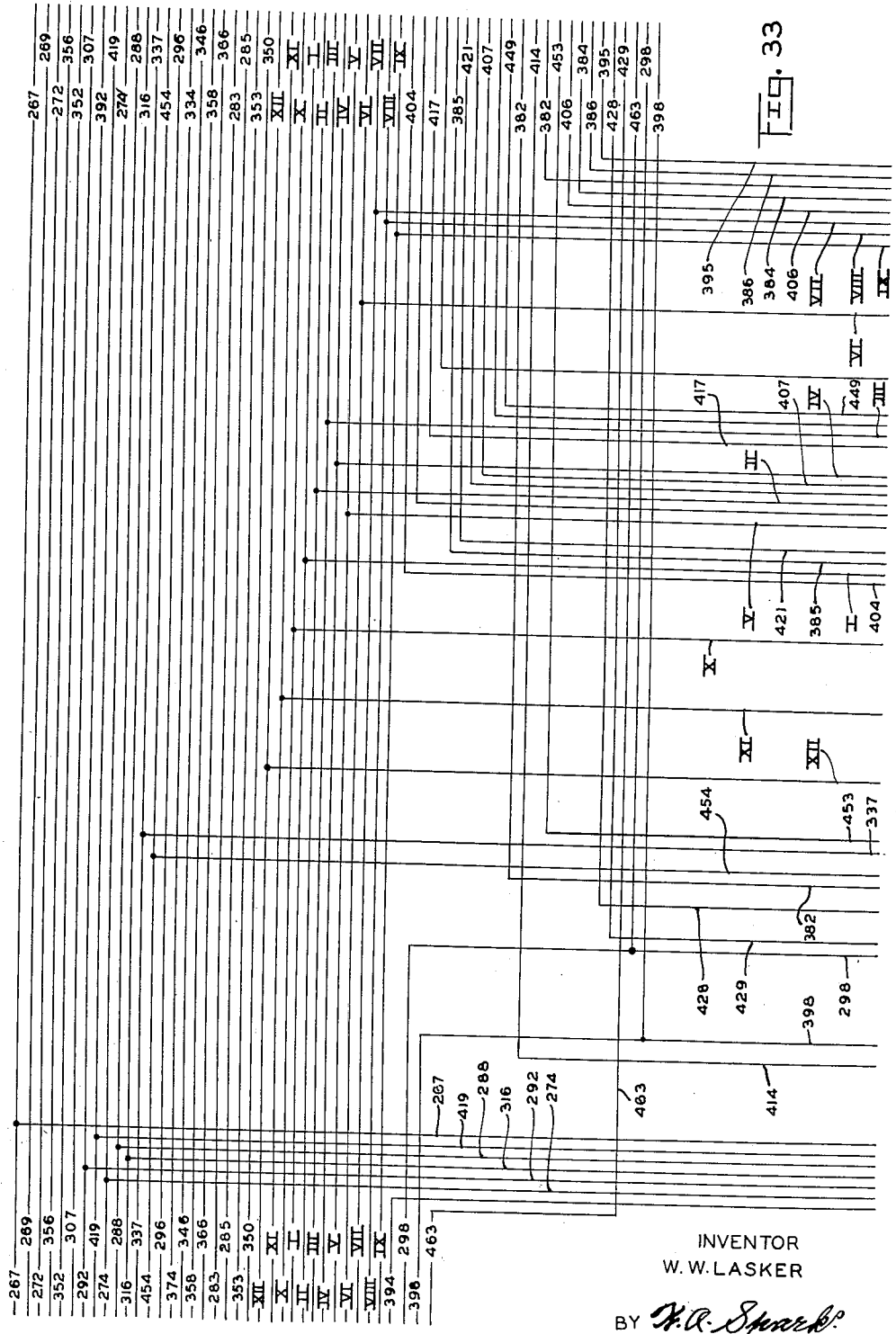

When the generator is up to voltage, there is power at the keyboard contacts 215 and the punch is ready for operation. Suppose that the operator desires to punch the card to indicate a digit in a field in the card according to the "full column" or "45 column, single-unit" code as shown in Fig. 49, which number may be, for instance, the digit 1. The digit key marked 1 in the left-hand field of keys, as shown in Fig. 20 is touched, closing the corresponding "1" key contacts 265 as shown in Fig. 31, to complete the necessary circuits for setting the "I" set-bar in the first column of the set-bar field.

Referring to the analysis circuit of Fig. 41, and to the complete circuit made up of Figs. 29, 30, 31 and 32, this setting circuit for the "I" set-bar may be traced as follows, based upon the fact that the number keys "draw-through" the column erase relay for power supply as shown in the analysis circuit Fig. 41: The circuit extends from the positive generator terminal 266 and the generator lead 267 through the "repeat trip" switch 268 to the supply lead 269 and through the "on-and-off" switch 271 to the "common" lead 272, thence to the coil of the "column erase" relay 273, thence through the "column erase" lead 274 to the contacts of the full column number key, which in this instance, is the "1" key 265, thence through the "I" lead shown on Figs. 30 and 31 to the "I" set magnet 206 as shown in Fig. 30, under the nuts 207 in Figs. 1 and 2. From the "I" set-magnet 206, the circuit extends to the negative lead 275 marked "bus" in Fig. 41, through the negative "bus contacts" 276 and back to the negative generator terminal 277. The flow of current in this circuit closes the "column erase" relay contacts 278, whereupon current flows from the "common" lead 272 through the "column erase" relay contacts 278 to two circuits in parallel, one circuit wire 279 leading to the "lower erase" actuating magnet 206, the other circuit wire 281 leading to the "upper erase" actuating magnet 206, the return circuits from both erase magnets being paralleled and connected to "bus" 275 and the negative generator terminal 277, over the same leads which complete the circuits to the "I" set-magnet. The energization of the "upper" and "lower" erase magnets thus occurs simultaneously with the energization of the "I" set magnet, and the cores of the three Bowden wires 77 are moved substantially simultaneously to actuate the two erase levers 111 and 112 (Figs. 7, 10, 11, 12 and 13) and the "I" set lever 72. The levers 111 and 112 moving down together, carry down with them their respective levers 114 which, in turn, by cooperating with the respective pins 119 carry downwards the respective erase slides 116 until the horizontal arms of the levers 114 meet the pins 122, whereupon the depending ends of the levers 114 are thrown sidewise away from the pins 119, leaving the slides 116 free to be raised by the springs 41 on the spring interponents as shown in Fig. 3. The successive stages in this operation are shown in Figs. 10, 11, 12 and 13. The downward movements of the slides 116 push downward the two set bars "X" and "T" for the erase lever 111, and "VII" and "VIII" for the erase lever 112, thereby moving to the left both of the latch slides 54 cooperating with the first column. The slides 116 are freed at once, leaving the partially depressed set-bars, and any previously depressed and latched set-bar free to rise under the urge of their springs 51. However, the "I" set lever 72 is also actuated, and continues downward for its full stroke, depressing the "I" set-bar through a full stroke and holding it there for a sufficient length of time to permit the slides 54 to return to the right and lock the depressed "I" set-bar in the first column.

The movement of the top end of the "I" set lever 72 carries along with it the escapement bail 81 (Figs. 3, 7 and 10) to prepare the escapement for release of one escapement tooth as is shown in Fig. 18.

Upon the release of the "1" key by the operator, the circuit to the "column erase" relay 273 is opened, opening the relay contacts 278 and de-energizing the erase magnets 206. Release of the "1" key likewise opens the circuit of the "I" actuating magnet 206, and accordingly, the three magnet cores of the energized magnets 206 return to lower position, releasing the cores of the Bowden wires 77, restoring the levers 111 and 112 as well as 72, releasing the bail 81 and allowing the escapement to pass one tooth, to move the carriage into position over the second column, under the urge of the spring in the drum 128. This completes a full column set-up on one set-bar in the first column, and insures the absence of any other set-ups in the same column. The operator may then repeat the depression of a "full column" code key to record the same or another digit, repeating the same cycle, the circuits being completed through various of the wires to the various set-bar actuating magnets according to the key depression, as is shown in Figs. 29, 30, 31 and 32.

Spacing

When the setting in a full column numeric field is completed, the setting in a second field may be made. As frequently occurs, the number to be recorded in the second field may not require as many columns as are contained in that field having less digits than the field has columns. Accordingly, the operator will touch the space key 282 to move the carriage along to the desired column. The circuit for this space key 282 is in general similar to that of the number keys as is shown in the analysis circuit of Fig. 41, except that the space key need not draw through the "erase" relay unless it is desired that each spacing operation shall include an erasing operation as well. As shown in the analysis circuit Fig. 41 and in Figs. 29, 30, 31 and 32, the circuit for the space key 282 extends from the "positive" generator terminal 266 through the "repeat trip" switch 268, the supply lead 269, and on-and-off switch 271, to the common lead 272, and thence to the space key contacts 282. From the space key contacts 282, the circuit extends through the space key lead 283 to the "space" magnet 206, as shown in Fig. 30 and thence through the "negative bus" 275 and the "negative bus" contacts 276 to the negative generator terminal 277. As shown in Figs. 3, 7, 10 and 18, actuation of the Bowden wire 77 attached to the "space" magnet 206 moves the escapement bail extension 91, and with it the escapement bail 81, and spaces the carriage to the next column. This may be repeated until the proper column is reached for recording the first digit in the second field, whereupon the previously described cycles of operation of digit keys may be repeated.

Backspacing

If, by chance, the operator makes an error in his recording of one of these columns, such as by touching the wrong key, he may backspace the carriage by touching the backspace key 284 and correct the set-up in that column. As shown in the circuit diagram in Figs. 29, 30, 31 and 32, and in the analysis diagram in Fig. 42, closure of the backspace key contacts 284 completes a circuit from the positive generator terminal 266 through the "repeat trip" switch 268, the supply lead 269, and on-and-off switch 271 to the common lead 272, thence through the backspace key contacts 284 to the backspace circuit wire 285, the backspace control magnet 172, as shown in Fig. 16, thence to "negative bus" 275 and the "negative bus" contacts 276 to the negative generator terminal 277. The energization of the backspace control magnet 172 attracts its armature 171, and swings the lever 169 (Fig. 16) in counter-clockwise direction, freeing the contact closing lever 167 and closing the backspace clutch contacts 168 (Figs. 16 and 30). Closure of these clutch contacts 168 allows the current to flow from the "positive generator" terminal 266 to the brush 189 on the backspace clutch 12, through the backspace clutch winding 186, and the second brush 189, to the backspace contacts 168, and back to the negative generator terminal 277. Energization of the clutch 12 causes it to rotate with the reduction gearing 8 and pull the link 166, which, in turn, swings the lever 165 to pull the backspace rack 161 toward the left, causing the slots in the rack 161 to move over the supporting pins, thus lowering the backspace rack 161 into engagement with the backspace pawl 163 on the carriage and drawing the carriage to the left by a distance of one column. Completion of the stroke of the backspace rack 161 and the lever 165 brings the lever into engagement with the lever 167, pushing it down, opening the backspace clutch contacts 168 and locking the lever 167 under the lever 169 preparatory to another backspace operation. The backspace key 284 may or may not be released during the backspace operation, but whether it is or is not released, only one backspacing operation occurs since the lever 167 is not only locked by the projection on the lever 169, but is also carried sufficiently far to be locked under a projection on the auxiliary latch lever 170, where it is held until the circuit of the control magnet 172 is released to lower the lever 169, which upon being lowered, depresses the lever 170, thereby freeing the lever 167 from the lower lever 170, and bringing it into engagement with the cooperating lever 169 preparatory to another backspace operation, which will occur when the backspace key 284 is again depressed after having been released. The carriage having been spaced backward one column, the desired correct setting is made therein, and thereafter, the setting of full-column single-unit-code data may be continued until all of the desired full-column code data has been recorded.

This data may occupy the entire card or it may occupy a part only of the card. In the event that a part only of the card is to be perforated according to the single-unit, full-column or 45-column code, the intermediate stop 138 as shown in Fig. 16 is set at the next column beyond the last "single unit" code column.

Upper zone setting

When this point is reached, no further keys in the left-hand or full-column portion of the keyboard are used, but instead the middle group of keys, as shown in Fig. 20, for upper 90 column are used. As before, the appropriate digit key is depressed to record the desired digit in the first column of the "upper zone" field. As shown in the analysis circuit diagram, Fig. 43, and in the full circuit diagram, Figs. 29, 30, 31 and 32, the upper zone keys are divided into two groups, the zero and the odd numbers in one group and the even numbers in the other group. If the key depressed by the operator is a cipher or an odd number, such as the number "7" for instance, the "7" key contacts 286 will be closed and the following circuit may be traced: From the positive generator terminal 266 through the "repeat trip" switch 268 to the "supply" lead 269, and through the "on-and-off" switch 271 to the "common" lead 272, thence through the coil of the "upper erase" relay 287, to the "upper erase" relay lead 288, to the group of contacts for odd digit keys, thence through the 7 key contacts 286 and the "II" lead to the "II" set magnet 206, thence to the "negative bus" 275, and the "negative bus" contacts 276, to the negative generator terminal 277. Energization of the "upper erase" relay 287 closes its contacts 289 to complete a circuit extending from the "common" lead 272 through the "upper erase" relay contacts 289 and the "upper erase" lead 281 to the "upper erase" magnet 206 and thence to the "negative bus" 275, "negative bus" contacts 276 and negative generator terminal 277. Thus, when the upper zone 7 key 286 is actuated, the "upper erase" magnet 206 and the "II" magnet 206 are energized to actuate the cores of their Bowden wires 77 and move the "upper erase" lever 111 and the "II" set-bar lever 72. The movement of the erase lever 111 depresses the set-bars "X" and "I" part way to displace one only of the slides 54 cooperating with the column, that is, the slide 54 which is equipped to latch set-bars in the upper half of the column. This procedure occurs exactly as before described to produce the desired erasing effect, and the desired "II" set-bar is fully depressed by the "II" set lever 72 as required, and latched by the slide 54. The spacing of the carriage likewise occurs as previously described.

Since, as shown in the code card diagram, Fig. 50, any even numbered digit is indicated by a perforation in the 9 position, that is, in upper zone, a punching caused by the "III" set-bar; and the full depression of the "III" set-bar will release any other set-up which may have been previously made, a separate erasing action is not necessary, and the even number key contacts need not "draw-through" the erase relay, but only through the "III" relay. Thus, the digit to be set in the next column may be an even number, in which case the circuit is shown in the analysis diagram (Fig. 43) and the complete wiring diagram, Figs. 29, 30, 31 and 32. The circuit extends from the "positive common" lead 272 through the coil of the "III" relay 291, thence through the "III" relay lead 292, to the even numbered key digit, which, for purposes of illustration, may be the "two" key 293, thence to the "XI" lead wire and to the "XI" set magnet 206, thence to the "negative" bus 275, the "negative bus" contacts 276 and the "negative" generator terminal 277. The energization of the coil of the "III" relay 291 closes its contacts 294 and establishes a circuit from the "positive" common lead 272 through the "III" relay contacts 294, through the III circuit wire to the "III" set magnet 206. These two circuits thereby energize two set magnets 206 to indicate the digit 2 by a setting of the "XI" set-bar and the "III" set-bar, through the agency of movements transmitted from the set magnets 206 through the Bowden wires 77 and the set levers 72 to the set bars 52. Thus, two set-bars are depressed simultaneously and the depression of these set-bars will displace the latch slide 54 sufficiently to release any other set-bars which may have been latched from a previous punch setting operation. This procedure may be continued until all of the upper zone fields have been set to record the desired data.

If by any chance the operator is not fully assured of the accuracy of the setting of the set-bars, the "card" key may be depressed to punch a test card.

Card

Figure 44:
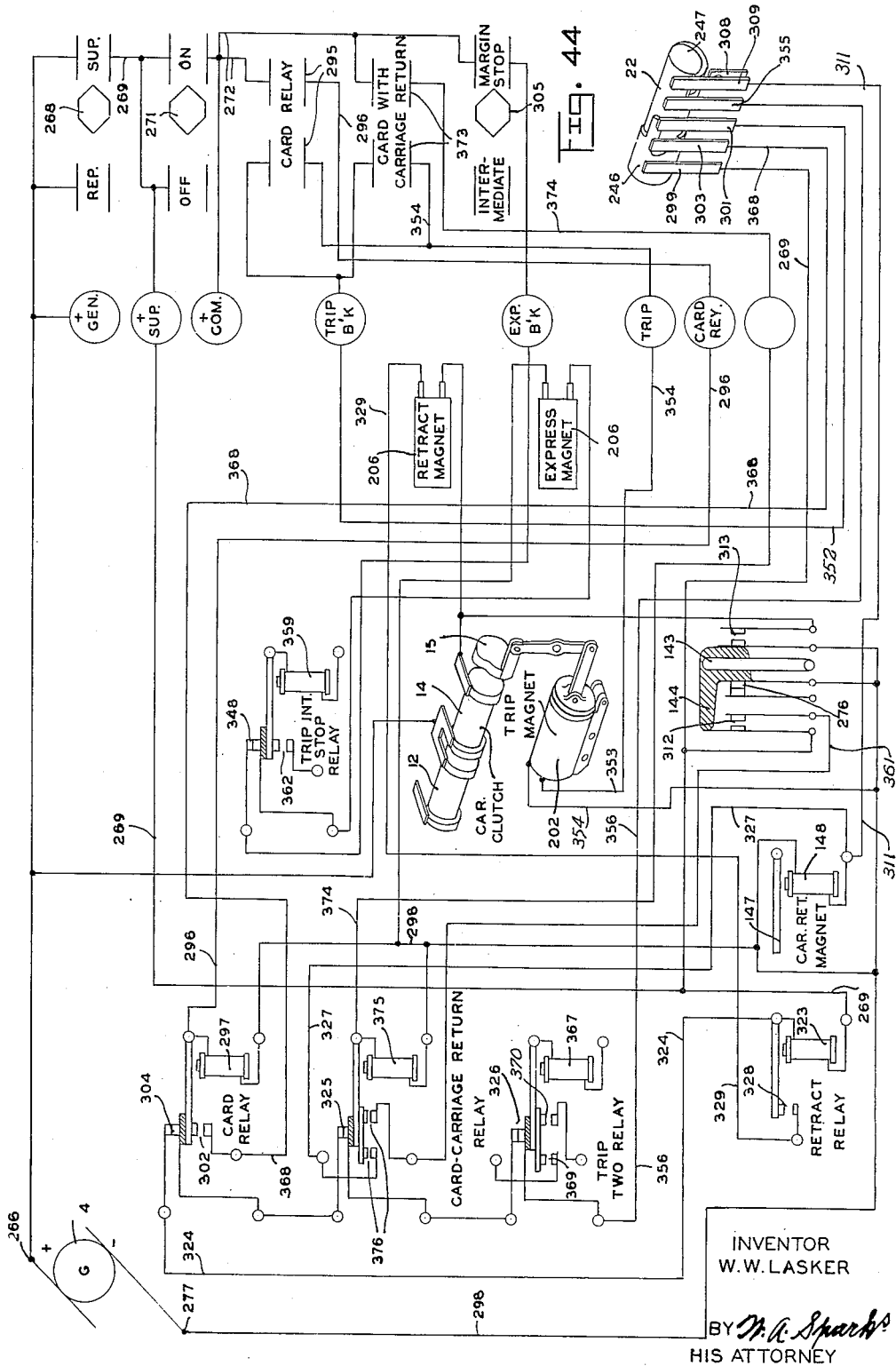

As shown in the analysis diagram, Fig. 44, and in Figs. 29, 30, 31 and 32, closure of the "card" key 295 completes the following circuits: From "positive" generator terminal 266 through the generator lead 267 to the "repeat" switch 268, the "supply" lead 269, and the "on-and-off" switch 271 to the "common" lead 272, thence to the right-hand pair of the "card" key contacts 295, thence through the "card relay" lead 296 to the coil of the "card" relay 297, thence through the negative lead 298 directly to the "negative" generator terminal 277. Simultaneously, the left-hand pair of contacts of the "card" key 295 complete a circuit leading from the "supply" lead 269 to the "supply" brush 299 on the commutator 22, thence through the commutator segment 246 to the "trip" breaker brush 301, thence through the lead 352 to the left-hand "card" key contacts 295; thence through the lead 353 to the "clutch trip" magnet 202, and from the magnet directly to the negative generator terminal through the negative lead 298. The circuit through the left-hand "card" key contacts 295 and the "trip" magnet 202 controls the punch clutch, which when closed engages the punch clutch 15 for the punching of the card, the feeding of the punched card to the receiver, and the feeding of a fresh card to the punching chamber. Energization of the "card" relay magnet 297 closes a pair of relay contacts 302 to complete a circuit from the "supply" lead 269 through the supply brush 299 on the commutator 22, to the segment 246, thence to the "relay breaker" commutator brush 303 and the lead 368 to the contacts 302, thence through the coil of the card relay 297 to the negative lead 298 and the negative generator terminal 277 as a holding circuit for the "card" relay 297. Simultaneously, movement of the "card" relay armature opens another pair of contacts 304 to open the circuit which otherwise would energize the "carriage return" magnet, thereby leaving the carriage at the same position and avoiding clearing of the set-bars just set up. Examination of the punched test card may show that the desired set-bars have been properly set. If not, the carriage may be back-spaced as previously described and any erroneous settings corrected.

Carriage return

Thereupon, the carriage return key 306 may be depressed, the "margin-intermediate" switch 305 having been set at "intermediate". Closure of the "carriage return" key 306 completes a circuit extending from the "positive" generator lead 266 through the "repeat-trip" switch 268 to the "supply" lead 269 as shown in analysis diagram Fig. 45 and Figs. 29, 30, 31 and 32, and the "on-and-off" switch 271 to the "common" lead 272, thence to the "carriage return" key contacts 306, thence through the carriage return lead 307 to the "carriage return" contact spring 308 at the commutator 22, thence to the carriage return brush 309, thence through the carriage return magnet lead 311 to the carriage return control-magnet 148 as shown in Fig. 45, and from the carriage return control magnet 148 through the "negative" lead 298 to the "negative" generator terminal 277. Energization of the carriage return magnet 148 attracts its armature 147 and rotates lever 146 in a counter-clockwise direction, thereby freeing the lever 143 and allowing the carriage return control bar 136 to move toward the right, as shown in Fig. 16. Simultaneously, movement of the lever 143 opens the "negative bus" contacts 276, as shown in Figs. 17 and 30 and closes the "carriage return circuit break" contacts 312 while simultaneously closing the contacts 313 in the circuit of the carriage return clutch winding. Closure of these latter contacts 313 completes a circuit from positive generator terminal 266 through the leads 267 and 314 to the brush 189 upon the slip ring 188 connected to the carriage return clutch winding 186, through the clutch winding to the second brush 189 from the second brush 189 to the carriage return clutch contacts 313, and thence to negative generator terminal 277 through the negative lead 298. The closure of the carriage return clutch magnet contacts 313 energizes the clutch magnet 186, and engages the clutch and winds up the tape 134, as shown in Figs. 1, 2, 4 and 16 to draw the carriage towards the left until the carriage stop member 139 engages with the intermediate stop 138, as shown in Figs. 1, 2, 7, 16 and 19. Engagement between these two members, while the travel of the carriage is continuing, carries the carriage control bar 136 to the left, thereby swinging the lever 143 under the catch on the lever 146, thus opening the carriage return clutch contacts 313 and the carriage break contacts 312 (to be later described) and closing the "negative bus" contacts 276 to deenergize the carriage return clutch 16; and reclose the setting and control circuits at the "negative bus" contacts 276.

Cancel

If, by chance, the test card punched as above described at the end of the setting of the fields of the upper zone, showed such a number of errors as to make it simpler to reset the entire zone rather than to backspace the carriage and correct single settings, the "cancel" key 322 may be actuated. This key causes return of the carriage with clearing of all of the set-bars, but without punching a card, the return being to the intermediate stop if the "margin-intermediate" switch 305 is set at "intermediate". The closure of the "cancel" key contacts 322 completes a circuit leading from the "positive" terminal 266 of the generator through the "repeat trip" switch 268 to the "supply" lead 269, thence to the coil of the "retract" relay 323 as shown in the analysis diagram, Fig. 45 and in Figs. 29, 30, 31 and 32, thence through the retract relay lead 324 to the contacts 304 in the "card" relay 297, thence to the contacts 325 in the "card-carriage return" relay, thence to the contacts 326 in the "trip two" relay, thence through the "cancel" key circuit wire 356 to the "cancel" key contacts 322; thence through the carriage return circuit wire 307 to the "carriage return" contact spring 308 at the commutator 22, thence to the "carriage return" brush 309 on the commutator 22, thence through the carriage return magnet lead 311, to the "carriage return" control magnet 148 and thence through the negative lead 298 to the "negative" generator terminal 277. This circuit initiates the carriage return action as above described because of the energization of the "carriage return" magnet 148, and simultaneously closes the contacts 328 of the "retract" relay, which, in turn, completes a circuit extending from the "positive supply" lead 269 through the "retract" relay coil 323 and the "retract" relay contacts 328, thence through the retract circuit wire 329 to the "retract" actuating magnet 206, thence through the lead 330 to the "carriage return" contacts 313, and thence through the negative lead 298 to the "negative" generator terminal 277. The energization of the "retract" magnet 206 actuates the lever 125 (Fig. 9) through the Bowden wire 77 and the lever 125 in turn actuates the link 64 and the link 62, which, in turn, swings the lever 59 on the pivot 61 in a counter-clockwise direction to bring the "retract" roll 58 downward into engagement with the "retract" levers 55, pushing them towards the left to move the rack slides 54 also towards the left and release any latched set-bars 52. The energization of the carriage return control magnet 148 (Fig. 16) attracts the armature 147, which moves the lever 146 to release the lever 143, actuates the contacts 145, and moves the control bar 136 to the right as previously described. Closure of the contacts 313 supplies current to the clutch 14, engaging it for the return of the carriage as previously outlined. The return of the carriage, and with it the retract roll 58, actuates the retract levers 55 over which it passes to push back the slides 54 and release the various latch pins 53, allowing the previously set set-bars 52 to rise, thereby clearing all of the set-up from the upper zone, and also insuring the clearing of the lower zone. This procedure is continued until the carriage reaches the terminal end of the full column zone.

Thereupon, the various fields in the upper zone may be re-set as desired. It will be obvious that this operation of the carriage return with cancelling of the set-up may be conducted after a setting in the lower zone as well as after a setting in the upper zone, and that, when this is done, both upper and lower zones are cleared, after which both fields may be reset.

Lower zone setting

The "upper" zone being completely set, the operations upon the keys of the middle group are discontinued, and operations upon the right-hand group for the "lower" zone are taken up. These operations, and the circuits employed, are closely similar to those described for the upper zone operations, except that the "lower erase" relay 315 together with the "VII" and "VIII" setting magnets 206 are utilized for erasing, and the "IX" relay is utilized for the even digits.

Thus, if the first column in the first field of the lower zone is to remain blank the space key 282 is touched, closing the space bar contacts and completing a circuit running from the "positive" generator terminal 266 through the "repeat trip" switch 268, the "supply" lead 269, and the "on-and-off" switch 271 to the "common" lead 272, thence to the "space" key contacts 282, thence through the space lead 283 to the "space" actuating magnet 206, thence to the "negative bus" 275, "negative bus" contacts 276 and the "negative" generator terminal 277. Energization of the space magnet 206 produces a spacing operation as pointed out in connection with the full column setting.

Figure 46:
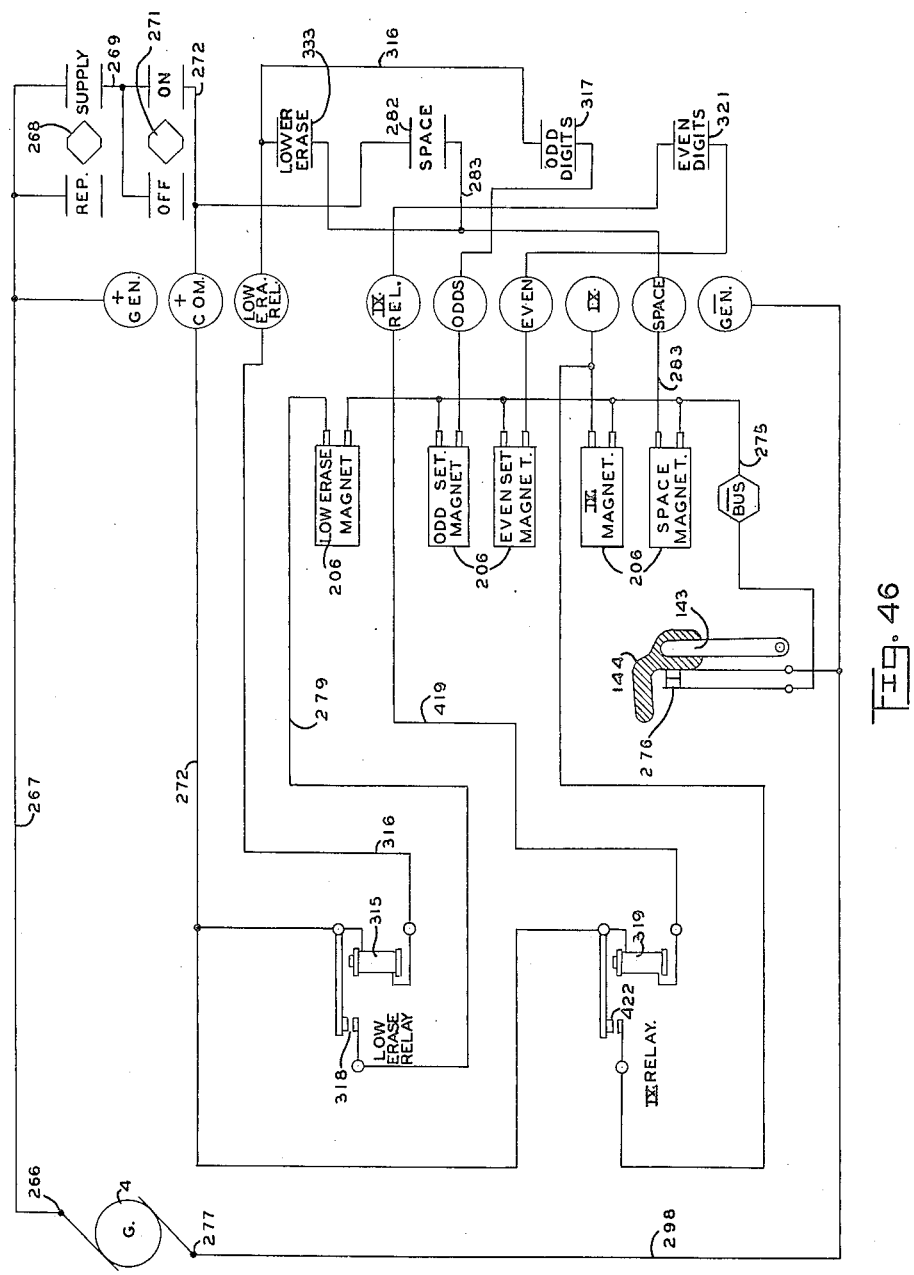

If thereafter an odd numbered "lower zone" digit key such as the "7" is touched, closure of the key contact 317 completes a circuit leading from the "positive" generator terminal 266 through the "repeat trip" switch 268 to the "supply" lead 269, the "on-and-off" switch 271, the "common" lead 272 and the coil of the "lower erase" relay 315, as shown in analysis diagram Fig. 46, and in Figs. 29, 30, 31 and 32, thence through the lower erase circuit wire 316 to the lower digit key, which in this instance, may be the "7" key 317, thence through the "VIII" circuit wire to the "VIII" set-up magnet 206 and from thence to the "negative bus" 275, "negative bus" contacts 276, and "negative" generator terminal 277. This circuit energizes the "VIII" set-up magnet to depress the desired VIII set-bar. Simultaneously, energization of the "lower erase" relay coil 315 closes the associated relay contact 318, thereby completing a circuit from the "common" lead 272 through the "lower erase" relay contacts 318 and the erase lead 279 to the "lower erase" magnet 206, thence to the "negative" bus 275, "negative bus" contacts 276 and "negative" generator terminal 277. Thus, the "lower erase" magnet 206 is energized. Through the Bowden wire 77 it actuates the "lower erase" lever 112 to produce an erasing action in the "lower" zone in a manner similar to that described for the "upper" zone.

In the lower zone, the even numbers are indicated by a setting of the "IX" set-bar in a manner similar to that in the upper zone, where the "III" set-bar is set and accordingly, for the setting of even numbered "lower zone" digits, it is not necessary to "draw-through" the "lower erase" relay 315, but is convenient to "draw-through" the "IX" relay 319 which produces a generally similar action of clearing previous set-ups, and setting the "IX" set-bar to indicate an even digit. Hence, if in the next column an even numbered digit such as the "6" digit is to be indicated, closure of the "6" key 321 completes a circuit from the "positive" common 272 through the coil of the "IX" relay 319, through the key contacts of the "6" key 321, through the "VII" set magnet 206, and thence to the "negative" bus 275, "negative bus" contacts 276 and "negative" generator terminal 277. Successive key cycles of these characters are then repeated until all of the fields in the lower zone have been set up.

Erasing

Figure 41:
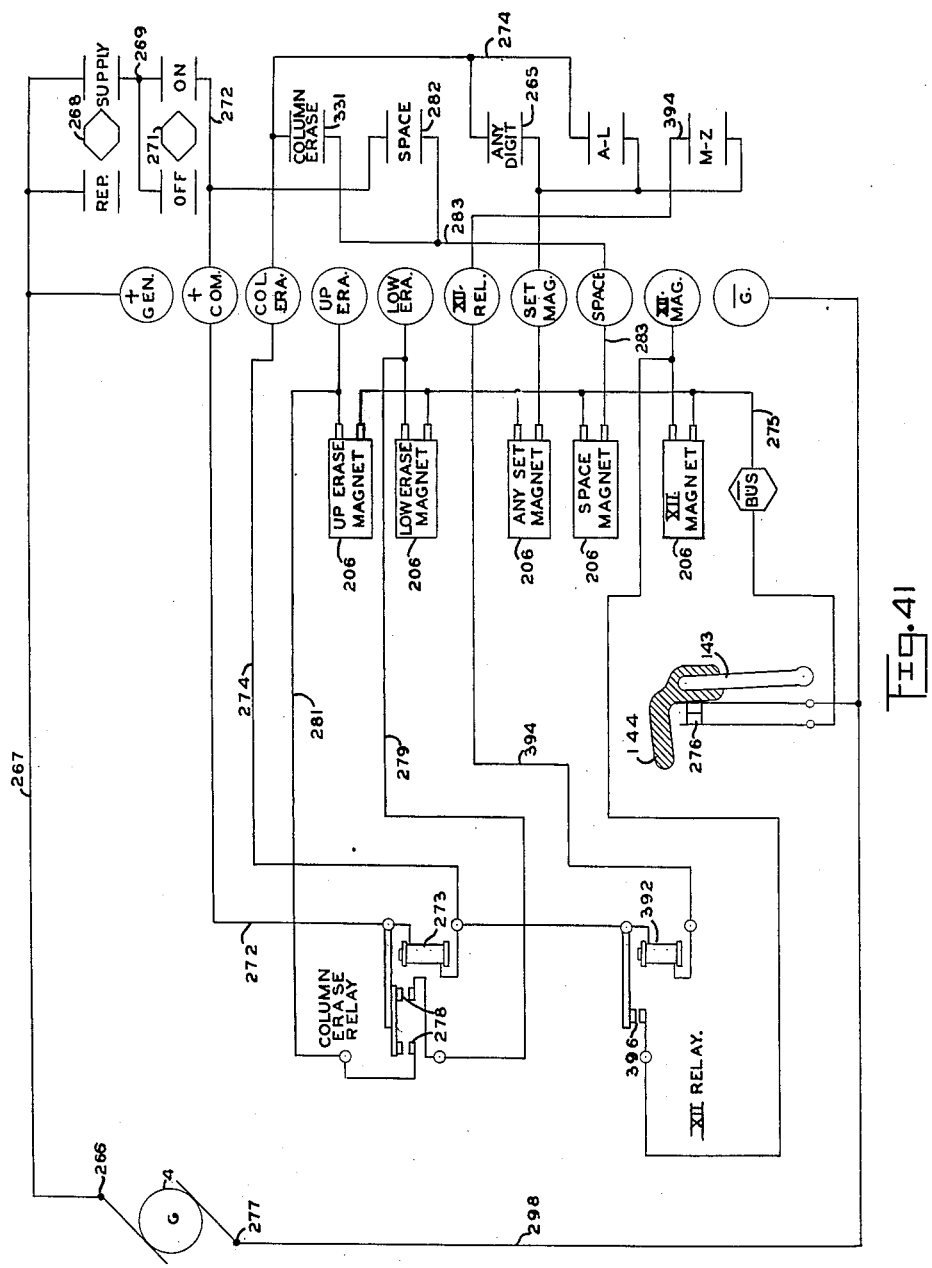
Figure 42:
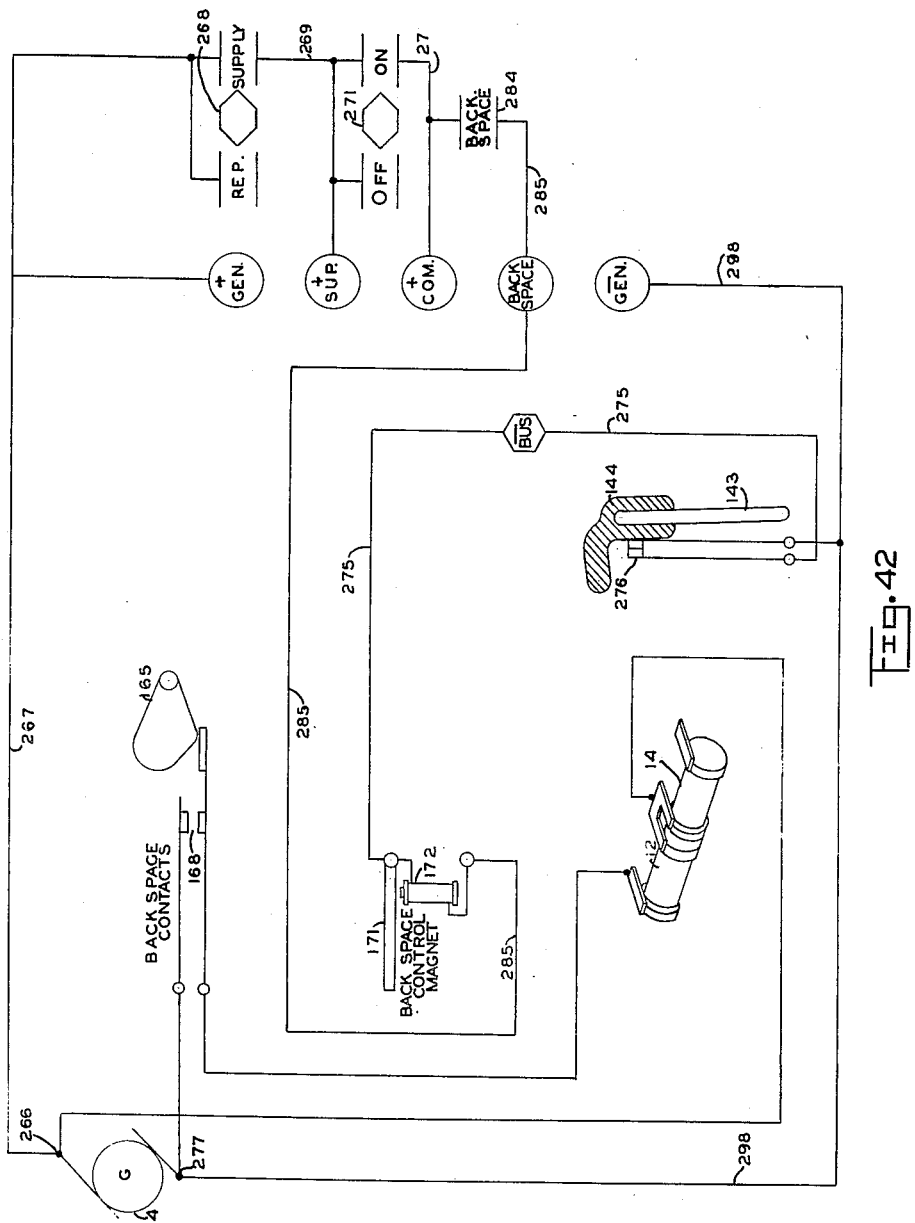
Figure 43:
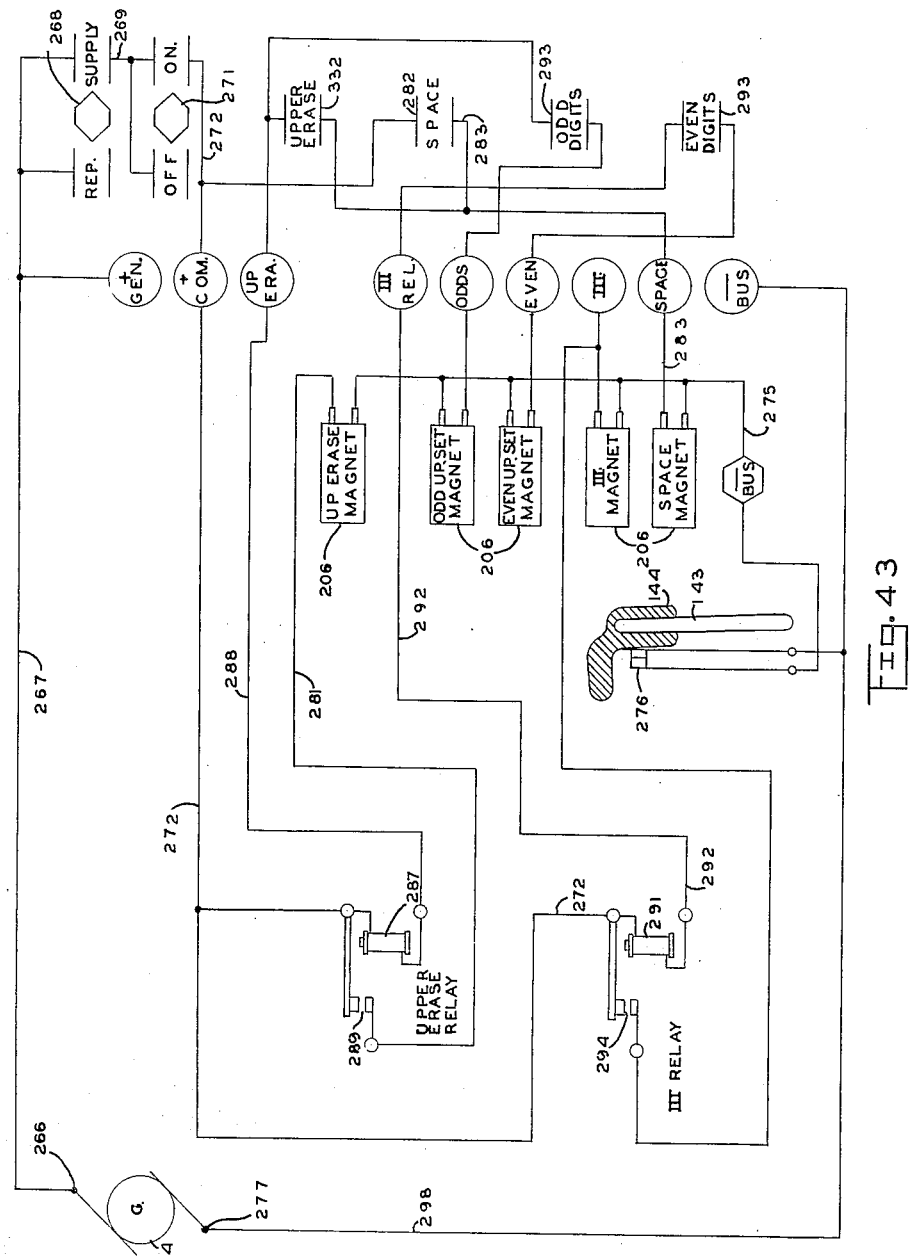

Under certain circumstances, it is desirable simply to erase the matter in certain columns and for this purpose three erase keys are provided, these being the "column erase" key, as shown in the analysis diagram, Fig. 41, an "upper erase" key, as shown in the analysis diagram Fig. 43, and a "lower erase" key, as shown in the analysis diagram, Fig. 46, all three being shown in Figs. 29, 30, 31 and 32.

Closure of the "column erase" key contacts 331 (Figs. 41 and 31) closes a circuit extending from the "positive" generator terminal 266 through the "trip repeat" switch 268, the "supply" lead 269, the "on-and-off" switch 271, the "common" lead 272, the "column erase" relay coil 273, the "column erase" key contacts 331, the "space" magnet 206, and thence to the "negative" bus 275, "negative bus" contacts 276 and "negative" generator terminal 277. The completion of this circuit causes the energization of the "column erase" relay 273 and closes its contacts 278, thereby completing a circuit extending from the "positive common" lead 272 through the "column erase" relay contacts 278 in parallel to the "upper erase" and "lower erase" magnets 206, thence to the "negative bus" 275, the "negative bus" contacts 276 to the "negative" generator terminal 277. Energization of the "upper" and "lower erase" magnets 206 move the cores of the corresponding Bowden wires 77 to actuate the "erase" levers 111 and 112 to perform the cycle of operations shown in Figs. 10, 11, 12 and 13 thus depressing the set bars 52 sufficiently far to force both latch slides 54, cooperating with that column, to the left sufficiently far to release any latched set-bars 52, thereby erasing any set-up which may be left in that column. The simultaneous actuation of the "space" magnet 206 from closure of the "erase" key contacts actuates the corresponding Bowden wire 77 to move the member 91 and the space bail 81 to step the carriage forward one column, preparatory to an erase or a setting in the next column.

Similarly, closure of the "upper erase" contacts 332 as shown in the analysis diagram Figs. 43 and 31, energizes the "upper erase" relay coil 287 to close its contacts 289 and actuate the upper erase mechanism magnet 206 and erase lever 111 for an erasing operation, and at the same time the closure energizes the "space" magnet 206 to space the carriage one column, thereby erasing any set-up which may have existed in the upper field. Similarly, actuation of the "lower erase" key 333 as shown in the analysis diagram, Fig. 46, and closure of its contacts energizes the "lower erase" relay 315 and the "space" magnet 206 to cause a similar erasing action in the lower field and a similar spacing action.

Skip

It sometimes happens that certain fields in a card are not to be punched, and under such circumstances it is desirable that provision be made for skipping these fields, the carriage passing over them without pause. This is particularly desirable in view of the fact that skipping over a field is faster and as accurate as passing over the unused field by means of the space key. Accordingly, the "upper skip" key 335 or "lower skip" key 336 is actuated accordingly as the unused field lies in the upper or lower zone. The "upper skip" key 335 is also conveniently usable for skipping a field in full column portions of the card.

Figure 47:
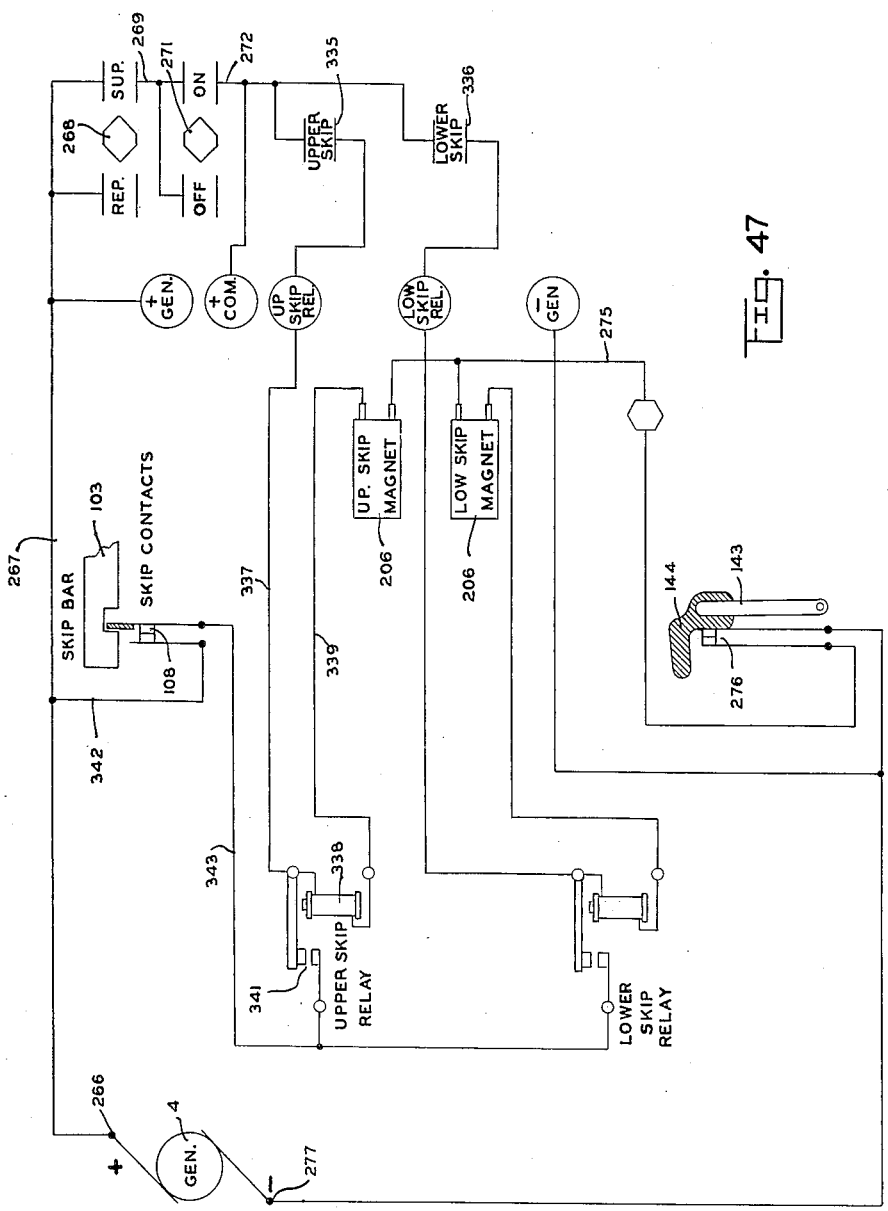

When a skip key such as the "upper skip" key 335 is touched, closure of the skip contacts completes a circuit as shown in the analysis diagram Fig. 47, and in Figs. 29, 30, 31 and 32, extending from the "positive" generator terminal 266 through the "trip repeat" switch 268, the "supply" lead 269, the "on-and-off" switch 271, the "common" lead 272, to the "upper skip" contacts 335, thence through the "upper skip" key lead 37 to the coil of the "upper skip" relay 338, thence through the "upper skip" magnet lead 339, to the "upper skip" magnet 206, and thence to the "negative" bus 275, "negative bus" contacts 276 and "negative" generator terminal 277. Energization of the "upper skip" magnet 206 actuates the lever 95 through the Bowden wire 77 and the lever 95 actuates the skip stop lever 97 swinging its forward end upward into the path of a skip stop 99 on the skip bar 103, as shown in Fig. 18, and simultaneously releasing the escapement. Closure of the "upper skip" relay contacts 341 also completes a circuit from the "positive" generator terminal 266 through the skip bar contact lead 342 to the "skip bar" contacts 108, thence through the lead 343 to the "skip relay" contacts 341, the "upper skip relay" coil 338, the upper skip magnet lead 339 to the "upper skip" magnet 206, thence through the "negative" bus 275 and "negative bus" contacts 276 to the "negative" generator terminal 277. This latter circuit serves as a holding circuit to insure completion of the skip operation, since, if the "skip" key were released before the skip operation was completed, the skip levers would be released and the escapement reengaged, with the carriage in a position short of the desired place. The circuit through the "skip relay" contacts 341 remains closed until the skip lever 97 engages a skip stop 99 to move the skip bar 103 towards the right by a small amount sufficient to open the skip bar contacts 108 and deenergize the "skip relay" 338 and the "skip magnet" 206 thereby insuring completion of the skip operation. If the skip key 335 is held with its contacts closed beyond the completion of the skip operation, the skip lever 97 is held up, in engagement with the skip stop 99 and accordingly, the carriage is arrested in the proper position. The skip operation can be repeated immediately as soon as it is completed and the key released, to permit the skip bar to move to the left under the urge of a spring. This movement is sufficient to bring the skip stop to the left of the skip lever, and thus permit the skip lever to rise for the next skip beyond the previously engaged skip stop 99 to engage with the next following skip stop 99. This operation is the same with either upper or lower skip keys except for the choice of skip relays, skip magnets, skip stops and skip levers as will be evident from the circuits shown in the several figures.

The several fields in the full column, and upper and lower zones having been set, the next step is the punching of the desired card. This completes the description of the "skip" operation, it being borne in mind that the normally closed contacts 276 may be opened by the shifting of 143 and block 144 as above described under "carriage return."

Trip

The ordinary punching operation is technically known as a "trip", and is obtained by actuating the "trip" key. The operation consists of a punching of the card, a discharge of the card, and an insertion of a fresh card into the punching chamber, a return of the carriage to the margin stop, and a clearing of all of the set-bars. This group of operations is obtained by the circuits shown in the analysis diagram, Fig. 48, and in the wiring diagram of Figs. 29, 30, 31, and 32. When the "trip" key 345 is actuated, several circuits are completed, one of which extends from the "positive" generator terminal 266 through the "repeat trip" switch 268, the "supply" lead 269, and through the "on-and-off" switch 271, the "common" lead 272, the right-hand "trip" key contacts 345 (left-hand in Fig. 31) through the trip relay lead 346 to the "trip relay" coil 347, thence to the contacts 348 of the "trip to intermediate stop" relay, thence through the express magnet lead 349 to the "express" magnet 206 and thence to the "negative" bus 275, negative bus contacts 276 and the negative generator terminal 277. The "express" magnet serves to lift the intermediate stop member 139 above the level of the intermediate stop 138 on the carriage-return control-bar 136, thereby permitting the carriage to travel to the left-hand margin stop. Simultaneously, the left-hand pair (right-hand in Fig. 31) of "trip" key contacts 345 close a circuit extending from the "supply" lead 269, to the "supply" brush 299 on the commutator 22, thence through the commutator segment 246 to the "trip" breaker brush 301, thence through the trip breaker lead 352 to the left-hand pair of "trip" key contacts 345, thence through the clutch trip lead 353 to the clutch trip magnet 202 controlling the punch-clutch 15 and thence through the clutch trip return lead 354 to the "negative" generator terminal 277. This second circuit engages the punch-shaft clutch 15 to drive the shaft 16 whereupon the die 26 is elevated by the cam 19, the card punched, the card gate 45 and the die 26 lowered, the card removed, and discharged to the card receiver, and a fresh card fed from the magazine 36 into the punching chamber.

As soon as the punch shaft clutch 15 is engaged, the punch shaft 16 begins to rotate and with it the three cams 18, 19, and 21 for the several punching functions also rotate, and, in addition, the commutator 22 also rotates. It will be observed that the commutator segment 246, cooperating with the supply brush 299 and the trip breaker brush 301, moves and carries the extension finger of the segment 246 (Fig. 6) out from under the trip breaker brush 301, thereby opening the circuit between the supply lead 269 and the left-hand pair of trip key contacts 345, thus opening the circuit to the trip magnet 202, and returning the trip stop 199 into the path of the projection 198 on the clutch disc 192 preparatory to disengaging the clutch at the end of the punching cycle. At the same time the auxiliary commutator segment 247 recedes from the cancel brush 355 and carriage-return-control-brush 309 through half of the cycle until the leading edge of the auxiliary segment 247 engages with the cancel brush 355 and the carriage return control brush 309. When the leading edge of the auxiliary commutator segment 247 bridges across from the cancel brush 355 to the carriage return control brush 309, a circuit is closed extending from the "supply" lead 269 through the coil of the "retract" relay 323 and the retract relay lead 324 to the contacts 304 of the "card" relay, the contacts 325 of the "card and carriage return" relay, the contacts 326 of the "trip two" relay, and through the "cancel" brush lead 356 to the "cancel" brush 355, thence to the "carriage return control" brush 309, thence through the carriage return magnet lead 311 to the "carriage return control" magnet 148 and thence through the negative lead 298 to the "negative" generator terminal 277.

It will be observed that there are two coils in this circuit, the "retract relay" coil 323 and the "carriage return" magnet 148. When the circuit is completed and the "carriage return" magnet 148 is energized, it attracts the armature 147, operates the lever 146, and releases the lever 143 as shown in Fig. 16, to initiate a carriage return operation as above described. Simultaneously, the energization of the "retract" relay coil 323 closes its contacts 328 and establishes a circuit from the "supply" lead 269 through the coil of the "retract" relay 323, through the contacts 328 of the "retract" relay, thence through the retract circuit wire 329 to the "retract" magnet 206, thence through the retract magnet return lead 330 to the "carriage return" control contacts 313 and thence through the negative lead 298 to the "negative" terminal 277 of the generator. Energization of the "retract" magnet 206 actuates the core of the corresponding Bowden wire 77 as shown in Fig. 9 to lower the "retract" roll 58 into engagement with the retract levers 55 as previously described, whereupon movement of the carriage to the left-hand margin clears all of the set-bars by movement of the slides 54 in rapid succession, as the carriage is moved towards the left.

The punching operation proper is completed during one revolution of the punching shaft 16, and the carriage return operation, with clearing, is initiated at about the middle of the punching operation, that is, after all of the punches have been driven through the card. The carriage return operation also requires nearly a full revolution of the "carriage-return-clutch" disc 14; hence the carriage return is not completed until nearly a half revolution of the clutch drive members 14 after the release of the clutch 15. However, the fact that the carriage return control contacts 313 remain closed until the carriage is fully returned to the left-hand margin insures completion of the operation and, because of the holding circuit through the retract relay 323, the clearing roll 58 likewise is carried along over the entire series of retract levers 55 and latch slides 54, thus completing the operation of punching a card with the desired data and leaving the machine in condition for a wholly new set-up on a subsequent card.

It will be observed that the segments 246 and 247 upon the commutator 22 are formed by metal of substantial thickness, and that accordingly, when the commutator is rotated through the course of the punching operation, the commutator segment 247, coming into contact with the carriage return brush 309 separates the contact thereon from the carriage return contact spring 308, thereby opening the circuit from the carriage return key 306 to the carriage return control magnet 148, deenergizing it and allowing the lever 146 to drop downward ready to engage the lever 143 when it is returned to its original position. The carriage return circuit is, however, broken only during the latter half of the punch cycle, and is re-closed at the close of the cycle. Ordinarily the key is released by the operator before the carriage return cycle is completed. If, however, the key is held closed, the circuit through the carriage return control magnet is re-completed at the end of the carriage return operation. No further carriage return action takes place however, because of the fact that at the close of the carriage return cycle, the lever 143 is moved sufficiently to bring the left-hand end into engagement with the latch upon the lower auxiliary latch lever 149 where it is held as long as the carriage return control magnet remains energized, thereby holding open the carriage return clutch contacts 313. When thereafter the carriage return key is released, opening the circuit, the carriage return control magnet is deenergized, and the lever 146 swung clockwise, depressing the auxiliary latch lever 149 from the lever 143 which, thereupon, engages the latch lever 146 preparatory to another carriage return operation upon reclosure of the key.

Trip to intermediate stop

It sometimes happens that several successive cards are to be punched with the same data in certain of the left-hand fields, that is, various types of cards are prepared with a date in the first field at the left of the card, or with a serial number, or, when the alpha numeric keyboard is used, with alphabetic matter which is to occur in several successive cards. It is, of course, a waste of time to reset this uniform data for each successive card, and, accordingly, it is desirable that it should be retained, set up in the fields. For this procedure, the punch carriage should be returned only to the end of this field, and only set-bars to the right of this field should be cleared. For this purpose, the intermediate stop 138 on the carriage return control bar 136 is provided to cooperate with the movable stop 139 on the carriage, for the purpose of bringing the carriage back only to the intermediate position at which the beginning of setting of the new data is to occur, rather than to the left-hand end of the card.

In the operation of this feature of the invention, the "trip, intermediate stop" key 357 is depressed, whereupon a circuit is closed through the right-hand pair of contacts of the "trip, intermediate stop" key 357 from the "positive" generator terminal 266 through the "trip-repeat" switch 268 to the "supply" lead 269, and through the "on-and-off switch" 271 to the "common" lead 272, thence to the right-hand contacts of the key 357, thence through the "trip intermediate stop" lead 358 to the coil 359 of the "trip, intermediate stop" relay, and thence through the negative lead 298 to the "negative" generator terminal 277. Simultaneously, closure of the left-hand pair of contacts of the "trip, intermediate stop" key 357 completes a circuit extending from the "positive" generator terminal 266, through the "trip repeat" switch 268, the "supply" lead 269, thence to the "supply" brush 299 on the commutator 22, thence through the segment 246 to the "trip breaker" brush 301 on the commutator 22, thence through the trip breaker brush lead 352 to the left-hand key contact 357, thence through the clutch trip lead 353 to the punch-clutch-trip magnet 202, and thence through the negative lead 298 to the "negative" generator terminal 277. The energization of the "trip, intermediate" relay 359 first opens the relay contacts 348 in the "express" magnet circuit to insure against operation of the express magnet 206 and to prevent the raising of the movable intermediate stop 139 on the carriage, and thereafter closes another pair of contacts 362 which close a circuit extending from the "supply" lead 269, through the carriage breaker contacts 312, thence through the lead 361 to the "trip, intermediate stop" relay contacts 362, thence through the coil 359 of the "trip, intermediate stop" relay, and thence through the negative lead 298 to the "negative" generator terminal 277. This latter circuit provides a holding circuit for the relay 359, for further insurance against energization of the "express" magnet. It will be noted that if the "margin-intermediate" switch 305 is in "margin" position to provide current to the express magnet 235 to permit the carriage to be returned to the left-hand margin, it is without effect upon the operation of the "trip, intermediate stop" key 357, since the circuit from the common lead 272 through the "margin" contacts of the "intermediate-margin" switch 305 is opened at the "trip-intermediate stop" relay contacts 348. The punch clutch is engaged by the key 357 in the same manner as above described in connection with the "trip" key 345 by the closure of the left hand pair of contacts 357 and the flow of current through the punch clutch lead 353 to punch the card and to return the carriage with clearing, the essential difference between the two being the opening of the circuit to the "express" magnet 206 by the relay 359 at its contacts 348 and the fact that the intermediate stop 138 is utilized instead of the margin stop 137 because of the difference in position of the carriage stop member 139.

Then, the operator at the close of a group of cards causes the carriage to return to the margin by the use of the trip key 345, and for the next card sets the desired new data in the several left-hand fields and continues with the set-up for the remaining fields in the first card of the new group. Then by operating the "trip, intermediate stop" key 357, the carriage is returned and the set bars cleared only up to the end of the material in the first fields which is common to the group of cards. Thereafter, the differing data for the second card may be set on the set-bars and the "trip, intermediate stop" key 357 utilized again, this procedure being continued until the last card of the group is reached, whereupon the "trip" key 345 is utilized to clear the entire set-bar field, or, if the operator has used the "trip, intermediate stop" key 357 for the last card, the carriage may be returned from the intermediate stop to the margin stop with clearing of the remaining set-bars by touching the "cancel" key 322 as previously pointed out.

Trip two

Figure 48:
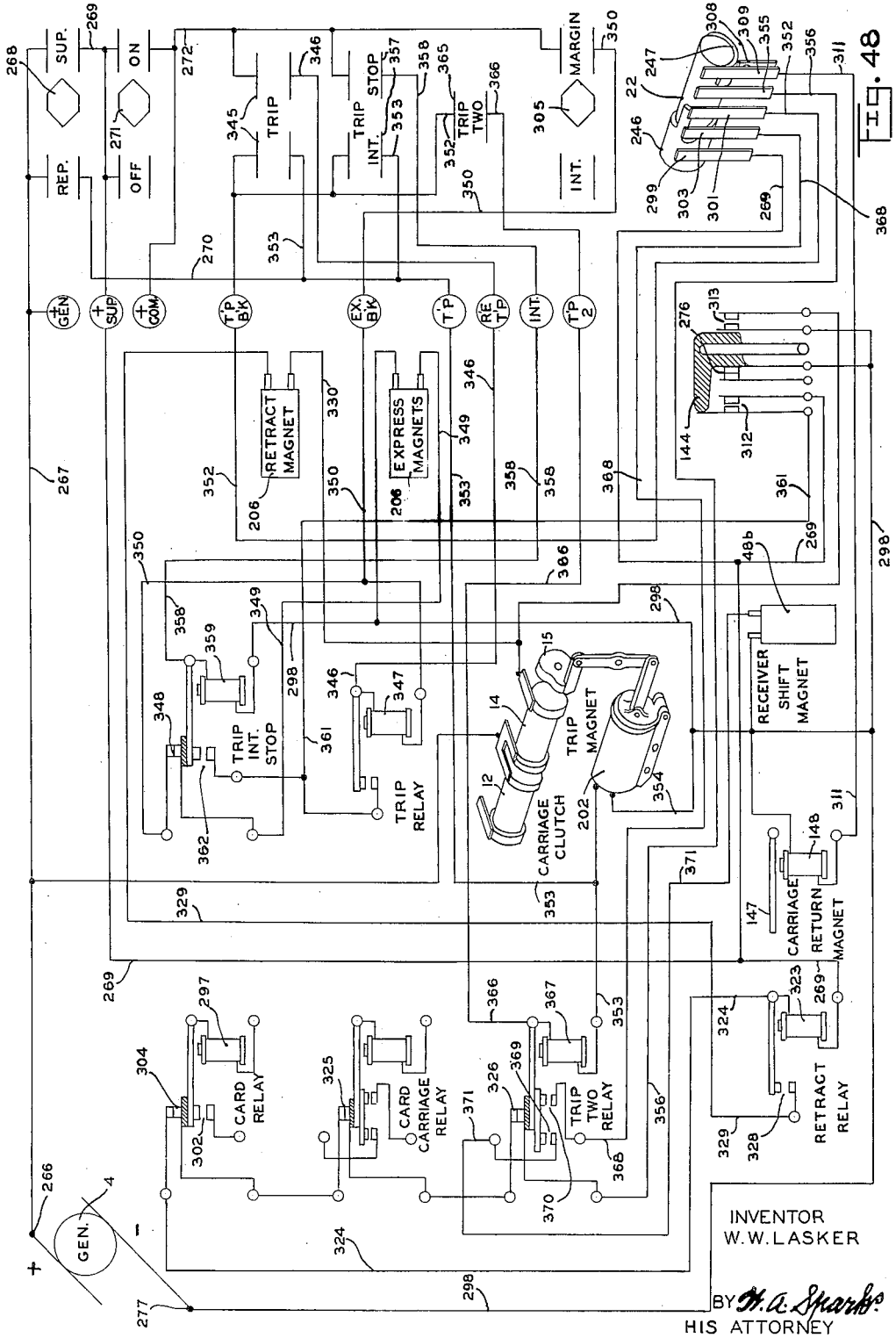

Under still other operating conditions, it is desirable to prepare two, duplicate, cards from each set-up and distribute them into separate pockets. For this purpose, the "trip two" key 365 is provided, as is shown in the analysis diagram Fig. 48 and in the complete diagram Figs. 29, 30, 31 and 32. For this punching function, it is, of course, necessary that the double card receiver shown in Figs. 3 and 23 be incorporated in the punch instead of the more common single card receiver. As is shown in Fig. 23, the card gate 48 is controlled by the receiver shift magnet 48b, the magnet being connected as shown in Figs. 30 and 48. When the "trip two" key 365 is operated, a circuit is completed, which extends from the "positive" generator terminal 266 through the "trip repeat" switch 268, the "supply" lead 269, the "supply" brush 299 on the commutator 22, the commutator segment 246, the "trip breaker" brush 301, the "trip breaker" lead 352, the "trip two" contacts 365 and the "trip two" lead 366 to the coil of the "trip two" relay 367, and thence through the clutch trip lead 353 to the punch clutch trip magnet 202 and the leads 354 and 298 to the "negative" generator terminal 277. Closure of this circuit thus engages the punch clutch 15 for the punch of a card, and simultaneously energizes the "trip two" relay 367. This energization of the "trip two" relay opens the contacts 326 in the circuit of the "retract" relay coil 323 which circuit includes also the "carriage return control" magnet 148, thus preventing the return of the carriage and clearing of the set-bars during the punching of the first card. Simultaneously, energization of the "trip two" relay 367 closes a circuit leading from the "positive" supply lead 269 through the "supply" brush 299 on the commutator 22, the commutator segment 246, the "relay breaker" brush 303, thence through the relay breaker lead 368 to the "trip two" relay contacts 370 and 369, thence through the "receiver shift" lead 371 to the "receiver shift" magnet 48b, and thence through the negative lead 298 to the "negative" generator terminal 277. Energization of the "receiver shift" magnet 48b feeds the first card into the inner or front card-receiver pocket. Simultaneously the closure of the other pair of "trip two" relay contacts 370 completes a holding circuit leading, as before, from the positive "supply" lead 269 through the "supply" brush 299, the commutator segment 246, the "relay breaker" brush 303, the relay breaker lead 368, the "trip two" relay contacts 370, the "trip two" relay coil 367 and the punch-clutch trip-magnet 202 and the lead 354 to the "negative" generator lead 298. It will be noted that this "relay breaker" brush 303 contacts with the commutator segment 246 immediately after the commutator 22 begins to revolve, and accordingly the holding circuit for the "trip two" relay 367, which includes the trip magnet 202 is maintained through the remainder of the revolution of the punch shaft and commutator, that is, through the remainder of the punching cycle, and long enough to prevent disengagement of the punch clutch 15 at the end of the cycle, thus initiating a second punching cycle, and accordingly, a second card is punched. At the beginning of the punching of the second card, the "trip two" relay 367 is deenergized by the opening of the holding circuit at the "relay breaker" brush 303 which also deenergizes the clutch magnet 202. The deenergization of the "trip two" relay magnet 367 opens its contacts 369, and thereby interrupts the "receiver shift" circuit and the holding circuit. The deenergization of the relay magnet 367 also closes the contacts 326, and thereby prepares the circuit which contains the "retract" relay coil 323 and the "carriage return control" magnet 148 for closure by the commutator 22. This latter circuit then extends from the "positive" generator terminal 266 and lead 267 through the "repeat trip" switch 268 to the "supply" lead 269, thence to the coil of the "retract" relay 323, thence through the lead 324 to the contacts 304 of the "card" relay, the contacts 325 of the "card-carriage return" relay, and the contacts 326 of the "trip two" relay in series, thence through the lead 356 to the "cancel" brush 355, when the commutator 22 has rotated far enough to engage the auxiliary segment 247 with the "cancel" and "carriage return control" brushes. Thence, the circuit extends through the lead 327 to the "carriage return control" magnet 148, and thence through the lead 298 to the "negative" generator terminal 277. Energization of the "retract" relay 323 supplies current to the "retract" magnet 206 to engage the retract roll 58 with the retract levers 55 to clear the set-bar field, and energization of the "carriage return control" magnet energizes the carriage return clutch 14 as before described.

Margin-intermediate carriage return

The point to which the carriage is returned by several of the operations which involve return of the carriage, is controlled by the "intermediate-margin" switch 305, as shown in the analysis diagram of Fig. 48 and Figs. 29, 30, 31, and 32. If this switch is in "margin" position, it closes a circuit from the "positive" generator terminal 266 through the "repeat trip" switch 268, the "supply" lead 269, the "on-and-off" switch 271, and the "common" lead 272 to the contacts of the "intermediate-margin" switch 305, thence through the lead 350 to the upper contacts 348 of the "trip, intermediate stop" relay 359, thence through the lead 349 to the "express" magnet 206, and thence to the "negative" generator terminal 277. Accordingly, if this switch 305 is in "margin" position, carriage return will be to the margin for all carriage return operations except the "trip, intermediate stop". This occurs because of the energization of the "express" magnet, which operates the core of the Bowden wire 77 as shown in Fig. 19, to lift the carriage "intermediate" stop member 139. Alternatively, if the intermediate-margin switch is in "intermediate" position, this circuit is opened and the carriage stop 139, as shown in Fig. 19, is lowered to engage with the intermediate stop 138, except in a "trip" operation for which the "express" magnet 206 is in circuit with the "trip" key 345.

It will be observed that because of the arrangement of brushes upon the commutator 22, a holding of any of the trip keys will maintain energization of the trip magnet 202 and thereby permit the punch-clutch 15 to remain engaged, thereby causing cards to pass continuously through the machine. However, if it is the "trip" key which is held closed, the return of the carriage at the close of the first punching operation clears all of the set-bars and, accordingly, the cards which are passed through the machine, after the first card, are unpunched. Similarly, the "trip, intermediate stop", because of the return of the carriage to the intermediate stop 138 will punch only the first card with a complete record and succeeding cards which pass through the punch, because of the continuous holding of the key, are punched only with the data common to the group of cards. Continuous holding of the "trip two" key 365 provides the predetermined two cards, then clears the set field, and thereupon the subsequent cards will pass through the machine unpunched.

Repeat trip

Under still other conditions of operation of the punch, it is desirable that a considerable number of cards be produced from one set-up of the set-bars, and for this purpose the "repeat trip" switch 268 is provided. In this operational procedure, the set-bars 55 are set-up as previously described, and when the setting operation is completed, and the punching operation is to be initiated, the "repeat trip" switch 268 as shown in Figs. 1, 2, 3, 20, 32 and 48 is thrown from "supply" to "repeat", thereupon closing a circuit leading from the positive generator terminal 266, through the lead 267, the switch 268, the repeat lead 270 and the clutch trip lead 353 directly to the "punch-clutch trip" magnet 202 and thence to the "negative" generator terminal 277. The punch clutch is thereupon engaged and remains engaged as long as the switch 268 is in "repeat" position. At the close of the punching of the next to the last card, or immediately after the beginning of the punching of the last card, the switch 268 is thrown from "repeat trip" to "supply", thereby opening this circuit and closing the alternative circuit to the "supply" lead 269, thence to the "retract" relay 323, thence through the contacts 304 of the "card" relay, the contacts 325 of the "card-carriage return" relay, the contacts 326 of the "trip two" relay 367, the lead 356 to the "cancel" brush 355, the auxiliary commutator segment 247, the "carriage return" brush 309, the "carriage return" lead 311, the "carriage return" control magnet 148 to the "negative generator" terminal 277. This circuit, when closed by the commutator segment 247, actuates the carriage return mechanism and the retract mechanism at the appropriate time to return the carriage and clear the set-bars, as an incident to the punching of the last card.

It will be observed that there is provided also an "on-off" switch 271, which in the punch keyboards is connected in series with the "trip repeat" switch 268. This switch 271 is provided for the purpose of disabling or disconnecting the punch keyboard when the punch is to be operated from some other control mechanism such as the contacts under the typewriter keys, since in the absence of such a switch a punch set-up derived from the typewriter keyboard can be harmed by accidental actuation of the punch keyboard keys.

Card and carriage return

Another type of operation, which is desirable under occasional circumstances, is that in which a card is punched and the carriage returned either to the margin stop or intermediate stop without any other function. This is obtained by operation of the "card with carriage return" key 373, as shown in the analysis diagrams of Fig. 44, and in the complete circuit diagram of Figs. 29, 30, 31 and 32. It will be observed that this key 373 has two pairs of contacts. The closure of the right-hand pair, as shown in the figures completes a circuit extending from the positive generator terminal 266 through the generator lead 267, the repeat trip switch 268, the supply lead 269, the "on-off" switch 271, and the common lead 272 to the key contacts 373, thence through the "card-carriage" lead 374 to the coil of the "card-carriage-return" relay 375, and thence through the negative lead 298 to the negative generator terminal 277. Energization of the relay 375 opens the contacts 325 of the relay, which are connected in the circuit of the retract relay 323, thereby preventing energization of the retract relay 235 and preventing clearing of the set-bar field.

Simultaneously, energization of the relay 375 closes the contacts 376, thereby closing two circuits connected thereto, one circuit extending from the positive generator terminal 266 and the various switches and leads previously mentioned, through the card-carriage key contacts 373, the lead 374 and the contacts 376 to the carriage return lead 311, thereby energizing the carriage return magnet 148 for the return of the carriage as previously described. The second circuit from the contacts 376 extends from the positive generator terminal 266 through the repeat trip switch 268, the supply lead 269 to the carriage controlled contacts 312, thence through the holding circuit lead 361, thence through the contacts 376, to supply the previously described circuit extending from the other pair of the contacts 376, and also to supply the coil of the relay 375, thence to the negative lead 298, this latter circuit serving to hold the relay energized, and the carriage return magnet energized, until the contacts 312 are opened by the completed return of the carriage to the left-hand stop. Simultaneously, the left-hand pair of key contacts 373 close a circuit extending from the positive generator terminal 266, through the generator lead 267, the trip repeat switch 268, the supply lead 269, the supply brush 299, the commutator segment 246, the trip breaker brush 301, the lead 352, the left-hand contacts 373, and the lead 353 to the "trip" magnet 202, and thence to the negative generator lead 298 and the negative generator terminal 277. Energization of the trip magnet 202 engages the clutch for the required card punch operation.

Thus, this key-function is similar to that performed by the "card" key except that it returns the carriage to the left-hand stop. It is also somewhat similar to the ordinary "trip" operation except that it does not clear the set-bars. It is particularly useful when as occasionally happens two cards, one punched for full column and upper zone matter only, are required, and another similar card plus lower zone matter is required. It combines in one key the functions of the "carriage-return" key 306 and the "card" key 295.

Transfer switch operation

For many punched card uses, it is desirable to record on the card certain information other than numeral digits. This may be done by the so-called "alphabetic" recording, a two-unit full-column code being utilized which the tabulator can interpret for the printing of alphabetic information such as the name of the material sold, the name of a customer, or other desired alphabetic data. The character of code used for the recording of such data is shown in Fig. 50, from which it will be evident that the letters of the alphabet from A to L, inclusive, are represented by single perforations in the twelve different levels in the card and that the remainder of the alphabet is represented by the same perforations, plus a hole in the top row, that is, the XII position and a hole in one of the remaining positions, certain of the less commonly used letters being represented by a single code combination, O and Q being represented by a single symbol, and X and Z similarly being represented by one code combination and one symbol, etc. It is, of course, possible to prepare alphabetic data on a punch equipped only with numeric keys by operating the proper numbered keys for the first half of the alphabet and by operating the "twelve" key together with the other appropriate numbers for the remainder of the alphabet. This, however, is inconvenient, unsatisfactory, and conducive to errors. Efficient operation requires the provision of a set of alphabetic keys as shown in Fig. 21. A keyboard made up of a set of alphabetic keys, a set of full column keys, a set of upper zone keys, and a set of lower zone keys, four distinct but cooperating keyboards, is, of course, possible and the method of construction and connection is obvious from the present disclosure. It is, however, unwieldy and inconvenient because of the size of the keyboard. Accordingly, the keyboard of Fig. 21 containing one set of alphabetic keys and one set of digital keys, together with the previously outlined control keys, is preferable and much superior as far as convenience of operation, compactness and efficiency are concerned.

The previously described transfer switch of Figs. 24 to 28, inclusive, permits the use of one set of numeric keys for all three types of numeric recording, that is, for full column numeric setting, upper zone numeric setting and lower zone numeric setting, according to the position of the transfer switch, without interference from or with the alphabetic keyboard portion. The alpha-numeric keyboard of Fig. 21 is similar in size and shape to the triple-numeric switch of Fig. 20, the operation of which has been previously described. Accordingly, the alpha-numeric keyboard may be substituted directly in place of the triple-numeric keyboard, merely by the disconnection of the wires and removal of the bolts holding the keyboards in place and the replacement and reconnection of the alpha-numeric keyboard and circuits. In the construction of those punches which are to be altered frequently by the interchanging of keyboards, the connections from the various punches, magnets and relays are led to a connection board equipped with "Pfahnstock" clips, to which the relay and magnet leads are soldered. The keyboard leads are soldered to the key contact springs and the cables "fanned" to bring the wires into proper position for connection to the "Pfahnstock" clips, thus permitting easy interchange of the several keyboards.

The connections required for operation of the punch from the alpha-numeric keyboard through the transfer switch are shown in full in a wiring diagram made up of Figs. 29, 30, 33, 34, 35, and 36 assembled as shown in Fig. 52. The analysis diagrams of Figs. 40 to 48, inclusive, apply to the circuits involved in this connection diagram in the same way they apply to the circuit diagrams of the triple numeric keyboard, except that the analysis diagrams do not show the transfer switch, the connections through it, nor the mechanism for the control of it. Reference to the analysis diagrams for each function will show the basic connections which then are more easily traced through the complete wiring diagram.

In the operation of the punch with the alpha-numeric keyboard, it may be considered that the punch carriage has been returned to the left-hand margin and the set-bar field cleared of all previous set-ups by the prior user. The power switch 6 is then closed as before described, to bring the motor 3 up to speed and the generator 4 up to voltage. Thereupon, the punch is ready for operation. Taking it for granted that there is a fresh card in the punch chamber and a supply of fresh cards in the supply magazine, the operator may proceed with the operation of setting up the desired data on the set-bars. If, as is often the case, the first field in the card contains a date, and the second field contains alphabetic information, the date field is usually punched according to the full column code especially since this permits the use of the "11" and "12" keys.

*Full column code numeric setting*

Figure 35:
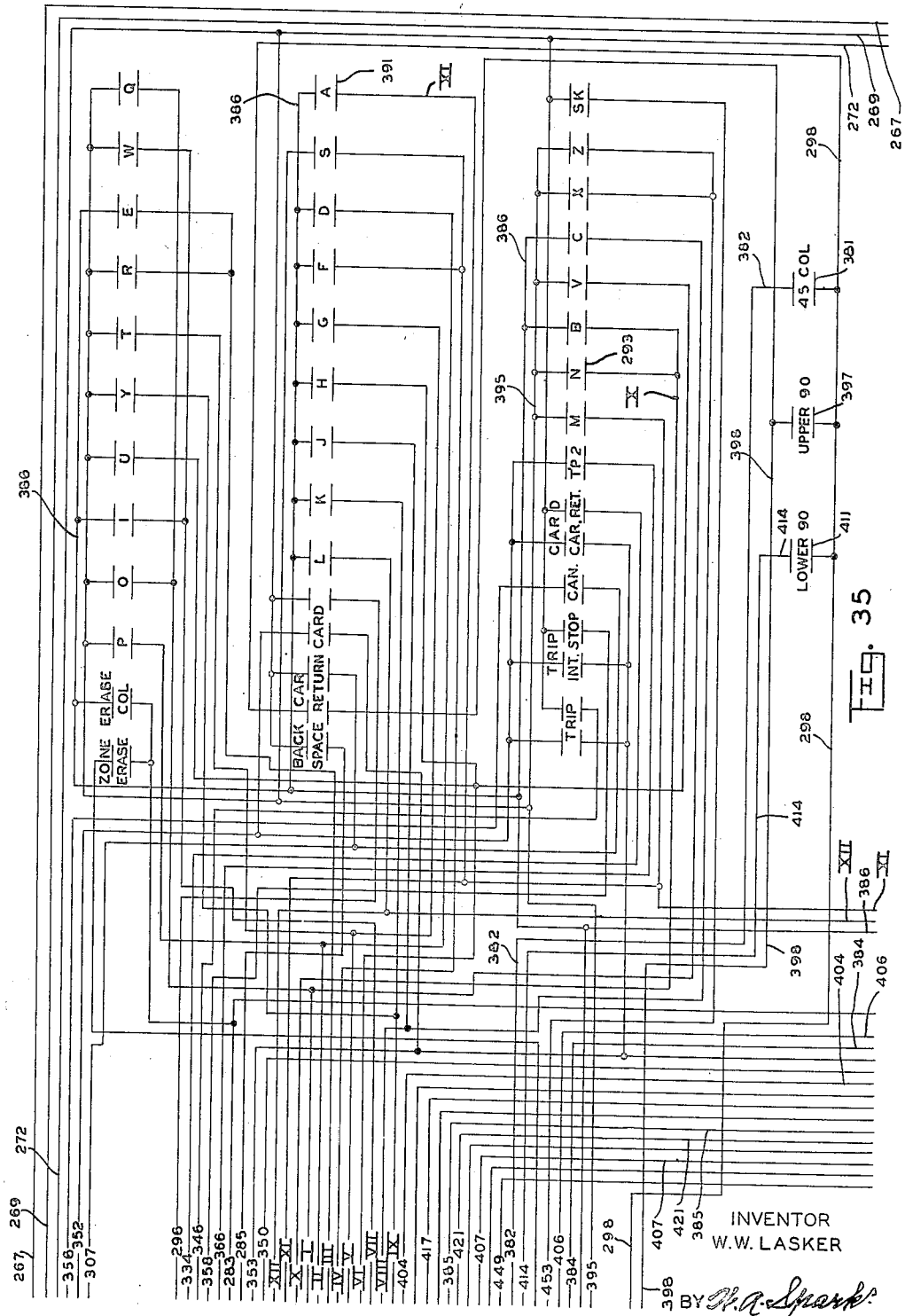
Figure 36:
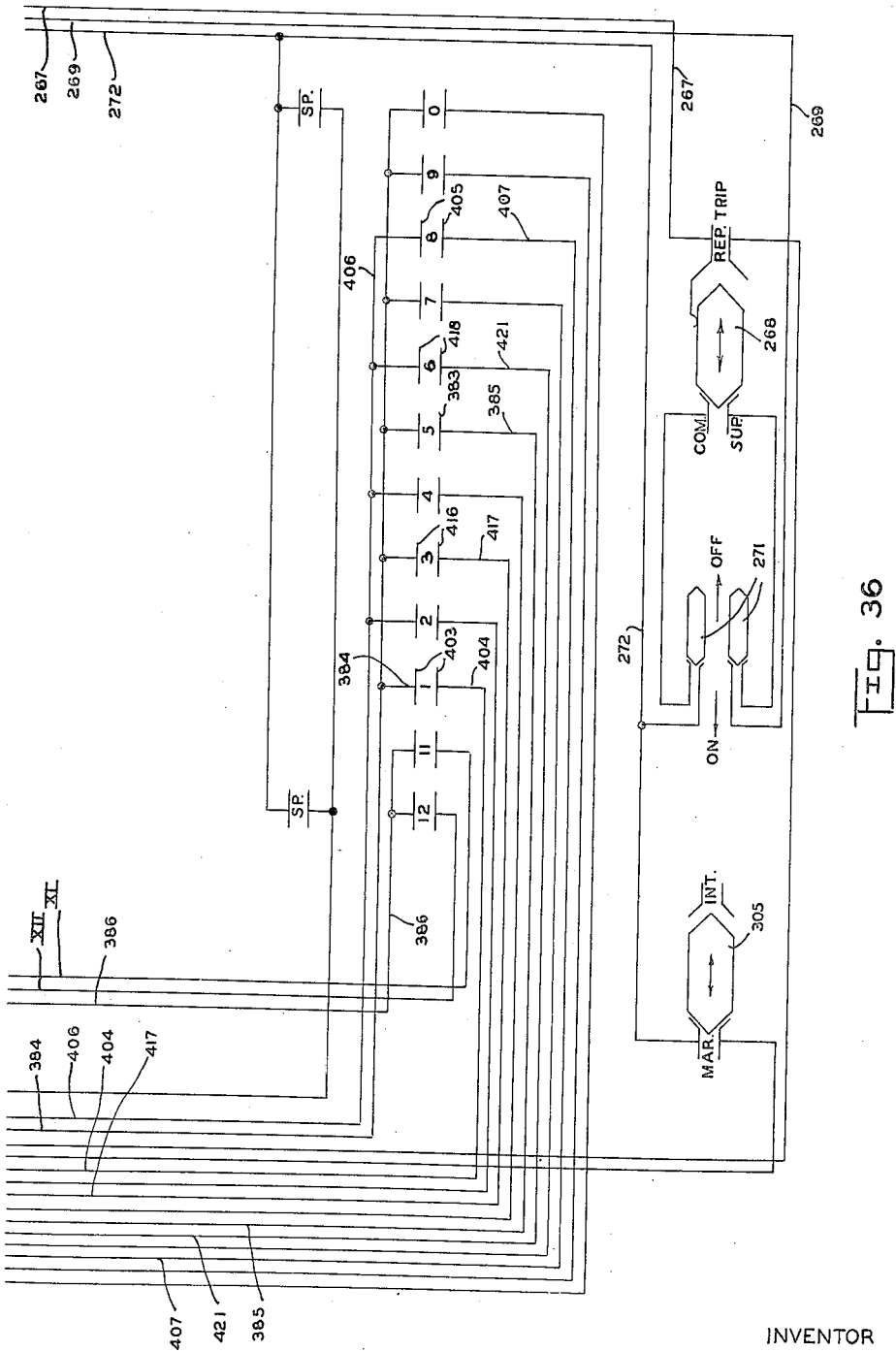

For the punching of full column numeric code, it is necessary that the transfer switch be in middle position, allowing the center pairs of contacts, as shown in Figs. 24, 25, 26, and particularly 28 and 34, to come together. If the transfer switch is not in its required middle position, it may be placed there by touching the key 381 marked "45 column", as shown in Fig. 35, thereby completing a circuit leading from the "negative" generator terminal 277 through the negative lead 298, to the contacts 381, the 45 column lead 382, thence to the transfer switch lock magnet 242, and thence through the generator lead 267 to the "positive" generator terminal 266. Energization of the lock magnet 242 releases the lock as shown in Fig. 25 and permits the contact actuating bar 231 to swing to mid-position under the impetus of the contact springs 227 themselves. Circuits are then ready for the recording of the date in full-column single-unit code.

If the date begins with the digit 5, the 5 key 383 (Fig. 36) may be actuated, whereupon a circuit is completed from "positive" generator terminal 266 through the positive lead 267, the "trip repeat" switch 268 to the "common" lead 269, through the "on-and-off" switch 271 and the "common" lead 272, thence through the coil of the "column erase" relay 273, thence through the "column erase" lead 274, as shown in Figs. 29, 30, 33 and 34, to the lower third group of contacts 23 in the transfer switch, through the contacts of the pair to the "odds" lead 384, thence to the "5" key contacts 383, thence through the five lead 385 to the lower tenth group of contacts L10 in the transfer switch, thence through the middle pair of contacts to the "V" lead wire, thence through the "V" lead wire to the "V" set magnet 206, and thence to the "negative" bus 275, the "negative bus" contacts 276 and to the "negative" generator terminal 277.

Closure of this circuit by the "5" key thus "draws-through" the "column erase" relay, which functions in the same way as previously described and as shown in the analysis diagram, Fig. 41, to clear any previous set-up in that column, and the energization of the "V" magnet 206 sets the "V" set-bar, and spaces the carriage as before described. The remainder of the date is readily set in the manner which will be obvious from the description previously given, since the circuits are essentially the same. If the month indicated in the date is November or December, it will be recorded by the use of the 11 or 12 key in the keyboard, (these keys also being useful for British money, or for inches). The circuits for the 11 and 12 keys are similar to that pointed out for the 5 key, beginning at the "positive" generator terminal 266, and extending through the "trip repeat" switch 268, the "off-and-on" switch 271 to the "common" lead 272, thence to the coil of the "column erase" relay 273, the "column erase" lead wire 274 to the lower second group of contacts L2 in the transfer switch, thence through the full column lead 386 to the 11 and 12 keys, thence to the "XI" or "XII" lead wire, depending upon which key is operated, and along the "XI" or "XII" lead wire to the "XI" or "XII" set-magnet 206, and thence to "negative" bus 275, "negative bus" contacts 276 and the "negative" generator terminal 277.

*Alphabetic code setting*

The date field being set, the alphabetic field may next be set. The circuits for the alphabetic keys are generally similar to the circuits for the full column numeral keys as used in the triple-numeric keyboard, with the added feature that for the latter half of the alphabet the key circuits "draw-through" both the "column erase" magnet, and the "XII" relay which upon energization closes the circuit for the "XII" set-magnet to depress the set-bar which indicates the latter half of the alphabet, as shown in the analysis diagram, Fig. 41. It will be observed that the circuits between the alphabetic keys and the set-magnets do not pass through the transfer switch but only the feed and control circuits. This by-passing of the transfer switch occurs because of the fact that alphabetic data is set only in the full-column code; accordingly, it cannot be transferred between upper and lower zones although provision is made for setting it with the transfer switch either in middle or upper position.

If the first letter to be recorded is "A", the "A" key 391 is depressed, closing its contacts, and completing a circuit which extends from the "positive" generator terminal 266, through the "trip repeat" switch 268, the "on-and-off" switch 271, to the "common" lead 272, thence through the "column erase" relay 273, thence through the column erase lead 274 to the lower second group of contacts L2 in the transfer switch, which are closed when the switch is in mid position or in upper position, thence to the full column lead 386, thence to the "A" key contacts 391, and thence to the "XI" lead and the "XI" set magnet 206, thence to the "negative" bus 275, the "negative bus" contacts 276 and the "negative" generator terminal 277. Thus, the first half alpha keys "draw-through" the column erase relay 273 in the same manner that the full column digit keys do, and the set bars of the full column are released by the erasing action, similarly to that described for the full column numerical setting, which need not be repeated in detail here.

The second letter to be indicated in the alpha field may be in the latter half of the alphabet, such as "N." As above pointed out, the letters of the second half of the alphabet are indicated by the presence of perforations in the "XII" position. Accordingly, the keys for the second half of the alphabet, that is from "M" on, "draw-through" both the "column erase" relay 273 and the "XII" relay 392 as shown in Figs. 29 and 41. It will be observed that this action is in general rather closely similar to the previously described procedure for the setting of the even digits in the two-unit-code system. There is, however, this difference that the individual latch bars 54 do not cooperate with a full column and accordingly the setting of the "XII" set-bar to indicate the latter half of the alphabet will not clear all previous set-ups, especially in the lower half of the column. For this reason, the erasing feature must be utilized with the "XII" relay to insure the clearing of both halves of the column. For this purpose there is a choice of "drawing-through" the "XII" relay 392 and the "lower erase" relay 287 or of "drawing-through" the "XII" relay 392 and the "column erase" relay 273. Since the column erase mechanism gives a positive erasing action in both upper and lower fields, it is preferable and is, therefore, utilized. Accordingly, the operator may depress a key such as the "N" key 393, thereby closing a circuit which leads from the "positive" generator terminal 266 through the "trip repeat" switch 268, the "supply" lead 269, the "on-off" switch 271, the "common" lead 272, the coil of the "column erase" relay 273, the lead 274, the coil of the "XII" relay 392, the "XII" relay circuit wire 394 to the lower first group of contact springs L1 in the transfer switch, thence to the second half alpha lead 395 for the second half of the alphabet, thence to the "N" key contacts 393, thence to the "X" lead, thence to the "X" set-magnet 206, and thence to the "negative" bus 275, "negative bus" contacts 276, and "negative" generator terminal 277. Thus, this circuit sets the "X" set-bar from the "X" set-magnet through the Bowden wire 77 and the set-lever 72, etc. as previously described. Simultaneously, the energization of the "column erase" relay 273 closes its contacts to complete the previously described circuits through the "upper" and "lower erase" magnets 206 to "negative bus" 275, etc., thereby again producing the "column erase" action as previously described. At the same time, the energization of the "XII" relay 392 closes its contacts 396 to complete a circuit from the "positive" generator terminal 266 through the several switches to the "positive" common lead 272, thence through the coil of the "column erase" relay 273, the lead 374 to the contacts 396 of the "XII" relay, through the "XII" circuit wire to the "XII" set-magnet 206, and thence to "negative" bus 275, "negative bus" contacts 276 and the "negative" generator terminal 277.

Energization of the "XII" set-magnet 206 then actuates the corresponding Bowden wire 77, set lever 72, etc. to set the "XII" set-bar, thereby indicating that the letter is an "N" and not a "B".

This procedure of full column numeric and alphabetic setting may be continued until the desired fields are set, and, when the full column fields are completely set, the upper zone fields are next desirably set.

*Upper zone setting*

Figure 34:
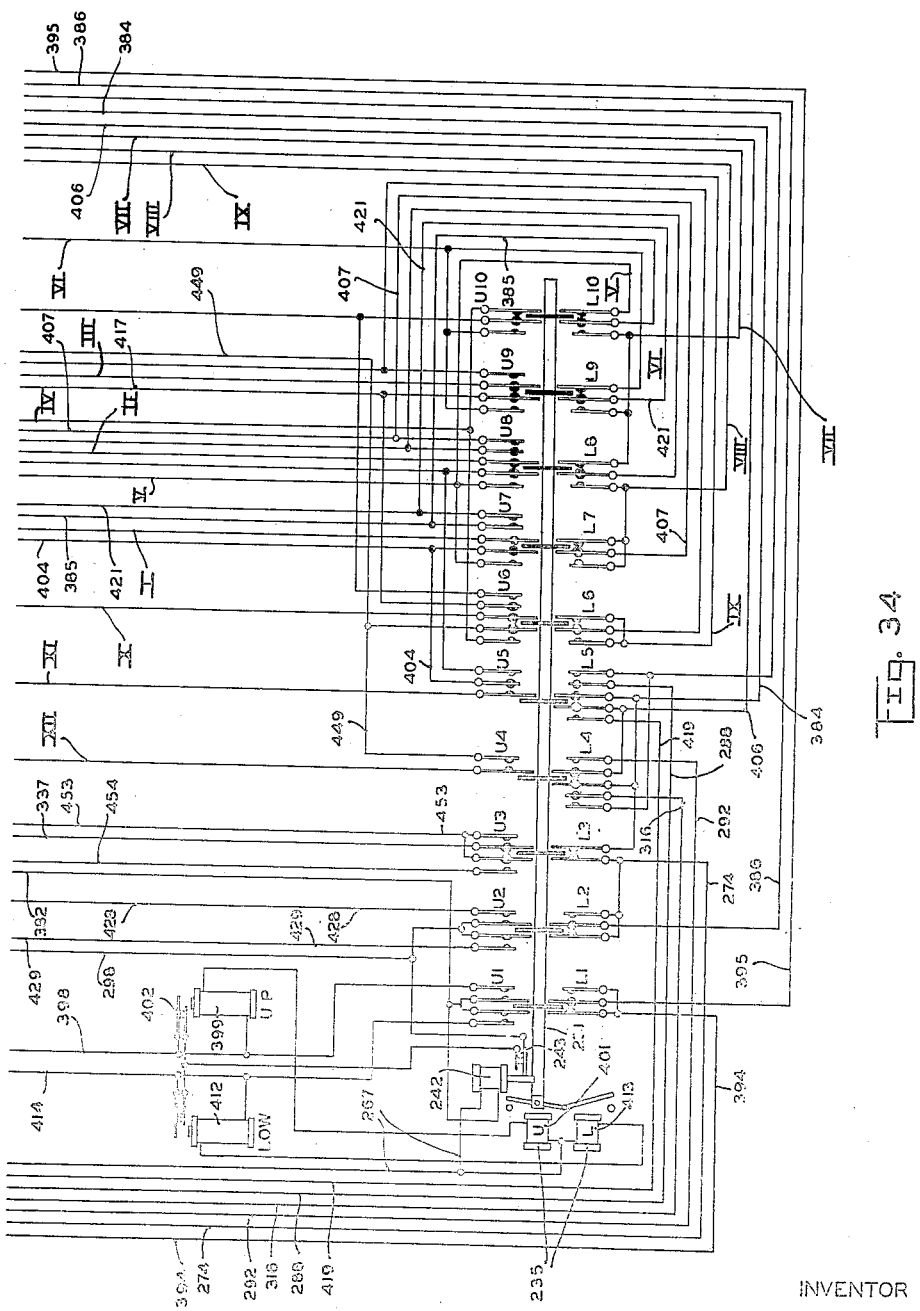

In order to set the upper zone fields from the same numeric keys, the key marked "upper 90" may be depressed. Closure of the "upper 90" key contacts 397 completes a circuit extending from "negative" generator terminal 277 through the lead 298 to the key contacts 397, thence through the "upper 90" lead 398 to the coil of the "upper" transfer relay 399, as shown in Fig. 34, thence through the "upper" actuating magnet coil 401 of the transfer switch to the positive lead 267 and the "positive" generator terminal 266. Energization of the "upper" relay 399 closes a circuit from the "negative" generator terminal 277 through the lead 298, the contacts 243 of the transfer-switch lock-magnet 242, the contacts 402 of the "upper" relay, the coil of the "upper" relay 399, and the "upper" actuating magnet coil 401 to the lead 267 and the "positive" generator terminal 266. This gives a holding circuit which remains closed until the transfer switch is fully actuated to swing the contact actuating bar 231 to the end of its travel to insure closure of all of the upper contacts.

When the full travel of the switch is completed, the lock mechanism engages to hold the bar in upper position and simultaneously opens the lock magnet contacts 243, thereby breaking the holding circuit and deenergizing both the "upper" relay 399 and the "upper" actuating magnet coil 401.

It will be observed that the digit key contacts are divided into two groups, the odds, which includes the zero key, and the evens. The transfer relay, when in upper position, connects the group of odd numbered key contacts in circuit to "draw-through" the "upper" erase relay 287, and connects the "even" group of contacts to "draw-through" the "III" relay 291 in circuits basically the same as those described previously in connection with the upper keyboard of the triple-numeric keyboard system, and shown in Fig. 43. The first number to be set in the first upper zone field may be an odd digit, such as the "1" and, accordingly, the "1" key 403 will be closed, completing a circuit from the "positive" generator terminal 266 through the "trip repeat" and "on-off" switches to the "supply" lead 269 and "common" lead 272, thence to the coil of the "upper erase" relay 287, thence through the upper erase lead 288 to the contacts of the lower fifth group L5 in the transfer switch, through the contacts to the "odds" circuit wire 384 leading to the "odd" keys, through the "1" key contacts 403, thence through the "1" lead 404 to the upper fifth group of contacts in the transfer switch, thence through the "XI" circuit wire to the "XI" set magnet 206, thence to the "negative" bus 275, "negative bus" contacts 276 and "negative" generator terminal 277. The closure of the one key contacts 403 thus completes a circuit through both the "XI" set magnet 206 to set the "XI" set-bar for the "1" digit and the "upper erase" relay magnet 287. Energization of the "upper erase" relay magnet 287 closes the contacts 289, and completes a circuit from "positive" common 272 through the "upper erase" relay contacts 289 to the "upper erase" actuating magnet 206, and thence to "negative" bus 275, "negative bus" contacts 276 and the "negative" generator terminal 277. Energization of the "upper erase" actuating magnet actuates the corresponding Bowden wire 77 and the "upper erase" lever 111 to produce the erasing action, as previously described.

The next number to be set in the upper zone may be an even number such as an "8". Accordingly, the closure of the "8" key contacts 405 completes a circuit from the "positive" generator terminal 266 through the "trip repeat", and "on-and-off" switches to the "positive supply" lead 269 and "common" lead 272, thence to the coil of the "III" relay 291, thence through the "III" relay circuit wire 292 to the contacts L4 in the lower fourth group in the transfer switch, thence, to the "even" lead 406, and to the "8" key contacts 405, thence to the "8" circuit wire 407, and the contacts in the upper eighth group of contacts U8 in the transfer switch, thence through the "II" lead to the "II" set magnet 206, and thence to the "negative" bus 275, "negative bus" contacts 276 and "negative" generator terminal 277. The completion of this circuit thus energizes the "II" set magnet to depress the "II" set-bar as required, and also energizes the "III" relay 291. Energization of the "III" relay closes its contacts 294 and provides a circuit from the "positive" common lead 272 through the relay contacts 294 to the "III" circuit wire and the "III" set magnet 206, thence to the "negative" bus 275, "negative bus" contacts 276 and "negative" generator terminal 277. These two circuits thus set the "II" and "III" set-bars as previously pointed out, to indicate the digit "8" in the upper field and any previous settings are cleared by the "III" set-bar. It will be observed that the circuits are substantially the same as those pointed out in connection with the triple-numeric keyboard except for the interposed connections by the contact springs of the transfer switch.

The control keys are connected in substantially the same manner as before described, that is, the "column erase" keys, the "backspace" key, the "carriage return" key, the "card" key, the "trip" key, the "trip-intermediate-stop" key, the "carriage return" key, the "trip two" key, the "space" key, and the several control switches are connected in circuits substantially identical, most of the connection wires being carried around the transfer switch and not influenced by it. Thus, these several control keys in the alpha-numeric keyboard are connected, and function, in substantially the same manner as has been previously described, and they may be used in the same way and for the same purposes in connection either with the full column setting or the upper or lower zone setting of the set-bar.

*Lower zone setting*

When all of the fields in the upper zone are set, the same digit keys will be used for the setting in the lower zones, and to transfer the key connections from the upper zone set-magnets to the lower zone set-magnets, the key marked "lower 90" is operated. The closure of the "lower 90" key contacts 411 completes a circuit closely analogous to that closed by the "upper 90" key contacts except that it includes the "lower" lead 414, the "lower" relay 412 and the "lower" actuating magnet coil 413. Also, the transfer switch being in the "upper" position, a pair of contacts in the upper first group U1 is closed and, accordingly, current is supplied to the lock release magnet 242 to open the lock and permit the transfer switch actuating bar 231 to move from "upper" position to "middle" position under the urge of the contact springs, whereupon the "lower" magnet 413 attracts its armature, pulling the switch actuating bar 231 into "lower" position to close the proper "lower" contacts.

The circuits between the digit keys and the "lower" field set-magnets and relays are substantially the same as the circuits between the digit keys and the "upper" field set-magnets and relays. However, the following representative circuits may be traced. If the first digit in the first lower zone field is a "3", actuation of the "3" key 416 closes its contacts to complete a circuit extending from the "positive" generator lead 267 through the "trip repeat" switch 268, and the "on-and-off" switch 271, to the "supply" lead 269 and "common" lead 272, thence from the "common" lead 272 to the "lower erase" relay coil 315, thence through the "lower erase" circuit wire 316 to contacts L4 in the lower fourth group in the transfer switch, thence through the "odds" circuit wire 384 to the contacts of the "3" key 416, thence through the "3" circuit wire 417 to contacts U9 in the upper ninth group of transfer switch contacts, thence through the "VI" circuit wire, to the "VI" set magnet 206, thus "drawing-through" the "lower erase" relay 315 and actuating the "VI" set magnet 206 to set the "VI" set-bar as previously outlined. Energization of the coil of the "lower erase" relay 315 closes its contacts 318 and completes a circuit extending from the "positive" common lead 272 through the "lower erase" relay contacts 318 to the "lower erase" circuit wire 279, to the "lower erase" actuating magnet 206, and thence to the "negative" bus 275, "negative bus" contacts 276 and "negative" generator terminal 277. Energization of the "lower erase" actuating magnet 206 thus provides the lower erase action as previously described.

Similarly, if the second digit to be set in the lower field is an even number, the circuit will be closed at an even numbered key, such as the "6" key 418, to close a circuit which "draws-through" the "IX" relay 319. This circuit may be traced from the "positive" common lead 272 to the "IX" relay coil 319, to the "IX" relay circuit wire 419, to the lower fifth group of contacts L5 in the transfer switch; thence through the "evens" circuit wire 406 to the "6" key contacts 418, thence through the "6" circuit wire 421 to the lower ninth group of contacts L9 in the transfer switch, thence through the "VII" circuit wire to the "VII" set-magnet 206, thence through the "negative" bus 275, "negative bus" contacts 276 to the "negative" generator terminal 277. This circuit thus energizes the "VII" set-magnet, to set the "VII" set-bar as previously described. Simultaneously, the closure of the "IX" relay contacts 422 completes a circuit from positive common lead 272, through the "IX" relay contacts 422, the "IX" circuit wire to the "IX" set-magnet 206, and thence to the "negative" bus 275, "negative bus" contacts 276 and "negative" generator terminal 277. This actuation of the "IX" set-magnet sets the "IX" set-bar to indicate an even numbered digit in the same manner as previously described.

As mentioned above, the circuits of the control keys are not affected by the introduction of the transfer switch. Accordingly, any of these may be operated at appropriate times as above described for the production of the same types of operation, to complete the set-up of the set-bar field and to punch the card as desired.

*Operation from typewriter keys*

One of the important advantages and inventive features of the apparatus here disclosed is the mechanism for coupling the machine to, and operating it from, and in synchronism with, a typewriter. This is accomplished through the agency of the typewriter contact pan 217 as shown in Fig. 22. The contact pan is positioned under the accounting machine typewriter as is shown in Fig. 65 in which it will be noted that a snatch roll 176 is provided which is adapted to operate the pawl contact actuator 177 which in turn controls the alphabetic contacts 218 and the cam 178 which is controlled by the digit keys 452 for closing the digit contacts 128. This mechanism is well known in the Remington bookkeeper. Therefore, no detailed description is believed necessary. As is shown in Fig. 65, and in the Lasker et al. application, there are provided actuating members extending from the snatch roll pawls and digit cam levers to the contacts 218. Thus, whenever a key in the accounting machine is actuated, the corresponding key contacts 218 are closed. These contacts are connected through conductors in a cable 219 to the punching mechanism as shown in Figs. 63 and 64. As matter of convenience, the cable from the typewriter contact pan 217 is attached to a plug member 220 having the necessary number of contacts, which, in turn, is connected to a co-operating jack 425 under the transfer switch mechanism, as shown in Figs. 24 and 26. The use of this type of jack and plug connection makes it conveniently possible to separate the typewriter from the punch when desired, and is particularly convenient for the simultaneous connection to, and control of, two punches from one typewriter contact pan. The basic circuits for control of the punch mechanism from the typewriter keys through the typewriter contacts 218 and in general the same as those for the triple-numeric and alpha-numeric keyboards, and are broadly the same as those shown in the analysis diagrams, Figs. 41–48, inclusive. It is, of course, readily possible to operate the punch from the typewriter contacts only, without the presence of a punch keyboard as a part of the punch itself, and for convenience in tracing the circuits, this type of connection will be described in detail. The wiring diagram for the typewriter control only of the punch is shown in Figs. 29, 30, 33, 34, 37 and 38, when assembled as shown in Fig. 53.

It may first be pointed out that the typewriter mechanism includes in addition to the digit and alphabet contacts in the contact pan, separate keys and contacts for a part only of the various punch operating functions. There is also provided a control bar 436 of the type shown in Fig. 65 and disclosed in Patents Nos. 1,682,451, 1,684,001 and 1,843,772; a special contact pair for the palm skip member in the accounting machine typewriter; and an indicating semaphore to show the position of the transfer switch, whether set for connection to "upper" or "lower" zone. There is in addition, a key-locking mechanism to prevent the actuation of a following typewriter key until the punch mechanism has completed its operation for the preceding key stroke, and also several special key circuits for control of certain punch functions and procedures as an incident to certain special typewriter operations.

In the operation of this typewriter-punch combination, it may be assumed that the previous user has left the punch with the carriage returned to the left-hand margin, with the set-bar field cleared, and a fresh card in the punch chamber, this being the usual condition. The operator may then insert a supply of fresh cards into the punch magazine 36, and close the power supply switch 6 to bring the punch motor 3 up to speed, and the punch generator 4 up to voltage, thus preparing the punch for operation. The motor switch on the accounting machine is likewise closed to bring the accounting machine motor up to speed and the accounting machine carriage is returned to the left-hand margin either manually or by actuation of the power return key, as shown in the above mentioned application. Thereupon, the operator may insert the record sheet into the typewriter, this usually being a printed form prepared according to the requirements of the accounting problem. Such a form usually has a space for alphabetic information, which may be the name of the commodity sold or bought, or may be a customer's name, or other information to be recorded in letters.

Since this will be full-column alphabetic data, and the transfer switch disconnects the supply lead 269 from the "column erase" relay when it is in "lower" position, it is necessary that the transfer switch be in either the middle or upper position for alpha recording. The accounting machine is not equipped with separate keys for control of the position of the transfer switch, but depends upon actuation of certain typewriter function keys for the operation of the transfer switch. Accordingly, the typist may inspect the semaphore 426 to ascertain whether the transfer switch is properly positioned for connection of the keys to the upper-field set-magnets and connection of the "column erase" relay in circuit for alpha data.

Figure 37:
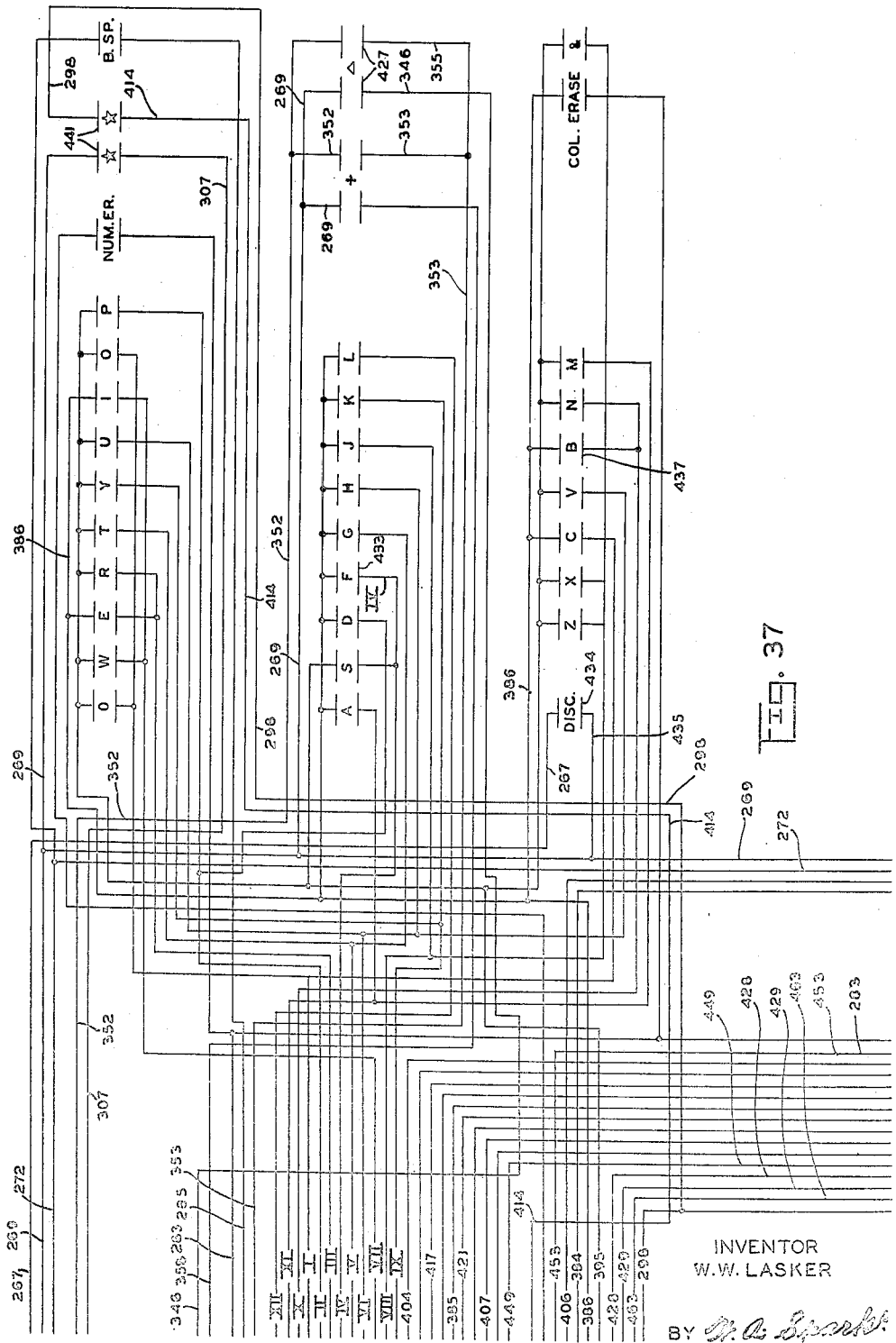

If it is not so positioned the "triangle" (△) key 427 is operated. This key prints the special insignia which shows the completion of the entry of the preceding account item in the typewriter, and simultaneously closes two pairs of contacts 427. Closure of the left-hand pair of these contacts, as shown in Fig. 37, closes a circuit extending from the positive generator terminal 266 through the lead 267, the disconnect switch 434, and the leads 435 and 269 to the left-hand key contacts 427; thence through the lead 346 to the coil of the trip relay 347 and in parallel therewith to the coil of the transfer relay 430. The circuit from the trip relay 347 is continued through the lead 350 to the contacts 348 of the trip intermediate stop relay 359, and thence through the lead 349 to the express magnet 206 and thence through the lead 296 to the negative terminal 277 of the generator. Simultaneously, the circuit from the coil of the transfer relay 430 continues through the lead 298, to the negative generator terminal 277. Energization of the trip relay 347 closes the contacts 359, thereby completing a circuit extending from the positive generator terminal 266 through the disconnect switch 434, the lead 269, the carriage controlled contacts 312 and the lead 361, through the contacts 359 to the lead 346 as previously pointed out, thus providing a holding circuit for the trip relay 347, which keeps the express magnet 206 energized until the contacts 312 are reopened. Energization of the relay 430 closes its contacts 442, thereby completing a circuit extending from the positive generator terminal 266 through the lead 267, the "upper" transfer magnet coil 401, the "upper" relay coil 399, and the lead 398, to the contacts 442 of the transfer relay 430, thence through the lead 298 to the negative generator terminal 277. This circuit energizes the "upper" relay 399 and the "upper" transfer magnet coil 401 as previously described, and brings the transfer switch into "upper" position. Simultaneously the closure of the right-hand pair of contacts 427 under the "triangle" (△) key completes a circuit extending from the positive generator terminal 266 through the lead 267, the disconnect switch 434, and lead 435, to the lead 269, thence to the "supply" brush 299 on the commutator, the commutator segment 246, the brush 301, and the lead 352, to the right-hand contacts 427, thence through the lead 353 to the trip magnet 202, thence through the lead 354 to the negative generator terminal 277. Completion of this circuit energizes the magnet 202 and engages the clutch 15, thereby operating the punch mechanism. Engagement of the clutch 15 begins the rotation of commutator 22, which, thereupon, closes a circuit extending from the positive generator terminal 266 through the lead 267, the "disconnect" switch 434, the leads 435 and 269, to the coil of the retract relay 323, thence through the lead 324 and the contacts 304, 325, and 326 to the lead 356, thence to the "cancel" brush 355, thence through the carriage return brush 309, and the lead 311, to the coil of the carriage return magnet 148, thence through the lead 298 to the negative generator terminal 277. Completion of this circuit causes the carriage return with clearing, as before pointed out, to the left-hand margin position. Movement of the transfer switch into the "upper" position closes the right-hand pair of contacts U2 in the upper second group as shown in Fig. 34, thereby closing a circuit extending from the negative generator lead 298 through the contacts to the upper semaphore lead 428; thence through the upper semaphore contacts 431, to the upper semaphore magnet 426; thence to the positive supply lead 269 and generator terminal 266. Energization of the upper semaphore magnet 426 pulls the semaphore into position to indicate connection to the upper field, where it is held by gravity, and simultaneously opens the upper semaphore magnet circuit at the contacts 431. This prepares both the accounting machine and the typewriter for operation.

Thereupon, the desired alphabetic key for the first letter is depressed, thereby bringing the snatch pawl 177 into engagement with the snatch roll 176 as shown in Fig. 65, and actuating the type-bar 178 to imprint the proper type upon the paper on the platen. Simultaneously, the depression of the snatch pawl actuates the mechanism to close the corresponding contact 218 in the contact pan. This may, for example, be the "F" key, and, accordingly, the closure of the "F" contacts 433 completes a circuit which "draws-through" the column erase relay 273, the circuit beginning at the positive generator terminal 266 and extending through the positive lead 267 to the disconnect switch 434, thence through the disconnect switch lead 435 and the lead 269 to the control bar contacts 436, and the common lead 272; thence from the common lead 272 to the coil of the "column erase" relay 273, thence through the "column erase" lead 274 to the "column erase" contacts in the lower second group L2 of contacts in the transfer switch; thence through the lead 386, and the "F" contacts 433, to the "IV" circuit wire, thence to the "IV" set-magnet 206 and thence through the "negative bus" 275 and the "negative bus contacts" 376 to the "negative" generator terminal 277. This circuit thus is substantially identical with that pointed out for the alpha-numeric keyboard and the full column is erased and a new alpha setting made therein in the same manner as previously described.

Thereafter the key for the second letter may be depressed. This second key may be in the second half of the alphabet such as the letter "R". Accordingly, the "R" typewriter key is depressed to engage the snatch pawl 177 with the snatch roll 176 for type bar operation and to close the "R" contacts 437. Closure of the "R" contacts 437 completes a circuit which "draws-through" both the column erase relay 273 and the "XII" relay 392 as before described for the setting of the two set bars to record the letter "R".

This procedure is continued until the end of the alphabetic matter is reached and all of the alphabetic material is set. The next portion of matter typed may be matter which is not to be recorded on the punched card, and, accordingly, the control bar 438 releases the left-hand pair of contacts 436, thereby disconnecting the supply lead 272 from the switch leads 435 and 269, and, since the "column erase" relay circuit "draws" from the supply lead 272, the circuit to the key contacts is opened and no setting will be made on the punch set-bars for such data. The third portion of the matter typed may be recorded on the cards and, accordingly, the control bar in the typewriter re-closes the left-hand pair of contacts 436, thereby re-connecting the "supply" lead 272 to the switch lead 435, preparatory to closure of the key contacts.

This third portion of matter may be numeric data and, accordingly, the numeric keys will be actuated. If the number to be recorded does not contain as many digits as there are columns in the punch field, and spaces in the typewriter field, the space bar will be actuated to move the carriages to the proper positions. This actuation will close the space contacts 439 and the space mechanism in the typewriter is operated by the function control cam as shown in the above mentioned Lasker et al. application.

The spacing operation in a typewriter is a simple movement from one symbol position to the next, but in the punch the card conditions may require either simple movement of the carriage from one column to the next with or without erasing, or it may require the insertion of ciphers in the columns corresponding to those spaced over by the typewriter. Accordingly, the space contact circuit also is under the control of the bar 438. For this purpose the control bar 438 is provided on its right-hand side with raised portions, corresponding to all of the columns in which alphabetic matter is to be recorded, to close space control contacts 445. Accordingly, when the space contacts 439 are closed by depression of the typewriter space bar, a circuit is completed which extends from the positive generator terminal 266 through the lead 267, the disconnect switch 434, the lead 435, and the lead 269 to the contacts 436, thence through the lead 272 to the space contacts 439, thence through the space lead 446 to the contacts 445, thence through the lead 283 to the space magnet 206, thence through the "negative bus" 275, the "negative bus contacts" 276, and the lead 298 to the "negative" generator terminal 277. This circuit serves the single function of operating the space magnet and thereby the spacing mechanism, as previously described, to space the carriage from one column to the next. If it is desired that the erase cycle accompany each spacing action occurring in the punch, the contacts 439 may be connected to the lead 274 instead of to the lead 272, thereby "drawing-through" the "column erase" relay 273 as has been previously described, (although the same erasing and spacing action is obtainable by use of the "erase key" in the punch keyboard).

In fields which are always cleared by the return of the carriage, the same circuit may be utilized for spacing in numeric fields, either with, or without, an erasing action in the field. However, when a field is utilized in which the clearing levers 55 are turned down, out of operative position, it is necessary that all the columns in the field in which the levers are turned down be either erased, or have some other number set therein. It is not always convenient to "draw-through" the "upper" and "lower" erase relays because of the necessity of carrying the circuits through the transfer switch to insure erasing only in the proper zone. However, an equally satisfactory and effective clearing method is to set ciphers in such zones. For this purpose, the control bar 438 is provided with low portions on its right-hand side to cause the opening of the contacts 445 and closing of the contacts 447. Closure of the contacts 447 and the space contacts 439 completes a circuit leading from the positive generator terminal 266 through the lead 267, the disconnect switch 434, the lead 435, the lead 269, the contacts 436, the lead 272, to the space contact 439, thence through the lead 446, the contact 447 and the lead 448, to the zero key lead 469, thence through the transfer switch and the contact groups U4 or U6 according to the position of the transfer switch, thence to the "XII" set magnet 206, if the switch is in upper position, (or to the "X" set magnet 206, if the switch is in middle position) or to the "IV" set magnet 206 if the switch is in lower position, thus setting a cipher for the column, clearing it of other settings, and spacing the carriage to the next column, this being continued until the column in which the next digit is to be set is reached.

Thereupon, the desired digit keys are operated for the closure of the digit key contacts to complete circuits which are substantially identical with those described in connection with the alphanumeric keyboard contact keys, until the number is fully typed and the corresponding set-bars are latched down.

Group setting

As has been previously pointed out, it is sometimes desired to prepare a series or group of cards having identical data records in some particular field. This may be done by resetting for each card all of the data for the entire card, but a preferable procedure is to turn down the clearing levers 55 as previously pointed out so that the data which is to be repeated on the successive cards is not cleared by the carriage return as each card is punched. When this procedure is used, new data may be set in these fields at the beginning of each group of cards in the normal fashion, the erase mechanism being relied upon to insure the removal of the prior data, and clear the field for the new data to be set in the new group of cards.

When the data for the successive cards in such a group is being set, it is inconvenient to traverse the field in which the common data occurs by the space key. Instead it is much more convenient to utilize the skip mechanism, and, for this purpose, two skip keys are provided in the typewriter, one being the palm skip 451 and the other being the tabular skip 452. The palm skip is connected in a circuit which is not influenced by the control bar 438, whereas the tabular skip is in a circuit controlled by the control bar 438. This difference in connections occurs because of a minor difference in the method of utilization of the two different skip members. When a whole field is to be passed over, the palm skip 451 is used. Operation of the palm skip causes the usual skip action to occur in the typewriter, and, simultaneously closes the palm skip contacts 451, completing a circuit extending from the positive terminal 266 of the generator, through the lead 267, the disconnect switch 434, and the lead 435 to the supply lead 269, thence through the palm skip contacts 451, the skip lead 453, and the contacts U3 in the transfer switch. If the transfer switch is in "upper" or "mid" position, the lead 453 is connected to the lead 337 through which the circuit continues to the coil of the "upper" skip relay 338, thence through the lead 339 to the "upper skip" magnet 206, thence through the "negative bus" 275, the "negative bus contacts" 276, and the lead 298 to the "negative" terminal 277 of the generator. Energization of the "upper" skip magnet 206 initiates the skip action as before pointed out and energization of the upper skip relay 338 closes its contacts 341 to complete a holding circuit also as previously pointed out, which insures the completion of the skip operation. It will be observed that operation of the palm skip causes the punch carriage to skip to the next skip stop without regard to any other controls in the typewriter.

In certain fields a sufficient number of columns may be provided for a number containing several digits, when the usual number to be set in that field contains only a lesser number of digits, under all but exceptional circumstances. Under these conditions, it is convenient to use the tabular skip key in the typewriter and a skip stop in the punch may be set accordingly.

When the data for such a field is reached in the typing, a tabular skip key is operated to close the contacts 452. These contacts are in a circuit which also contains the contacts 436, which are closed by the control bar 438. Accordingly, the closure of the tabular skip contacts 452 completes a circuit extending from the positive generator terminal 266 through the lead 267, the disconnect switch 434, the lead 435, and the lead 269, to the contacts 436, thence through the lead 272 to the tabular skip contacts 452, and thence through the lead 453, the contacts U3 in the transfer switch, and the lead 337 to the "upper"

skip relay 338 as before. If the transfer switch is in "lower" position, the lead 453 is connected to the lead 454, extending to the lower skip relay 455, and thence to the lower skip magnet 206 in a manner analogous to the upper skip circuits. Thus, if the number occupies all or nearly all of the field, it may be typed in the usual manner, whereas if it occupies a portion only of the field, the tabular skip key 452 may be utilized to avoid the necessity of spacing over the unused portion of the field.

The typing of the data is thus continued in the successive columns and the setting in successive fields until the end of the "upper" zone is reached. The arrangement of the successive items on the typewriter record for the double entry system is such that the matter to be recorded in the alphabetic field, and set in the upper zone is typed before the occasion arises for operation of the "star" (*) key. When this key is operated, it prints the star insignia, through the action of the operating cams, as shown in application Serial No. 635,186, and at the same time the action of the cam closes two pairs of contacts 441, as shown in Fig. 37. Closure of the left-hand pair of the contacts 441 completes a circuit extending from the positive generator terminal 266, through the generator lead 267 to the "disconnect" switch 434, as shown in Fig. 37, thence through the lead 435, and the supply lead 269, to the left-hand "star" key contacts 441, thence through the carriage return lead 307 to the carriage return commutator contact 308, thence to the carriage return brush 309, thence through the lead 311 to the carriage return magnet coil 148, thence through the lead 298 to the "negative" generator terminal 277. Closure of this circuit energizes the carriage return operating magnet 148 and brings into operation the mechanism shown in Figs. 16 and 17. Thus, energization of the magnet 148 attracts its armature 147 to actuate the lever 146, and release the lever 143 and the carriage return control bar 136, to close the contacts 313 of Figs. 17, 30, 44, 45, and 48, thereby completing the circuit for the energization of the carriage return clutch 14 as previously described. This sequence of steps returns the carriage to the carriage stop, and, the "margin-intermediate" switch having been set for intermediate, the "express" magnet 206 is deenergized, the carriage stop member 139 is dropped and the carriage is returned only to the point set by the intermediate stop 138, which is the beginning of the lower field.

Simultaneously, the closure of the right-hand pair of contacts 441 under the "star" (*) key, closes a circuit extending from the negative generator terminal 277 and the negative generator lead 298 through the right-hand pair of key contacts 441 to the "lower" relay circuit wire 414, thence to the coil of the "lower" relay 412, thence to the coil of the "lower" magnet 413, thence to the positive generator lead 267 and positive generator terminal 266. Simultaneously, current is supplied through the left-hand pair of the first group of contacts U1 to the lock magnet coil 242, and thence to the positive generator lead 267, to unlock the transfer switch and allow it to move to "mid" position under the urge of the contact springs, and, thereafter, to lower position under the urge of the "lower" magnet 413, whereupon the current supply to the lock magnet is opened by the contacts 243 and the switch is relocked in "lower" position.

This procedure thus returns the carriage to the beginning of the lower zone and connects the set-magnets for the lower zone to the appropriate typewriter key contacts, and the system is ready for the typing of further data, and the setting of "lower" zone set-bars. The resulting circuits and operational steps are similar to those previously pointed out. The action of the typewriter keys for lower zone setting is closely similar to that of the typing of upper zone material and the setting of upper zone set bars. The punch operation is analogous to and closely similar to the setting of the lower zone set-bars from the contact keys of the alpha-numeric keyboard through the transfer switch, and the circuits are readily traced.

The setting of set-bars in the "lower" zone from the actuated typewriter keys is likewise controlled by the control bar mechanism 438 in the typewriter. The semaphore mechanism 426 also operates at the time the transfer switch is shifted, contacts in the second upper group U2 of the transfer switch being actuated to supply current from the negative generator lead 298 through the contacts U2 to the lower semaphore circuit wire 429, through the lower semaphore magnet winding and the contacts 432 which are opened by the movement of the semaphore to the lower-field-indicating position, and thence the circuit extends to the positive supply lead 269 and the positive generator terminal 266.

When all of the lower zone data has been set, the "triangle" (△) key is operated by the typist to indicate the verification and completion of the entry of the specific item; and, as is well known in connection with the bookkeeping machinery, the "triangle" (△) key can be operated only when the double entry items are correctly typed. Thus, operation of the "triangle" (△) key impresses the triangle type upon the platen and the actuating cam for the triangle type lever simultaneously closes the triangle key contacts.

Closure of the "triangle" (△) key contacts then initiates a punching operation in the punch and return of the carriage with clearing to the left-hand margin preparatory to the setting of another card. The circuits involved in this procedure are identical with those previously discussed in connection with the restoring of the transfer switch to "upper" position preparatory to the setting of the first card, and, as there described, they also prepare the transfer switch for another card by setting it in the upper position.

Interlock mechanism

A keylock mechanism is provided to prevent operation of the typewriter keys at a higher rate of speed than that at which the punch will operate. The maximum speed of which the punch is capable is about ten settings per second, and the digit cam action in the typewriter ordinarily has a maximum speed of about eight characters per second. Accordingly, unless the punch is unusually sluggish, it is not possible for the typewriter number key action to outstrip the punch action in speed. However, the snatch roll mechanism in the typewriter, which is used for alphabetic characters, is capable of a much higher speed, which is approximately 28 characters per second. While it is seldom possible for such a speed to be maintained by a typist, it is possible for a limited number of characters to occur at this speed and for many characters to occur at a speed above ten per second, and if they do, the punch cannot set them properly. For this purpose, a key interlock mechanism is provided.

This mechanism consists of lever 461 which is operated by the escapement ball 81. The lever 461, in turn, operates contacts 261. Closure of contacts 261 completes a circuit extending from the positive terminal 266 of the generator through the lead 342 to the contacts 261, thence through the lead 463 to the keylock magnet 262, thence through the lead 465, and the lead 298 to the negative terminal 277 of the generator. Energization of the keylock magnet 262 locks the typewriter keys against depression until the magnet is deenergized by opening of the circuit and thereby insures against operation of a second typewriter key before the matter indicated by the first key has been fully recorded in the punch as is shown in the Lasker et al. application.

Dual keyboard operation

It is usually desirable that the punch be a complete, functional, unit by itself, and accordingly, it is usually provided with a keyboard which is mounted on the punch frame. It is usually also desirable that the same punch with its own keyboard be operable alternatively from typewriter-key controlled contacts. The circuits as above described are suitable for the parallel operation of two keyboards, which may be utilized alternatively. A complete circuit diagram for such combination is shown by the wiring diagrams when assembled as shown in Fig. 54. This diagram utilizes the alpha-numeric keyboard with the transfer switch as above described, and the typewriter key controlled contacts connected thereto also as previously described, the two sets being in parallel.

In this combination, it is desirable and customary in normal circumstances that only one keyboard be usable at a given time and to this end the typewriter keyboard is equipped with the disconnect switch 434 which when opened prevents action by any of the typewriter keys or controls, and the punch keyboard is provided with the on-and-off switch 271 which likewise, in off position, prevents the punch keys from influencing the punch, with the single exception of the "repeat-trip" switch, which, being unique to the punch keyboard and not present in the typewriter keyboard, is left available for use to duplicate cards set up from the typewriter when desired. It will be observed, that the two key-boards are connected in straight, normal, parallel circuits, for such circuits as are needed to the respective keyboards and, accordingly, the actions of the several keys and key contacts are identical, and the circuits identical with those previously traced for single keyboards.

It will be noted that the transfer switch is utilized with both the alpha-numeric punch keyboard and the typewriter key contacts, when either is used independently or when the two are utilized together. The presence of the transfer switch does not interfere with the triple numeric keyboard, and, accordingly, the triple numeric keyboard may be connected in parallel with the typewriter controlled contacts as is shown in Fig. 55 without any change in the circuits, or any change in method of operation, and, accordingly, the circuits are not retracted to show the parallel connection since it is obvious from inspection of the complete wiring diagram.

Two punches

This punch mechanism is particularly adapted to the simultaneous operation of two punches from a single key control such as from a single set of typewriter key controlled contacts. It will be observed that since each punch has its own independent driving motor and independent generator, with the motors connected to a common power supply, care must be taken to prevent the feed-back of energy from one generator to another, since if this occurred, the resulting circulating currents would seriously overload both the motors and generators and would probably cause the burnout of one or more. In connecting two punches to a single set of typewriter key control contacts, the corresponding leads from the two punches are simply connected together to the contact springs and it will be observed that in each instance, while the positive leads of both generators may be connected directly together, there is no direct connection between the two negative leads (an extra contact pair may be used for each punch, under the star (*) key) but in every instance there are high resistance relays or magnets interposed between the two negative terminals, thus preventing the flow of any substantial amount of current even though the two generator voltages may not be the same.

If simply two identical cards are required, for each item typed by a bookkeeping machine typewriter, the trip-two key may be connected to the triangle key instead of the ordinary trip key, in which case the two magazine receiver is utilized. Such requirement, however, seldom occurs.

Instead, it is usually required that one card contain certain portions of the data from a given item line and the other card contain in part the same data, and in part other data not included in the first card. It is for the preparation of two such dissimilar cards that two punches are required. When this system of two punches is utilized, the control bar 438 is employed to determine the distribution of items between the two punches. A second control bar 438 may be utilized or the top or bottom surfaces of the control bar 438 shown in Fig. 38 may be utilized for the control of the second punch, the control circuits being identical with those shown in Fig. 38.

Alternative form of transfer switch

The transfer switch of Figs. 24 to 27, inclusive, utilizes a mechanical lock to hold the switch set in "upper" or "lower" position. For some installations, it is preferable to dispense with the mechanical lock, and to utilize a holding winding in the operating magnets, as is shown in Figs. 56, 57 and 58. In this form of transfer switch the holding windings are placed upon the magnets 471 and controlled by the relays 472. The contact spring assembly and the general method of operation is similar to the preferred embodiment and will be obvious without further discussion.

Alternative form of erase mechanism

In some instances, it is not necessary that the erasing action, as above described, be obtained before the setting of every column, but, instead, that it be utilized only for the clearing of columns to which the carriage is back-spaced. For this purpose, the alternative embodiment of Figs. 59 and 60 may be utilized. The carriage under this construction closely resembles the carriage as shown in Figs. 10 to 15, inclusive, with the exception that the fork on the end of the erase rod does not coact with the same column in which the setting rods 71 function, but, instead, the erasing rod and its attachments cooperate with the next adjacent left-hand column as shown in Figs. 59 and 60, where the setting rods 71 are shown cooperating with one column, and the erase rod 473 is shown cooperating with an adjacent column on the left. In this embodiment, the erase rod 473 is operated by mechanism similar to that described in connection with Figs. 10 to 15, inclusive, by erase magnets 206. These erase magnets are operated by erase relays in the same way as the preferred embodiment, but the erase relays are connected in circuit with the backspace key and backspace magnet so that they function only when there is a backspacing operation.

There is thus disclosed herein a complete punch mechanism having substantially all of the control features characteristic of a typewriter mechanism and by virtue thereof conveniently adapted to be controlled from typewriter keys. The system is further adapted to parallel connection of a single punch from a plurality of keyboards and to parallel operation of a plurality of punches from a single keyboard such as a typewriter keyboard. The punch further contains a means for dividing the punch columns into zones such as upper and lower zones and the mechanism further includes a transfer switch cooperating with a single set of contacts whereby data may be recorded in any zone or in full column from the single set of keys. In addition the punch mechanism contains adjustable carriage return stops, a backspace mechanism with members for preventing interference between the carriage return mechanism and the backspace mechanism. The device further contains a skip mechanism operable from one or a plurality of keys for different skip procedures in different zones. The device further contains mechanism for the recording of data in different codes from a single keyboard and mechanism for recording both alphabetic data and numeric data in different codes from a single keyboard.

The device of this invention thus provides a greatly improved punching mechanism of the gang punch type, particularly adapted to flexibility of operation and to operation under the control of typewriter keys and to parallel operation in various forms.

While there are above described but a limited number of embodiments of the invention, it is possible to produce still other embodiments without departure from the inventive concept above disclosed, and it is, therefore, desired that only such limitations shall be imposed on the appended claims as are stated therein, or required by the prior art.

What I claim as new, and desire to secure by Letters Patent, is:

1. In a gang punch mechanism, a set-bar field having a plurality of set-bars arranged in columns, a plurality of latching plates for each column of set-bars, a clearing lever for each latch plate member, means for disengaging said clearing levers from said latching members to prevent the clearing of data set in desired columns, and a spaceable carriage having a column of set-rods for setting data and erase mechanism for erasing data prior to the setting of desired data to permit the setting of new data in columns in which the clearing levers are disengaged.

2. In a gang punch mechanism, a set-bar field having a plurality of set-bars arranged in columns, a plurality of latching plates for each column of set-bars, clearing levers for each latch plate member, means for disengaging said clearing levers from said latching members to prevent the clearing of data set in desired columns, a spaceable carriage having a column of set-rods for setting data, and erase mechanism for erasing data prior to the setting of desired data to permit the setting of new data in columns in which the clearing levers are disengaged; and a skip mechanism adapted to skip said carriage over columns in which said clearing levers have been disengaged.

3. In a gang punch mechanism, in combination a set-bar field having a plurality of columns, each column having a plurality of latching members adapted to divide the columns into zones, a setting carriage having a column of setting rods, spaceable over said set-bar field, an erasing mechanism therein comprising a set-rod adapted to cooperate with two set-bars which are not set simultaneously for any normal code combination, and mechanism for actuating the erasing rods in a movement sufficient to release said latch plates without latching the set-bars depressed by the erasing rods.

4. In a gang punch mechanism, in combination a set-bar field having a plurality of columns, each column having a plurality of latching members adapted to divide the column into zones, a setting carriage having a column of setting rods, spaceable over said set-bar field, a plurality of erasing mechanisms therein comprising set-rods adapted to cooperate with two set-bars which are not set simultaneously for any normal code combination, and mechanism for actuating the erasing rods in a movement sufficient to release said latch plates without latching the set-bars depressed by the erasing rods, a separate erase mechanism being provided for each zone.

5. In a gang punch mechanism, in combination a set-bar field, a carriage mechanism spaceable thereover comprising a set-bar operating mechanism and an erase mechanism, the erase mechanism comprising an erase rod cooperating with set-bars which are not simultaneously set for any normal code combination, an actuating lever for operating said erase rod, and a link mechanism between said actuating lever and said erase rod comprising a swinging elbow lever pivoted on said actuating lever, cooperating with a pin on said erase rod, and with a pin on said carriage frame for disengaging the connection between said operating lever and said erase rod when the erase rod has moved a sufficient distance for the erasing function.

6. In a gang punch mechanism, the combination of a set-bar field having columns of set-bars, a carriage spaceable thereover and comprising a column of set-rods and an escapement mechanism for the spacing operation, a carriage return mechanism for the carriage comprising a magnetic clutch, a drum actuated thereby, a tape connected between said drum and to said carriage for the return of said carriage when the clutch is energized, and a carriage-return margin-stop mechanism comprising a rod member having a plurality of settable stops thereon, a contact actuating lever connected thereto, a lock for holding said bar and lever in normal position, a magnet member for the release of said lock, a plurality of sets of contacts operable by said lever, one of said pairs being adapted to energize said clutch, other of said pairs being adapted to disconnect other operating punch features, and an adjustable stop on said carriage adapted to cooperate with said settable stops on said bar, and mechanism for adjusting said carriage stop to determine which settable stop is effective.

7. In a gang punch mechanism, the combination of a set-bar field, a carriage mechanism spaceable thereover, and comprising a column of set-rods, a carriage return mechanism having a plurality of settable stops and an adjustable stop on said carriage, a backspace mechanism for backspacing said carriage, and means for adjusting said adjustable stop on said carriage by the action of said backspacing mechanism to prevent interference between said stop mechanism and said backspacing mechanism.

8. In a gang punch mechanism, the combination of a set-bar field having set-bars arranged in columns and a plurality of separate latching plates for each column adapted to divide the set-bar field into zones, a setting carriage spaceable thereover, having a full column of setting rods therein and separate erasing mechanisms for each zone, a keyboard adapted to set data according to a code requiring a full column and according to a code occupying a portion of a column in a zone, and mechanism for operating all erase mechanisms prior to the setting of full column data and for operating one erase mechanism only prior to setting data in a zone portion of a column.

9. In a gang punch mechanism, the combination of a set-bar field having set-bars arranged in columns, a plurality of latching members for each column of set-bars adapted to divide the set-bar field into zones, and a skip mechanism comprising a skip bar having a plurality of rows of skip stops equal in number to the number of zones, a similar plurality of skip levers in said carriage and a single locking circuit controlled from said skip bar for insuring the completion of a skip operation.

10. In a gang punch mechanism, the combination of a set-bar field having set-bars arranged in columns, a plurality of latching plates for each column adapted to divide the set-bar field into zones, a keyboard comprising a single set of keys, and a three position transfer switch adapted to reconnect the single set of keys for setting of set-bars in the full column and in the different zones.

11. A gang punch mechanism comprising in combination a set-bar field having set-bars arranged in columns, a plurality of latch members for each column adapted to divide the set-bar field into zones, a setting carriage spaceable thereover having a column of set-rods, and an erase mechanism for each zone, mechanism for operating said set-rods and said erasing members, a keyboard comprising a single set of alphabetic and digital keys, and a multi-position transfer switch adapted to connect said alphabetic keys to said actuating mechanism for setting alphabetic data in a code requiring a full column of set-bars for each letter, for setting numeric data from the numeric keys in a code requiring a full column, and members in said switch for connecting said numeric keys to said set-rod actuating mechanism for the setting of numeric data in a code adapted to record numeric data in zones, and members in said switch for changing said connections from one zone to another.

12. In a gang punch mechanism, a plurality of gang punches, each having a set-bar field, a carriage settable thereover, and a column of set rods in said carriage, and mechanism for operating said set-rods; a typewriter keyboard; and parallel connections between said typewriter keyboard and all of said punches.

13. In a gang punch mechanism, a plurality of gang punches, each having a set-bar field, a carriage spaceable thereover, a column of set-rods in said carriage, and mechanism for operating said set-rods; a typewriter keyboard; parallel connections between said typewriter keyboard and all of said punches; and members in said punches adapted to prevent interaction between said punches while controlled by said typewriter keyboard.

14. In a gang punch mechanism, a set-bar field having set-bars arranged in columns, a plurality of latching members for each column, mechanism for setting data in said columns, and mechanism for controlling the operation of said setting mechanism comprising a plurality of parallel connected keyboards, one thereof comprising a typewriter keyboard, another thereof comprising a keyboard attached to said punch mechanism, a transfer switch for controlling the character of connection between said setting mechanism and said keyboards, and members adapted to connect a plurality of punch keyboards directly to or through said transfer switch to said punch, one of said alternatively connectable keyboards comprising separate sets of keys for the different types of setting, the other comprising a single set of keys for all types of setting.

15. In a gang punch mechanism, the combination of a set-bar field having a plurality of set-bars arranged in columns, a keyboard having a column erase key and mechanism connected thereto for full column erasing of said set-bars, an upper erase key and mechanism for erasing said set-bars in an upper zone; and a lower erase key and mechanism for erasing in a lower zone of said set-bars.

16. In a gang punch mechanism, the combination of a set-bar field having a plurality of set-bars arranged in columns, a carriage spaceable thereover, a keyboard having a column erase key and mechanism in said carriage connected thereto for full column erasing of said set-bars, an upper erase key and mechanism for erasing said set-bars in an upper zone; and a lower erase key and mechanism for erasing in a lower zone of said set-bars, a margin-intermediate keyboard switch, and a trip key adapted to punch a card and return said carriage to margin or intermediate stop, a backspace key, and mechanism for backspacing the carriage and mechanism for preventing interference between said intermediate stop and said backspace.

17. In a gang punch mechanism, the combination of a set-bar field having a plurality of set-bars arranged in columns, a carriage spaceable thereover, a keyboard having a column erase key and mechanism in said carriage connected thereto for full column erasing of said set-bars, an upper erase key and mechanism for erasing said set-bars in an upper zone, and a lower erase key and mechanism for erasing in a lower zone of said set-bars, a carriage, a margin-intermediate keyboard switch, and a trip key adapted to punch a card and return said carriage to the margin or intermediate stop, a backspace key, and mechanism for backspacing the carriage, and mechanism for preventing interference between said intermediate stop and said backspace, said keyboard also having upper and lower skip keys, and skip mechanism cooperating therewith, and carriage return and cancel keys with carriage return and cancelling mechanism cooperating therewith.

18. In a gang punch mechanism; a set-bar field having a plurality of set-bars arranged in columns; a plurality of latching members for each column; a setting carriage spaceable thereover having a column of set-rods, a plurality of setting magnets for operating said set-rods, and additional magnets for function controls of said carriage; a keyboard having electric contacts therein, connections between said key contacts, and said setting and function magnets, and a plurality of relays connected to said key contacts adapted to control the punching of data in multi-unit code and to prevent undesired operations from certain keys and to cause desired operations from other keys.

19. In a gang punch mechanism, a set-bar field having a plurality of set-bars arranged in columns, a plurality of latching members for each column, a setting carriage spaceable thereover having a column of set-rods, a plurality of setting magnets for operating said set-rods, and additional magnets for function controls of said carriage, a keyboard having electric contacts therein, connections between said key contacts, and said setting and function magnets, and a plurality of relays connected to said key contacts adapted to control the punching of data in multi-unit code and to prevent undesired operations from certain keys and to cause desired operations from other keys, and auxiliary contacts operated from functional members for insuring the completion of some functions and for preventing accidental operation of other functions.

20. In a gang punch mechanism, a set-bar field having a plurality of set-bars arranged in columns; a plurality of latching members for each column; a setting carriage spaceable thereover having a column of set-rods, a plurality of setting magnets for operating said set-rods, and additional magnets for function controls of said carriage; a keyboard having electric contacts therein; connections between said key contacts, and setting and function magnets; a plurality of relays connected to said key contacts adapted to control the punching of data in multi-unit code, and to prevent undesired operations from certain keys and to cause desired operations from other keys; auxiliary contacts operated from functional members for insuring the completion of some functions and for preventing accidental operation of other functions; and a commutator for insuring sequential operation of other functions.

21. In a gang punch mechanism, a set-bar field having a plurality of set-bars arranged in columns, a setting carriage spaceable thereover having a column of set-rods and a plurality of setting magnets for operating said set-rods, means for punching a card in accordance with the indications of set-bars latched by said set-rods, and a plurality of carriage and punching controls, one thereof comprising a key and associated mechanism for traversing said carriage from right to left without other action.

22. In a gang punch mechanism, a set-bar field having a plurality of set-bars arranged in columns, a setting carriage spaceable thereover having a column of set-rods and a plurality of setting magnets for operating said set-rods, means for punching a card in accordance with the indications of latched set-bars, and a plurality of carriage and punching controls, one thereof comprising a key and associated mechanism for traversing said carriage from right to left without other action, and another comprising a key and associated mechanism for punching a card without other action.

23. In a gang punch mechanism, a set-bar field having a plurality of set-bars arranged in columns, a setting carriage spaceable thereover having a column of set-rods and a plurality of setting magnets for operating said set-rods, means for punching a card in accordance with the indications of latched set-bars, and a plurality of carriage and punching controls, one thereof comprising a key and associated mechanism for traversing said carriage from right to left without other action, another comprising a key and associated mechanism for punching a card without other action, and still another comprising a key and associated mechanism for moving the said carriage from right to left and simultaneously actuating the latching plates to clear previously latched set-bars.

24. In a gang punch mechanism, a set-bar field having a plurality of set-bars arranged in columns, a setting carriage spaceable thereover having a column of set-rods and a plurality of setting magnets for operating said set-rods, means for punching a card in accordance with the indications of latched set-bars, and a plurality of carriage and punching controls, one thereof comprising a key and associated mechanism for traversing said carriage from right to left without other action, another comprising a key and associated mechanism for punching a card without other action, still another comprising a key and associated mechanism for moving the said carriage from right to left and simultaneously actuating the latching plates to clear previously latched set-bars, and still another comprising a key and associated mechanism for traversing the carriage from right to left and simultaneously punching a card according to latched set-bars without other action.

25. In a gang punch mechanism, a set-bar field having a plurality of set-bars arranged in columns, a setting carriage spaceable thereover having a column of set-rods and a plurality of setting magnets for operating said set-rods, means for punching a card in accordance with the indications of latched set-bars, and a plurality of carriage and punching controls, one thereof comprising a key and associated mechanism for traversing said carriage from right to left without other action, another comprising a key and associated mechanism for punching a card without other action, still another comprising a key and associated mechanism for moving the said carriage from right to left and simultaneously actuating the latching plates to clear previously latched set-bars, still another comprising a key and associated mechanism for traversing the carriage from right to left and simultaneously punching a card according to latched set-bars without other action, and still a further control comprising a key and associated mechanism for punching a card and traversing the carriage from the right to the left to an intermediate stop and clearing latched set-bars.

26. In a gang punch mechanism, in combination, a set-bar field having a plurality of columns, each column having a plurality of latch-zones, and a setting carriage having a column of set-rods, magnets for the actuation of said set-rods, a keyboard adapted to energize said magnets, a transfer switch adapted to be connected between said keyboard and said magnets to connect key contacts in said keyboard alternatively to all of said magnets; or to separate magnets operable for setting set-bars in separate zones.

27. In a gang punch mechanism, in combination, a set-bar field having a plurality of columns, each column having a plurality of latching members adapted to divide the columns into zones, a setting carriage having a column of set-rods, magnets for the actuation of said set-rods, a keyboard adapted to energize said magnets, a transfer switch adapted to be connected between said keyboard and said magnets to connect the key contacts in said keyboard alternatively to all of said magnets, or to separate magnets operable for setting set-bars in separate zones, and a set of typewriter controlled key contacts adapted to be connected in parallel to said punch keyboard and through said transfer switch to said magnets.

28. In a gang punch mechanism, in combination, a set-bar field having a plurality of columns, each column having a plurality of latching members, a carriage spaceable thereover having a column of set-bars, magnets for the actuation of said set-bars and magnets for control of the movements of said carriage and the punching operation, a punch keyboard having keys and key contacts connected to said magnets and a set of typewriter-key-actuated contacts also connected to said magnets, the alphabetic and digital keys in said typewriter being properly connected to set alphabetic and digital records on said set-bars for punching cards; function keys of said typewriter, comprising a space key, a backspace key and a skip key, connected to magnets in said punch for the production of similar operations in the punch; and special character keys in said typewriter having contacts connected to function-controlling-circuits in said punch.

29. In a gang punch mechanism, in combination, a set-bar field having a plurality of columns, each column having a plurality of latching members, a carriage spaceable thereover having a column of set-bars, magnets for the actuation of said set-bars and magnets for control of the movements of said carriage and the punching operation, a punch keyboard having keys and key contacts connected to said magnets, and a set of typewriter-key-actuated contacts also connected to said magnets, the alphabetic and digital keys in said typewriter being connected to set alphabetic and digital records for punching cards; function keys in said typewriter, comprising a space key, a backspace key and a skip key, connected to magnets in said punch for the production of similar operations in the punch; special character keys in said typewriter having contacts connected to function-controlling-circuits in said punch, a transfer switch connected between said keyboards and said punch magnets, and mechanism associated with the contacts of said special character keys for controlled movement of said carriage from right to left, and simultaneous actuation of said transfer switch.

30. In a gang punch mechanism, in combination, a punch mechanism and a typewriter having key contacts for the control of said punching mechanism, said punch comprising a set-bar field having columns of set-bars and a plurality of latch plates for each column, said typewriter having key contacts for the control of the setting of said set-bars, and a special character key in said typewriter having key contacts for the control of other functions in said punch than set-bar setting.

31. In a gang punch mechanism, in combination, a set-bar field, a setting carriage, magnets for the control of said carriage, certain of said magnets serving to set set-bars, other of said magnets serving to control the movements of said carriage, means for punching cards comprising a magnet for the control thereof and a plurality of relays for causing or preventing the simultaneous occurrence of other possible carriage and punching operations.

32. In a gang punch mechanism, in combination, a set-bar field, a carriage spaceable thereover, spacing mechanism for the control of the movement of said carriage from left to right, and carriage return mechanism for control of the movements of said carriage from right to left, comprising a clutch member and a carriage return bar for the control thereof, said bar comprising a plurality of settable stops and an adjustable stop on said carriage for selective cooperation with one or another of said settable stops.

33. In a gang punch mechanism, in combination, a set-bar field, a carriage spaceable thereover, spacing mechanism for the control of the movement of said carriage from left to right, carriage return mechanism for control of the movements of said carriage from right to left, comprising a clutch member and a carriage return bar for the control thereof, said bar comprising a plurality of settable stops and an adjustable stop on said carriage for selective cooperation with one or another of said settable stops, and backspace mechanism for single column movement of said carriage from right to left having members for the prevention of interference between said adjustable stop and said settable members on said bar during backspace operations.

34. In a gang punch mechanism, in combination, a set-bar field, a carriage spaceable thereover, spacing mechanism for the control of the movement of said carriage from left to right, carriage return mechanism for control of the movements of said carriage from right to left, comprising a clutch member and a carriage return bar for the control thereof, said bar comprising a plurality of settable stops and an adjustable stop on said carriage for selective cooperation with one or another of said settable stops, and mechanism comprising a switch and a relay for the alternative actuation of said adjustable stop member.

35. In a gang punch mechanism, in combination, a set-bar field having a plurality of columns, each column having a plurality of latching members, a carriage member spaceable thereover having a column of set-rods, means for the control of said carriage comprising a plurality of alternatively usable keyboards having different key equipments and a transfer switch adapted to coordinate the different key characters.

36. In a gang punch mechanism, in combination, a set-bar field having a plurality of columns, a gang punch operable in accordance with settings thereof, a carriage spaceable thereover and having a column of set-rods, magnets for the actuation thereof, and a transfer switch cooperating therewith comprising a plurality of groups of contacts connected thereto.

37. In a gang punch mechanism, in combination, a set-bar field having a plurality of columns, a gang punch operable in accordance with settings thereof, a carriage spaceable thereover and having a column of set-rods, magnets for the actuation thereof, a transfer switch cooperating therewith comprising a plurality of groups of contacts connected thereto, and actuating mechanism for the said contacts comprising a contact operating bar, a shaft for the support thereof, a plurality of armatures attached thereto and a plurality of magnets cooperating with said armatures.

38. In a gang punch mechanism, in combination, a set-bar field having a plurality of columns, a gang punch operable in accordance with settings thereof, a carriage spaceable thereover and having a column of set-rods, magnets for the actuation thereof, a transfer switch cooperating therewith comprising a plurality of groups of contacts connected thereto, and actuating mechanism for the said contacts comprising a contact operating bar, a shaft for the support thereof, a plurality of armatures attached thereto, a plurality of magnets cooperating with said armatures, and a lock magnet for locking said shaft and bar in selected positions for control of the character of connection between said punch magnets and a keyboard.

39. In a gang punch mechanism, a set-bar field, a punch field and a die; a carriage spaceable thereover and having a column of set-rods, a group of actuating magnets for the carriage positioned at one end of the line of travel of the said carriage, a group of magnets and relays positioned at the other end of line of travel of said carriage, and a common base plate for all thereof adapted to maintain cooperative relationship therebetween.

40. In a gang punch mechanism, a set-bar field, a punch field and a die, a carriage having a column of set-rods spaceable thereover, and mechanism for the control thereof comprising a plurality of magnets and relays, the said relays being grouped adjacent one end of the line of travel of said carriage, and a tiltable insulating material shelf for the support of said relays.

41. In a gang punch mechanism, a set-bar field, a punch field and a die; a spaceable carriage cooperating therewith, a plurality of keyboards adapted to be interchangeably attached to said punch mechanism, and mechanism comprising circuits, and a connection board adapted to cooperate with any of said interchangeable keyboards, whereby the said setting carriage can be actuated from any one of the several keyboards.

42. In a gang punch mechanism, a set-bar field, a punch field and a die; a spaceable carriage cooperating therewith, magnets for the actuation of said carriage, and a plurality of keyboards connected in parallel to said magnets, each of said keyboards comprising setting keys and a disconnect switch adapted to prevent injury to the setting derived from one keyboard by accidental operation of keys on the other keyboard.

43. In a gang punch mechanism, a set-bar field, a punch field and a die, a spaceable carriage cooperating therewith, a plurality of magnets and relays for the actuation of said carriage mechanism, a keyboard having a single set of alphabetic keys and numeric keys, and a transfer switch adapted to connect said numeric keys to said magnets and relays in a plurality of different connection systems for the setting of said set-bars according to several different codes.

44. In a gang punch mechanism, a set-bar field, a punch field, and a die, a card magazine, card conveying rolls, a multipocket punched card receiver comprising a pocket gate, auxiliary rolls, a magnet for the operation of said pocket gate, and means for the actuation of said magnet comprising a commutator and relay mechanism.

45. In a gang punch mechanism, a set-bar field, a punch field, and a die; a card magazine, card conveying rolls, a multipocket punched card receiver comprising a pocket gate, auxiliary rolls, a magnet for the operation of said pocket gate, and means for the actuation of said magnet comprising a commutator and relay mechanism having circuits for continuing the punching operation beyond the punching of a single card and other circuits adapted to release the relay at the beginning of the punching of the last card.

46. In a gang punch mechanism, a set-bar field, a punch field, and a die; a spaceable carriage cooperating therewith, magnets, and relays for the actuation of said carriage, a keyboard for the control of said magnets and relays, and a commutator for the control of the sequence of operations of said carriage during a punching operation.

47. In a gang punch mechanism, a set-bar field, a punch field, and a die; a spaceable carriage cooperating therewith, magnets and relays for the actuation of said carriage, a keyboard for the control of said magnets and relays, and a commutator for the control of the sequence of operations of said carriage during a punching operation, said commutator being adapted to initiate a carriage return operation at the close of the punching operation.

48. In a gang punch mechanism, a set-bar field, a punch field and a die, a spaceable carriage cooperating therewith, mechanism in said carriage for releasing said set-bars, a plurality of magnets and relays for the operation of said carriage including the clearing operation and a circuit for preventing the clearing operation when specific keys are actuated.

WILLIAM W. LASKER.

CERTIFICATE OF CORRECTION.

Patent No. 2,124,178. July 19, 1938.

WILLIAM W. LASKER.

It is hereby certified that error appears in the printed specification of the above numbered patent requiring correction as follows: Page 3, second column, line 2, for "a perforate" read to perforate; page 8, second column, line 7, for the reference numeral "14" read 114; page 19, first column, line 74, for the reference numeral "37" read 337; page 31, first column, line 68, for the word "retracted" read retraced; page 34, second column, line 62-63, claim 26, for "latch-zones" read latching members adapted to divide the columns into zones; and that the said Letters Patent should be read with this correction therein that the same may conform to the record of the case in the Patent Office.

Signed and sealed this 7th day of November, A. D. 1939.

(Seal)

Henry Van Arsdale,
Acting Commissioner of Patents.